(12) United States Patent
Barbour et al.

(10) Patent No.: US 12,450,764 B2
(45) Date of Patent: Oct. 21, 2025

(54) ENHANCING ARTIFICIAL INTELLIGENCE ROUTINES USING 3D DATA

(71) Applicant: Photon-X, Inc., Kissimmee, FL (US)

(72) Inventors: Blair Barbour, Windemere, FL (US); David Theodore Truch, Katy, TX (US)

(73) Assignee: Photon-X, Inc., Kissimmee, FL (US)

( * ) Notice: Subject to any disclaimer, the term of this patent is extended or adjusted under 35 U.S.C. 154(b) by 179 days.

(21) Appl. No.: 17/701,258

(22) Filed: Mar. 22, 2022

(65) Prior Publication Data

US 2023/0048725 A1 Feb. 16, 2023

Related U.S. Application Data

(63) Continuation of application No. PCT/US2020/053897, filed on Oct. 2, 2020.
(Continued)

(51) Int. Cl.
*G06T 7/00* (2017.01)
*G06T 7/55* (2017.01)

(52) U.S. Cl.
CPC .............. *G06T 7/55* (2017.01); *G06T 7/0012* (2013.01); *G06T 2200/28* (2013.01);
(Continued)

(58) Field of Classification Search
CPC ..................... G06T 1/0007; G06T 1/20; G06T 2207/20081; G06V 20/64; G06V 10/10;
(Continued)

(56) References Cited

U.S. PATENT DOCUMENTS

| 5,631,970 A | 5/1997 | Hsu |
| 5,890,095 A | 3/1999 | Barbour et al. |

(Continued)

FOREIGN PATENT DOCUMENTS

| JP | 2008002949 | 1/2008 |
| KR | 20000005409 | 1/2000 |

(Continued)

OTHER PUBLICATIONS

Jo, YoungJu, et al. "Quantitative phase imaging and artificial intelligence: a review." IEEE Journal of Selected Topics in Quantum Electronics 25.1 (2018): 1-14.*
(Continued)

*Primary Examiner* — Li Liu
(74) *Attorney, Agent, or Firm* — Henry Patent Law Firm PLLC

(57) ABSTRACT

In a general aspect, enhancement of artificial intelligence algorithms using 3D data is described. In some aspects, input data of an object is stored in a storage engine of a system. The input data includes first-order primitives and second-order primitives. A plurality of features of the object is determined by operation of an analytics engine of the system, based on the first-order primitives and the second-order primitives. A tensor field is generated by operation of the analytics engine of the system. The tensor field includes an attribute set, which includes one or more attributes selected from the first-order primitives, the second-order primitives, or the plurality of features. The tensor field is processed by operation of the analytics engine of the system according to a series of artificial intelligence algorithms to generate output data representing the object.

30 Claims, 33 Drawing Sheets

Related U.S. Application Data

(60) Provisional application No. 62/909,956, filed on Oct. 3, 2019.

(52) U.S. Cl.
CPC .............. *G06T 2207/20081* (2013.01); *G06T 2207/30088* (2013.01); *G06T 2207/30096* (2013.01)

(58) Field of Classification Search
CPC .... G06V 10/147; G06V 10/44; G06V 10/255; G06V 10/46
See application file for complete search history.

(56) References Cited

U.S. PATENT DOCUMENTS

| | | | |
|---|---|---|---|
| 6,163,365 A | 12/2000 | Takahashi | |
| 6,671,390 B1 | 12/2003 | Barbour et al. | |
| 6,741,744 B1 | 5/2004 | Hsu | |
| 6,810,141 B2 | 10/2004 | Barbour | |
| 8,023,724 B2 | 9/2011 | Barbour | |
| 8,320,661 B2 | 11/2012 | Barbour | |
| 8,736,670 B2 | 5/2014 | Barbour et al. | |
| 9,693,728 B2 | 7/2017 | Harry et al. | |
| 9,736,670 B2 | 8/2017 | Mehta et al. | |
| 2002/0181761 A1 | 12/2002 | Barbour | |
| 2003/0103674 A1 | 6/2003 | Publicover | |
| 2005/0163365 A1 | 7/2005 | Barbour | |
| 2007/0046525 A1 | 3/2007 | Holbrook et al. | |
| 2011/0037965 A1 | 2/2011 | Hintz et al. | |
| 2011/0134220 A1 | 6/2011 | Barbour et al. | |
| 2013/0090857 A1* | 4/2013 | Imhof .................... | G01V 1/301 702/14 |
| 2014/0211193 A1 | 7/2014 | Bloom et al. | |
| 2015/0350569 A1 | 12/2015 | Espersen et al. | |
| 2016/0180142 A1* | 6/2016 | Riddle ............... | G06V 40/1312 382/124 |
| 2016/0292908 A1 | 10/2016 | Obert | |
| 2017/0006233 A1 | 1/2017 | Venkataraman et al. | |
| 2017/0091897 A1 | 3/2017 | Lee et al. | |
| 2017/0098310 A1 | 4/2017 | Chefd'Hotel et al. | |
| 2017/0345222 A1 | 11/2017 | Cohen-Or et al. | |
| 2018/0181802 A1* | 6/2018 | Chen .................... | G06V 10/764 |
| 2019/0022863 A1* | 1/2019 | Kundu .................... | G06T 7/187 |
| 2019/0178968 A1 | 6/2019 | Cetingul | |
| 2019/0213739 A1 | 7/2019 | Ohba et al. | |
| 2019/0258878 A1 | 8/2019 | Koivisto et al. | |
| 2019/0355150 A1* | 11/2019 | Tremblay .................. | G06T 7/73 |
| 2020/0054398 A1 | 2/2020 | Kovtun et al. | |
| 2020/0138521 A1 | 5/2020 | Aben et al. | |
| 2020/0175715 A1 | 6/2020 | Ogasawara | |
| 2020/0231176 A1 | 7/2020 | Motoyama et al. | |
| 2020/0272834 A1 | 8/2020 | Motoyama et al. | |
| 2022/0103797 A1 | 3/2022 | Barbour et al. | |
| 2022/0336511 A1 | 10/2022 | Barbour et al. | |

FOREIGN PATENT DOCUMENTS

| | | |
|---|---|---|
| KR | 20150069617 | 6/2015 |
| WO | 1997037336 | 10/1997 |
| WO | 2012053811 | 4/2012 |
| WO | 2018213841 | 11/2018 |
| WO | 2020163742 | 8/2020 |
| WO | 2020236575 | 11/2020 |
| WO | 2021030454 | 2/2021 |
| WO | 2021067665 | 4/2021 |

OTHER PUBLICATIONS

Park, YongKeun, Christian Depeursinge, and Gabriel Popescu. "Quantitative phase imaging in biomedicine." Nature photonics 12.10 (2018): 578-589.*

WIPO, International Search Report and Written Opinion mailed Apr. 1, 2021, in PCT/US2020/053897, 9 pgs.

* cited by examiner

ENHANCING ARTIFICIAL INTELLIGENCE ROUTINES USING 3D DATA

CROSS-REFERENCE TO RELATED APPLICATIONS

The present application is a continuation of PCT/US2020/053897, filed Oct. 2, 2020, which claims priority to U.S. Provisional Patent Application Ser. No. 62/909,956, filed Oct. 3, 2019, entitled "Method and Apparatus for 3D Surface enhancement of Artificial Intelligence Algorithms and Techniques," the disclosures of which are hereby incorporated by reference in their entirety.

BACKGROUND

The following description relates to enhancing artificial intelligence routines using 3D data.

Conventional imaging systems employ intensity-based techniques to detect electromagnetic energy proceeding from a source (e.g., an object). As one example of a conventional system, a spectroscopic system determines spectral (wavelength) composition of objects and scenes. Conventional imaging systems may not be suitable to generate 3D images or other angle representations of object shapes and scenes in real-time. Furthermore, conventional imaging systems may not be suitable in incoherent electromagnetic environments or turbid media (e.g., environments containing mist, fog, or smoke). Other imaging solutions may be needed to overcome the limited use of conventional imaging systems.

DETAILED DESCRIPTION

Figure 1A:
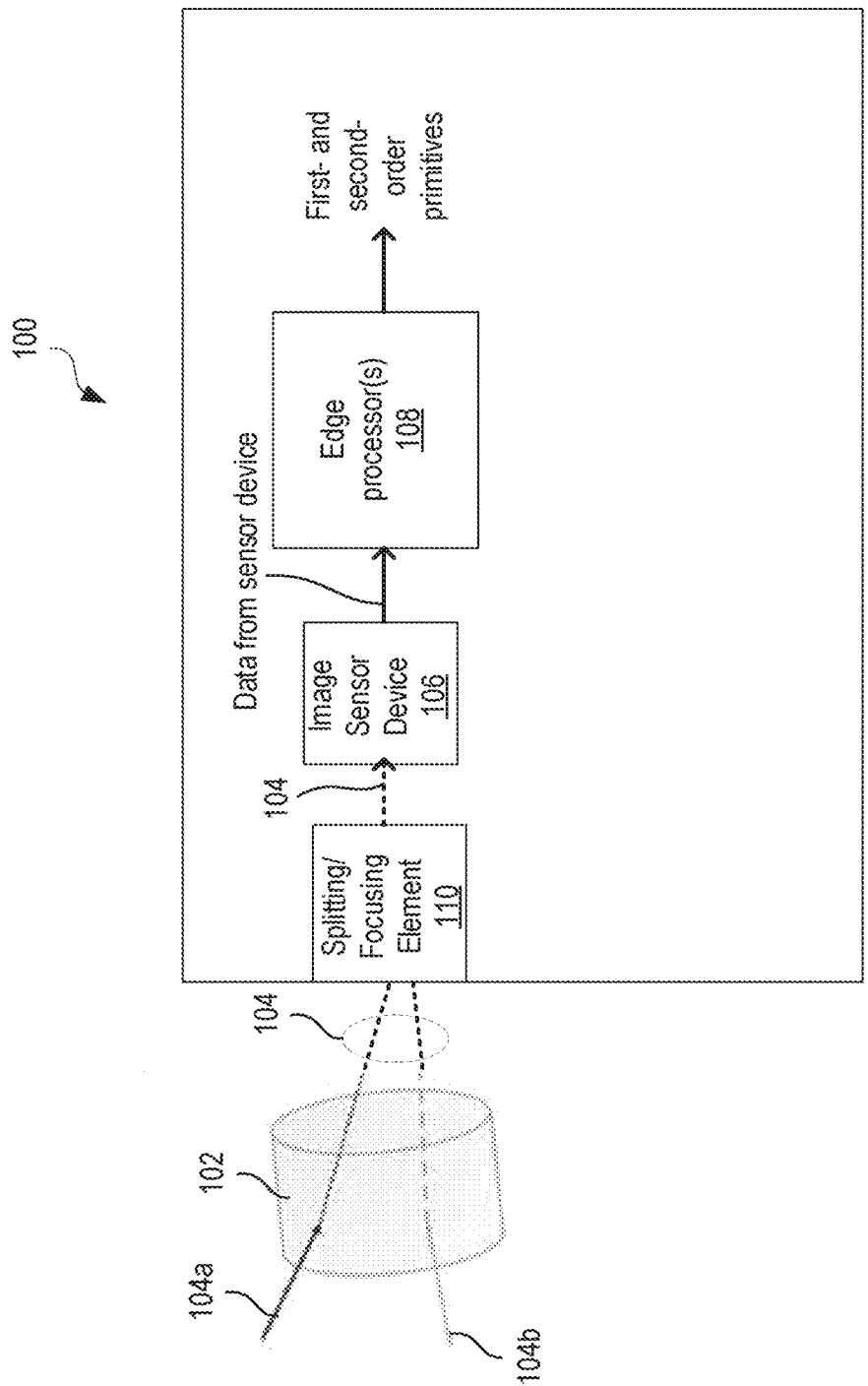
FIGS. 1A to 1C show an example single-lens spatial phase imaging (SPI) system.

In some aspects of what is described here, a data management system (e.g., a system of technology, mathematical routines, and approaches which can be constructed in various architectures, procedures and order) is used to improve digital interpretation of a real-world scene in the context of spatial phase imaging (SPI). The data management system can be used in a variety of real-world applications such as corrosion detection, autonomous driving, tracking, farming, terrain mapping, situational awareness, to name a few. The data management system can be organized into digital architectures such as operating system structures, application structures, and platform-based structures. The combination of approaches can be implemented on the wide variety of processing architectures currently in existence such as laptops, smart phones, graphics processing units (GPUs), advanced reduced instruction set computer machine (ARM) processors, etc. and any new architectures which will be developed such as quantum, photonic, biological, etc. In some implementations, the data management system can manage the storage, privacy, distribution, and transformation of captured SPI-based rich data attributes and data sets such as surface and shape information.

In some implementations, the systems and methods presented here can be used to improve digital capture and interpretation of the physical world by applying first, second and third generation Artificial Intelligence approaches to SPI-created data. In some implementations, first principle mathematics including topographical calculus, differential calculus and new artificial intelligence techniques can be used to capture raw signals from the electromagnetic spectrum using the SPI system and store the raw physics data from the spectrum. In some examples, the raw signals can be converted and store in digital format, e.g., actual 3D surface and shape information derived from the SPI-created data.

In some implementations, surface and shape-based 3D information can be captured and can yield an entirely new rich data set of information which can be tied to the entirety of the physical world and/or parts of a specific volume of the digital world. The methods and systems presented here can be used to create a digital twin of objects contained in that volume. In some implementations, a combination of the SPI approach and the AI approach using 3D information can be implemented on the wide variety of processing architectures currently in existence such as laptops, smart phones, GPUs, ARM processors, etc. and any new architectures which will be developed such as quantum, photonic, biological, etc.

The AI approach using 3D information (e.g., surface and shape) is a collection of digital analytical capabilities organized under a platform approach for SPI and any other 3D data capture signals. The digital analysis includes traditional first principle algorithms (e.g., mathematical and physics based), formulistic algorithms, topographical calculus, and existing and new Artificial Intelligence approaches for analyzing information.

In some implementations, the methods and systems presented here can be used to calculate and output first-order primitives of the SPI approach. Combinations of raw captured data and first-order primitives can be used to derive second-order primitives. The methods and systems presented here can be used to calculate and output pXShape datasets, which can be derived from combinations of raw data, first-order primitives, and second-order primitives of the SPI approach. The AI approach using 3D information can be used to ingest scalar data and transformed forms of SPI data consumable by the existing AI methodologies. In some instances, a new set of AI approaches may be created based on ingesting the 3D information including surfaces and shapes obtained from the SPI approach.

In some implementations, the AI approach using 3D information presented here can provide technical advantages. For example, 3D angle data at the pixel level can be used as added set of attributes for algorithmic processing. Angles and angular relationships of surfaces in an object (e.g. Humvee) are an invariant across the EM spectrum. Objects can be recognized passively in real-time with a single image sensor, if the angles from the single frame contains enough 3D information. The methods and systems presented here are based on directionality of all light sources (e.g., global light map), yielding a rich set of attributes including angle, edges, slope, rates of slope, objects, and sub-sections of objects, and another attribute. Segmentation of a scene is performed by examining similar or dissimilar values of these attributes providing an ability to examine surfaces and sub-surfaces based on these attribute sets such as angles, index of refraction, etc. in addition to the intensity and RGB values. A scene can therefore be broken down into any number of smaller components for further examination. Current 2D approaches capturing point data require the point cloud to be further processed into a 3D mesh or solid model in order to obtain some of the angular information obtained in real-time through the SPI approach.

In some implementations, the methods and systems presented here can be implemented in driverless cars to enable sensors and technologies to achieve level 5 of vehicle autonomy for ground vehicles. The methods and systems presented here can be implemented in robotic navigation to enable sensors and technologies to allow full autonomy for inspections and maintenance activity, movement of those devices to place sensors and actuators in place for action, drones, crawling robots, surface and sub-sea robots. The methods and systems presented here can be implemented in static objects to enable sensors and technology for full surveillance and interaction with other static devices and mobile devices, buildings, transportation infrastructures such as traffic lights, road signs, signage, and homes. The methods and systems presented here can be implemented in critical supply logistics, data collection, and package and people connection. For example, the 3D shape-based AI technology can be implemented in autonomous driving and navigation of trucking, transportation and movement of people with 3D AI surface mapping systems which can map the world at an effective resolution to have actionable intelligence on what is ahead and what to expect. The 3D shape-based AI technology can be implemented in supply chain enhancement to find, track, and identify packages and people, review same for damages, provide enhanced biometric, facility and vehicle security and analysis, and provide real-time 3D AI for autonomous deliveries.

Figure 1B:
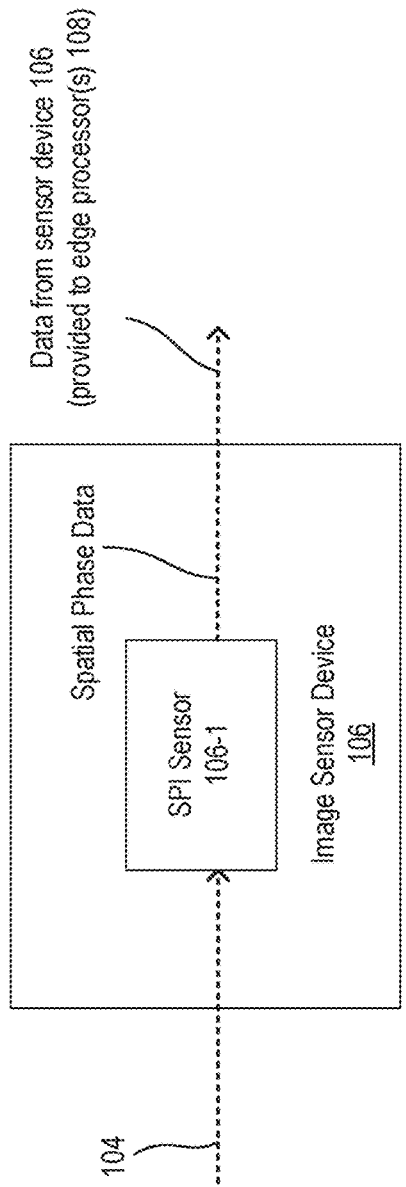
Figure 1C:
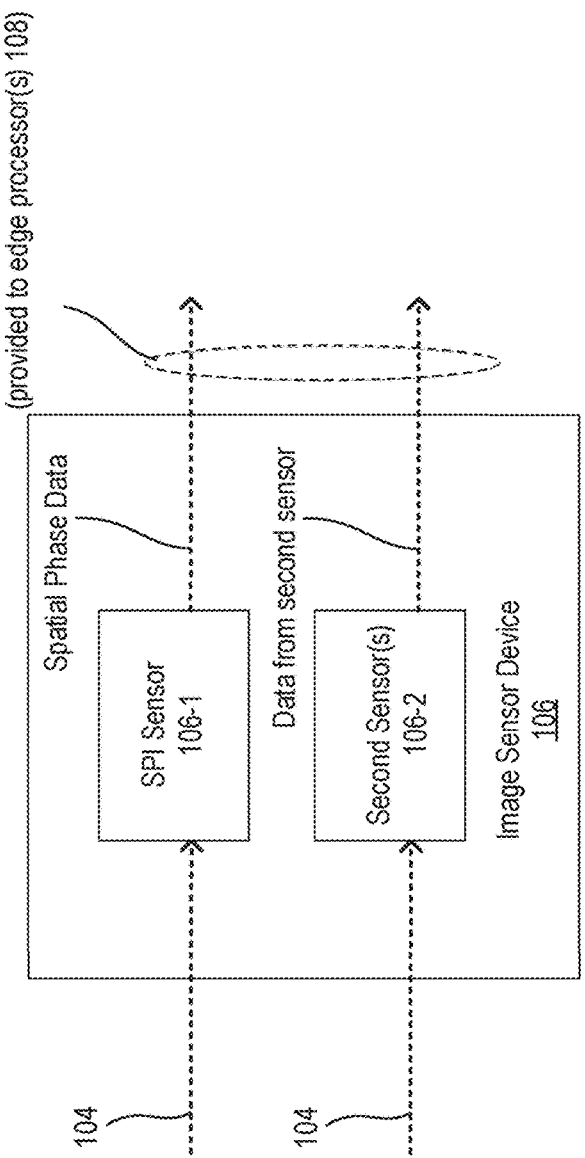
Figure 2A:
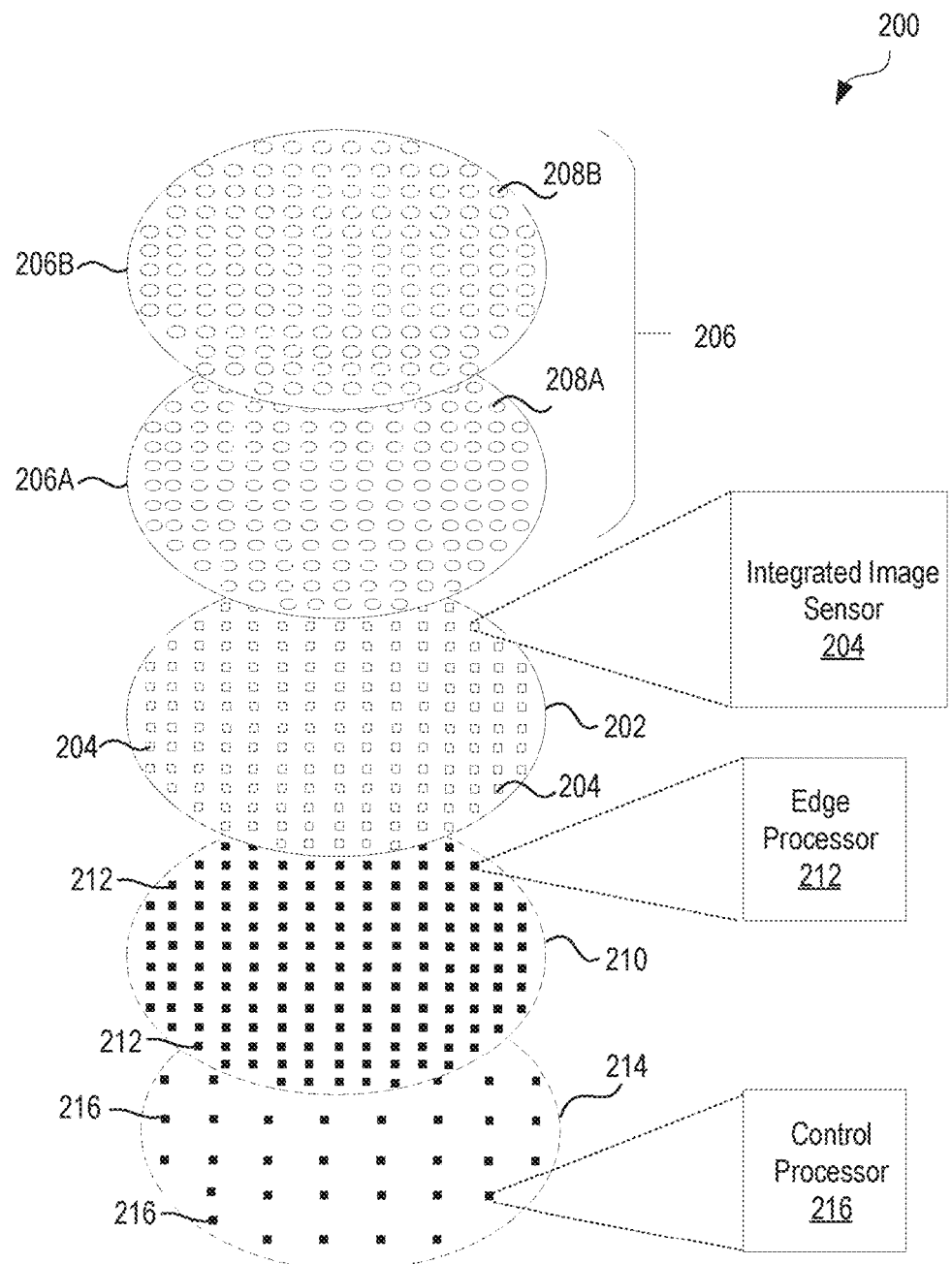
FIGS. 2A and 2B show an example wafer-level SPI system.
Figure 2B:
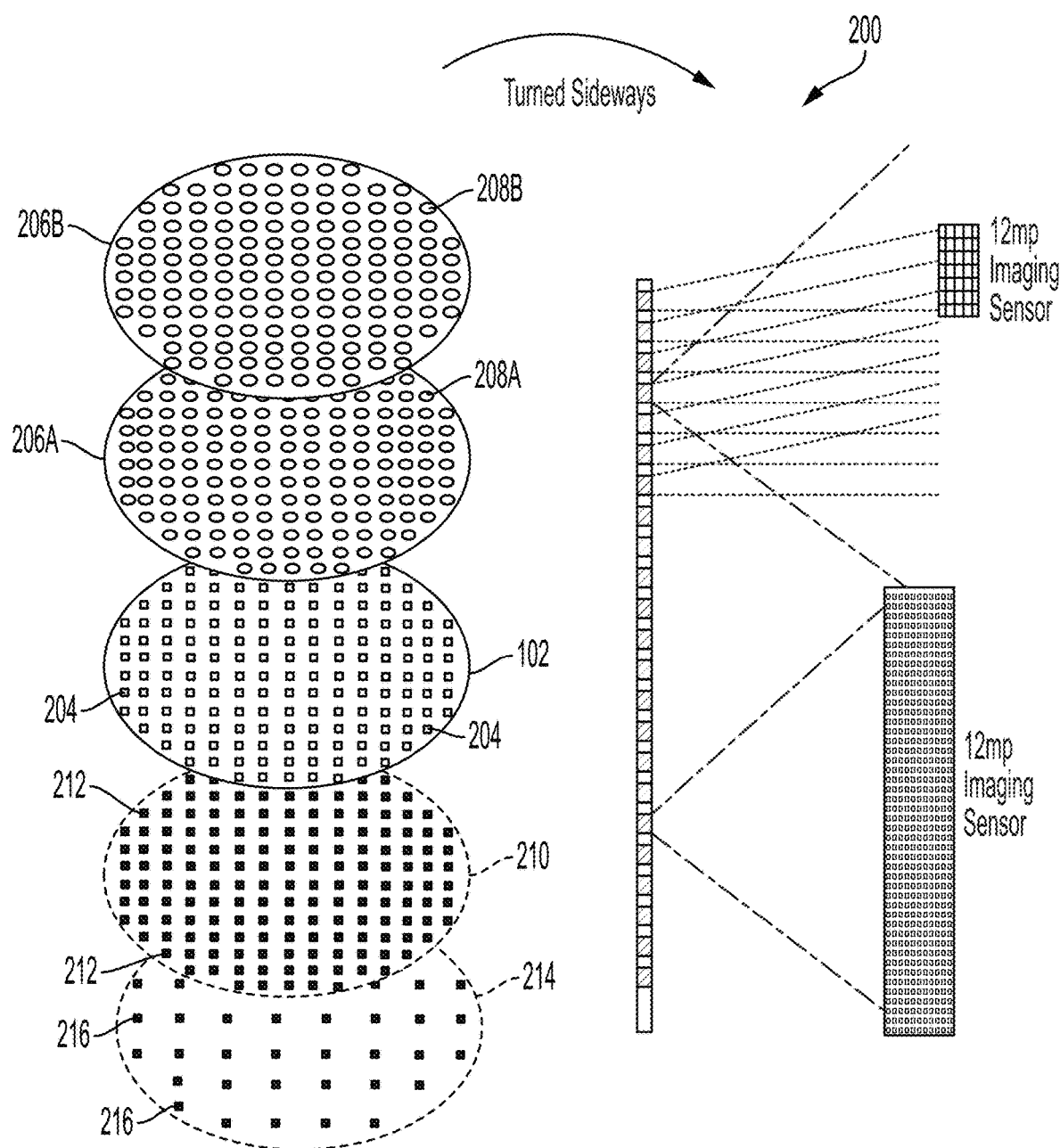

SPI systems can be implemented in various ways, examples being a single-lens SPI system, a wafer-level SPI system, etc. FIGS. 1A, 1B, and 1C show an example single-lens SPI system 100. FIGS. 2A and 2B show an example wafer-level SPI system that is developed by stacking various wafers. In a general aspect, the SPI systems 100, 200 are lensed 3D data acquisition sensor and analytics platforms that are configured to capture 3D data at the pixel level and across the electromagnetic (EM) spectrum. The 3D data captured by the SPI systems 100, 200 can be dense, high-resolution, accurate, and information-rich representations of scenes or objects located within the fields-of-view (FOVs) of the respective SPI systems 100, 200. The SPI systems 100, 200 are also configured to: process the captured 3D data to generate 3D surface data and 3D shape data; apply artificial intelligence (AI) to analyze the 3D surface data and 3D shape data; compare results to known parameters; and output real-time or near-time solutions.

The SPI systems 100, 200 include image sensors which function as shape-based sensors that are configured to passively capture spatial phase and radiometric information of the EM radiation that is collected by the SPI systems 100, 200. In a general aspect, the SPI systems 100, 200 are sensitive to spatial phase of the EM radiation incident upon it. The SPI systems 100, 200 re-describe objects and scenes in their FOVs in terms of spatial phase data. In particular, the spatial phase of EM radiation emanating from the surfaces of objects and scenes, whether it is emitted, transmitted, or reflected, has a measurable spatial phase. Thus, the shape of the object, the type of material from which it is made, the orientation of the object relative to the observer, etc., affect the spatial phase of the EM radiation incident upon the SPI systems 100, 200. As a result, each feature of the object 102 has a distinct spatial phase signature. Consequently, the EM radiation incident upon the SPI systems 100, 200 contains information indicative of the interaction of EM energy with objects and scenes in their FOVs.

Referring initially to the example SPI system 100 shown in FIGS. 1A to 1C, the SPI system 100 may be used to generate a representation of an object 102 that is located within the FOV of the SPI system 100. The object 102 may be any physical object in the real world, some examples being buildings, structures, a human body, scenes, terrains, astronomical bodies, planetary bodies, vehicles, among others.

The SPI system 100 is sensitive to EM radiation 104 that is incident upon it. The EM radiation 104 encompasses any and all wave energies in the spectrum of EM energy. Examples of EM energies that the SPI system 100 is sensitive to include the visible light range, the near infrared (NIR) range, the infrared range (e.g., short-wave infrared (SWIR), mid-wave infrared (MWIR), LWIR), the ultraviolet (UV) range, the microwave range, the x-ray range, the gamma ray range, the radio frequency range, radiation in the terahertz (THz) range, etc. The EM radiation 104 may be emitted by the object 102, reflected off the object 102 and directed toward the SPI system 100, transmitted through the object 102 and directed toward the SPI system 100, or may be a combination thereof. In some implementations, the EM radiation 104 may include ambient EM energy (e.g., ambient light 104a) that is reflected off, or emitted from surfaces of the object 102 or transmitted through the object 102. Additionally or alternatively, the EM radiation 104 may include EM energy that is projected onto the object 102 by an EM energy source (e.g., projected light 104b) and reflected off, emitted from surfaces of the object 102 or transmitted through the object 102.

Figure 3A:
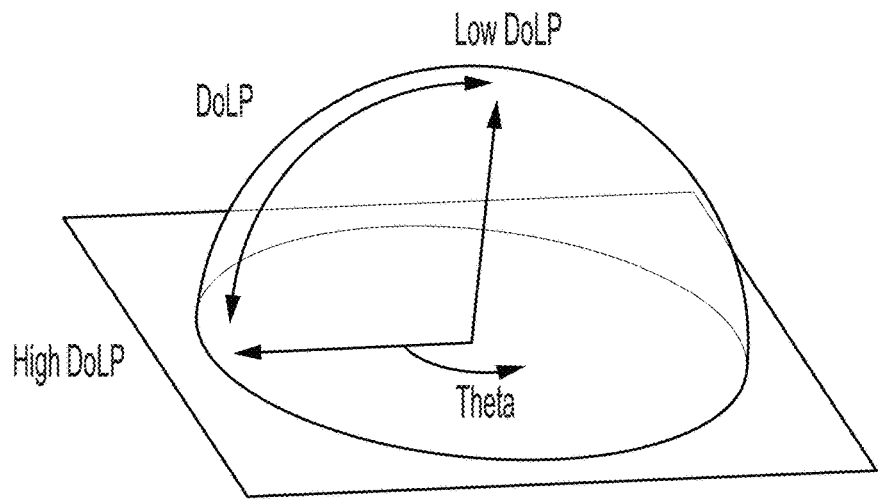
FIG. 3A shows an example of degrees of linear polarization of electromagnetic radiation and its correlation to a direction cosine of the electromagnetic radiation.
Figure 3B:
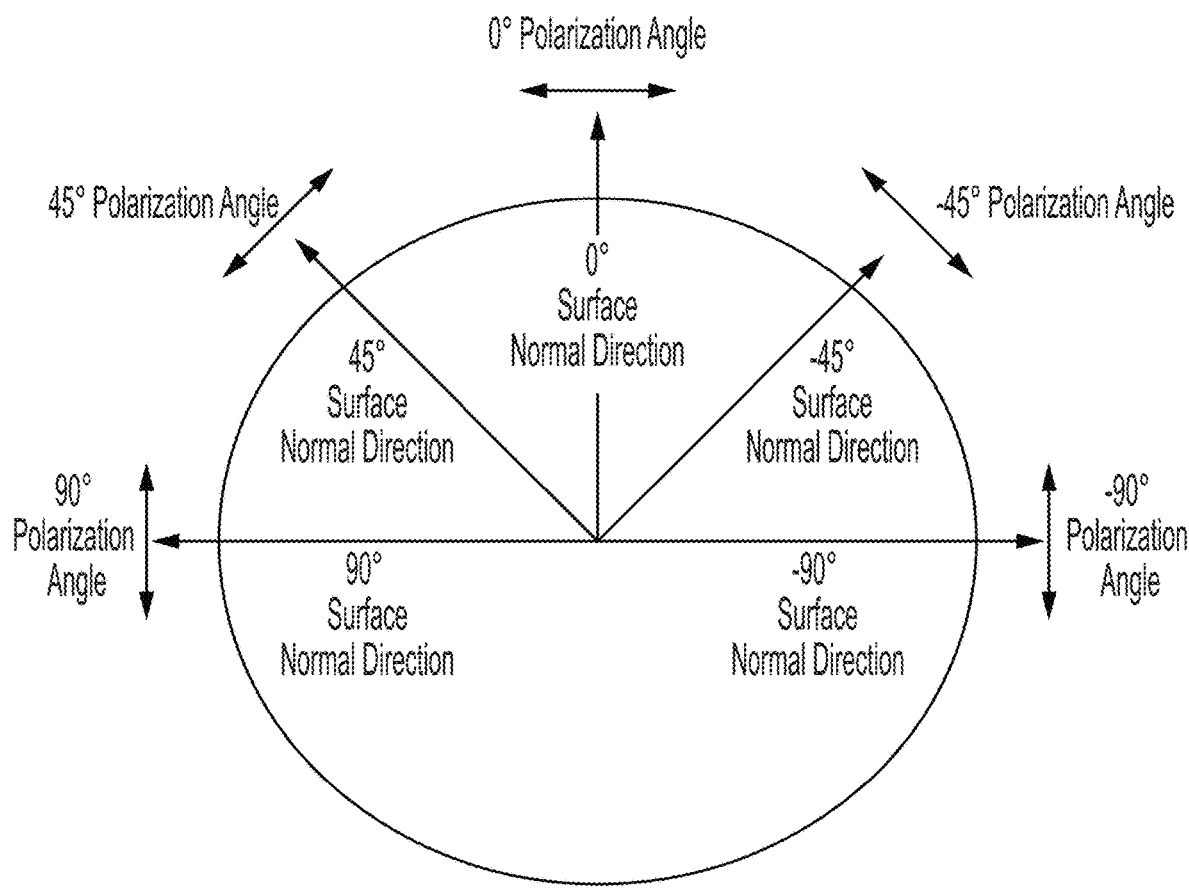
FIG. 3B shows an example of a correspondence between a direction of a surface normal of electromagnetic radiation and a polarization angle of the electromagnetic radiation.

Properties of the EM radiation 104 may be altered as it interacts with the object 102. FIG. 3A shows, as an example, that after an interaction with the object 102, the percentage of linear polarization in the EM radiation 104 reflected from surfaces of the object 102 (indicated in FIG. 3A as a degree of linear polarization, DoLP) may be directly correlated to the direction cosine of the original EM energy incident on the object 102. Furthermore, the primary angle of the reflected linearly polarized light, which is indicated as Theta in FIG. 3A, may be mathematically related to the in-plane angle of the reflecting surface. FIG. 3B shows an example of a correspondence between a direction of a surface normal and a surface angle of the EM radiation 104. In the example shown in FIG. 3B, which is a specific example where the correlation is defined relative to a reference coordinate frame, a 90-degree polarization angle may correspond to a 90-degree surface normal direction; a 45-degree polarization angle may correspond to a 45-degree surface normal direction; a 0-degree polarization angle may correspond to a 0-degree surface normal direction; a −45-degree polarization angle may correspond to a −45-degree surface normal direction; and a −90-degree polarization angle may correspond to a −90-degree surface normal direction. While FIG. 3B shows five specific angles of polarization, the angles of polarization can be of any value between 0 degrees and 360 degrees, or multiples thereof. The example of FIG. 3B is merely illustrative and other correlations may be defined relative to other reference coordinate frame (e.g., relative to an object's surface or relative to a camera angle).

Since the EM radiation 104 incident on the SPI system 100 has properties that are indicative of its interaction with the object 102, the SPI system 100 can derive information about the object 102 from the magnetic vector of the EM radiation 104, from the electric vector of the EM radiation 104, or from both. In this regard, the SPI system 100 includes an image sensor device 106 configured to generate 3D data (e.g., spatial phase data) and one or more edge processors 108 configured to process the 3D data and generate, in real-time or near real-time (e.g., in a range from one millisecond to about 5 seconds), first- and second-order primitives that convey information about the object 102.

The first- and second-order primitives may include: the shapes and surface anomalies of the object; surface roughness of the object; material analysis of the object; lighting analysis of the object; the angles of various surfaces of the object (e.g., expressed as surface normal vectors or orientations in the x-, y-, and z-directions); edges, occlusions, blobs, masks, gradients, and interior volume features of the object; surface/pixel geometry of the object; a frequency distribution of the EM radiation 104 received from the object; color and intensity information of object; EM spectrum information of the object (from any band in the EM spectrum); the degree of linear polarization, angle of polarization, angle of linear polarization, angle of incidence, angle of reflection, angle of refraction, depolarization factor, principal curvatures, mean curvature, Gaussian curvature, synthetic skin or lighting, unpolarized scatter, ellipticity, albedo, the index of refraction, cluster of angles, surface angles, slope vectors, angular relationships, rate of slope, surface scattering, specular/diffuse scattering, propagation scattering of the object; pixel-to-pixel clusters; 3D object or scene detection; distance tracking; scene reconstruction; object mapping; surface characterization; and others. Therefore, the object 102 may be represented by a broad number of parameters.

Any or all of those pixel level attributes can participate in AI approaches to improve the attribute value and confidence that it is an accurate representation of that value associated to the real-world scenario depicted in the "image" captured. In addition, clustering of pixels to depict surfaces, shapes, etc. have their own attribute set which is used to depict the collection of pixels with its own set of properties. These attributes can also participate in AI approaches.

The one or more edge processors 108 may also be configured to cluster similar features or information related to the object 102. For example, the one or more edge processors 108 may be configured to cluster similar first- and second-order primitives representing the object 102. By clustering similar features/information from the pixels representing the object 102, the SPI system 100 can group the scene into different object types or group the object 102 into different surfaces, thus enabling segmentation of the object 102 from a cluttered scene. The application of this segmentation can be crucial for machine visioning applications. Segmentation at the angle and surface level can also be important in describing a surface or shape of a 3D object.

These clustered and segmented parameters form a family of representations called pXSurface and pXShape where "X" defines the attribute type. For example, information related to surface normal vectors or orientations of the object 102 may be clustered or segmented, thus resulting in a pNSurface and pNShape description of the object 102, where "N" denotes the surface normal vectors or orientations. By deriving information about the object 102, the SPI system 100 may also detect the presence of object 102 and track or predict their motion (e.g., in the context of drone or object detection and tracking). Other applications of the SPI system 100 include predicting the rate of corrosion or blister growth, quality inspection and 3D scanning in an industrial environment, wound imaging and early skin cancer detection, 3D facial reconstruction and identification of an individual, autonomous navigation, among others. These, and other, applications of the SPI system 100 are described in further detail below.

The image sensor device 106 includes a first image sensor 106-1 (e.g. in the example shown in FIG. 1B). The first image sensor 106-1 may be an SPI sensor that generates spatial phase data of the object 102. As described in further detail below in FIGS. 4A and 4B, the SPI sensor 106-1 includes an EM detector (e.g., including an array of radiation-sensing pixels) and a polarization structure. Also as discussed in further detail below, the spatial phase data can be processed by the processor(s) 108 to generate first- and second-order primitives that convey information about the object 102 (e.g., one or more of the features discussed above).

In some implementations, the image sensor device 106 may also include at least one second image sensor 106-2 (e.g., in the example shown in FIG. 1C). The second image sensor 106-2 may be a sensor that generates a different cue or aspect compared to the SPI sensor 106-1. For example, the second image sensor 106-2 may be a sensor having a different modality compared to the SPI sensor 106-1. The second image sensor 106-2 may include a Kinect sensor, a LiDAR sensor, infrared sensors, spectral sensors, X-Ray sensors, laser scanners, monochrome and color sensors, shape from motion, stereo, depth sensors, a sonar sensor, a radar sensor, a ToF sensor, a plenoptic (lightfield) sensor, an acoustic or stereo sensor, a structured light sensor, a rangefinder, a focus sensor, a NIR sensor, a SWIR sensor, a MWIR sensor, a LWIR sensor, or a combination thereof. In some implementations where the SPI sensor 106-1 is sensitive to a high energy regime of the EM spectrum, the second image sensor(s) 106-2 may be omitted. In some examples, the second image sensor 106-2 may even be another SPI sensor that produces a different or same cue or aspect compared to the SPI sensor 106-1. For example, in some implementations, while the spatial phase data from the SPI sensor 106-1 may be processed to generate information indicative of a 3D surface topography of the object 102, the data from the second image sensor 106-2 (e.g., another SPI sensor) may be processed to generate information indicative of a shape from motion or a specular/diffuse separation shape. As such, by utilizing the SPI sensor alone (e.g., in the example shown in FIG. 1B) or with another SPI or different types of sensor(s) (e.g., in the example shown in FIG. 1C), the SPI system 100 captures various different physical properties, cues, or aspects, thus enabling the generation of the combined data set that is the dense, high-resolution, accurate, and information-rich representation of the object 102.

In the example of FIG. 1A, EM radiation 104 from the object 102 is focused onto the image sensor device 106 by an optical element 110. The optical element 110 may include one or more apertures, lenses, mirrors, catoptric elements, fiber optic elements, micromirror arrays, microlens arrays, baffles, holographic optical elements, diffractive optical elements, and beam steering mechanisms. For example, catoptric elements may be used to design a wide-angle optical element 110. As another example, the optical element 110 may include beam steering mechanisms may be used to expand a FOV of the image sensor device 106. As a further example, microlens arrays may be used to take advantage of numerical imaging phenomena including, but not limited to, super-resolution, greater depth of field, or greater dynamic range. In some examples where the image sensor device 106 includes the SPI sensor 106-1 and the second image sensor 106-2, the optical element 110 may function as a splitting element that splits the EM radiation 104 and focuses the split beams onto the SPI sensor 106-1 and the second image sensor 106-2. In such examples, the optical element 110 may further include a prism, a beam splitter, an element including metamaterials, or an element including birefringent materials.

Referring now to the wafer-level SPI system 200 shown in FIGS. 2A and 2B, the SPI system 200 includes an imaging wafer 202, wafer-level integrated optics 206 stacked on the imaging wafer 202, a processing wafer 210 attached to another side of the imaging wafer 202, and a control wafer 214 attached to a backside of the processing wafer 210. By stacking wafers, more integrated sensors in a smaller more cost-effective package may be developed. Like the SPI system 100, the SPI system 200 is sensitive to EM radiation that is incident upon it.

The SPI system 200 includes the imaging wafer 202. In some implementations, pixels of different sizes, focal lengths, integration times, and different image sensors can be interleaved within the same wafer-level SPI system 200, as seen in the example of FIG. 2B. As an example, one or more LWIR bolometers can be placed on the same imaging wafer 202 as silicon CMOS visible/NIR imagers. As a further example, different pixel sizes can be mixed with cells of pixels to create a sensor having wide dynamic range and strong angle sensitivity across the image. In some implementations, the imaging wafer 202 has a diameter ranging from about 20 mm to about 500 mm. As examples, the imaging wafer 202 may be a semiconductor wafer having a diameter of about 25 mm, about 50 mm, about 75 mm, about 100 mm, about 125 mm, about 150 mm, about 200 mm, about 300 mm, or about 450 mm. The typical wafers can be either 200 mm or 300 mm for standard CMOS image sensor process flows.

The imaging wafer 202 includes an array of integrated image sensors 204. The image sensors 204 can be mixed or similar imager types, such as visible, NIR, Si SWIR, SWIR, MWIR, LWIR, UV, THz, X-ray, depth, spectral (Single, Multi, hyper), etc. As described in further detail below in FIGS. 4A and 4B, each integrated image sensor 204 includes an EM detector (e.g., including an array of radiation-sensing pixels) and a polarization structure. In some implementations, each integrated image sensor 204 can include additional layers, examples being color, multispectral, hyperspectral, polarization, lenslets, multiple types of other depth pixels or imagers, etc. In some implementations, the polarization structure is disposed over (e.g., placed on) the array of radiation-sensing pixels, while in other implementations (e.g., backside illuminated image sensors), the polarization structure is integrated into radiation-sensing pixels (e.g., at the anode or cathode level of the radiation-sensing pixels). The number of integrated image sensors 204 formed on the imaging wafer 202 is not limited and can vary from a single image sensor to hundreds, thousands, or even millions of image sensors 204. The integrated image sensors 204 may be manufactured at any technology node (e.g., using any process from the 180 nm process down to the 5 nm process and beyond). In general, smaller technology nodes favor the manufacture of subwavelength structures that can function as the polarization structure, thereby changing the characteristics of the signal and thus polarization or angle data.

The SPI system 200 also includes wafer-level integrated optics 206 stacked on the imaging wafer 202. The wafer-level integrated optics 206 may include one or more optical wafers 206A, 206B to make a very small embedded lens (sometimes referred to as a lensless optical system). Only two optical wafers are shown in the example of FIGS. 2A and 2B for the sake of illustration, and some implementations can include more than two optical wafers. Each optical wafer 206A, 206B respectively includes microlens arrays 208A, 208B distributed over the face of the wafer 206A, 206B and at each pixel level of an individual image sensor 204, which results in numerous image sensors 204 with separate lenses on each image sensor 204 in the array with the wafer optics. A respective microlens array 208 includes an array of microlenses and is placed above each integrated image sensor 204 to focus the EM radiation 104 directly to radiation-sensing pixels of the integrated image sensor 204, thereby reducing optical crosstalk between adjacent integrated image sensors 204. In some implementations, the microlens arrays 208 may include one or more coatings to reduce reflection, thus minimizing flares and ghost images while maximizing contrast and color rendition. In some implementations, the optical array can include an auto-aperture capability or other integrated camera components. The wafer-level integrated optics 206 and the microlens arrays 208A, 208B are configured to operate at any wavelength in the EM spectrum. The wafer-level integrated optics 206 and the microlens arrays 208A, 208B can include any focusing element that focuses the EM radiation 104 directly to radiation-sensing pixels of the integrated image sensor 204. For example, the microlens arrays 208A, 208B can include a glass lens, a quartz lens, an element that produces magnetic pulses (which may be used in the high energy part of the EM spectrum), an antenna-based element (which may be used in the low energy part of the spectrum, for example, radio frequencies), or a combination thereof.

The SPI system 200 also includes the processing wafer 210 attached to the backside of the imaging wafer 202. The processing wafer 210 includes an array of edge processors 212, with a respective edge processor 212 being dedicated to processing signals received from a respective integrated image sensor 204. The edge processors 212 can include artificial intelligence (AI) or deep learning processors. In some implementations, the processing wafer 210 may be omitted, and the edge processors 212 may be placed on the imaging wafer 202. For example, an edge processor 212 may be placed on the imaging wafer 202 between adjacent integrated image sensors 204. In such implementations, a respective edge processor 212 is still dedicated to processing signals received from a respective integrated image sensor 204. In some examples, the edge processors 212 act as localized processing for respective integrated image sensors 204 for fast efficient analytics. Such dedicated processing results in real time generation of data (e.g., first and second order primitives). Advanced 3D analytics and AI engines can be deployed at this level of information processing (e.g., by edge processors 212) to produce the first and second order primitives. These approaches are also used with the higher order data derived and are referenced in the various example applications details, which are described below. Advanced 3D analytics and AI engines can also be programmed at the system level.

The edge processor 212 dedicated to a respective integrated image sensor 204 generates a data set that is a dense, high-resolution, accurate, and information-rich representation of a scene or the object 102. The representation of the object 102 may be a localization (e.g., 3D localization) of the object 102. Additionally or alternatively, the representation of the object 102 may be identification, characterization, or quantification of surfaces, shapes, or interrelationships among the shapes of the object 102. The edge processor 212 generates the data set in real-time or near-time (e.g., in a range from one millisecond to about 5 seconds) through a plurality of image frames similar to a 3D shape video. Each individual frame has rich data features including but not limited to 3D shape at pixel or object level.

The SPI system 200 may include a control wafer 214 adhered to a backside of the processing wafer 210. In some implementations, the processing wafer 210 includes an array of control processors 216, each of which is configured to perform integration and processing (e.g., correlation) of the first- and second-order primitives from a group of edge processors 212. The control processors 216 may also be configured to relay key information to their associated edge processors 212. Since each control processor 216 manages and processes data from a group of edge processors 212, the number of control processors 216 formed on the control wafer 214 is less than the number of edge processors 212 formed on the processing wafer 210.

Figure 4A:
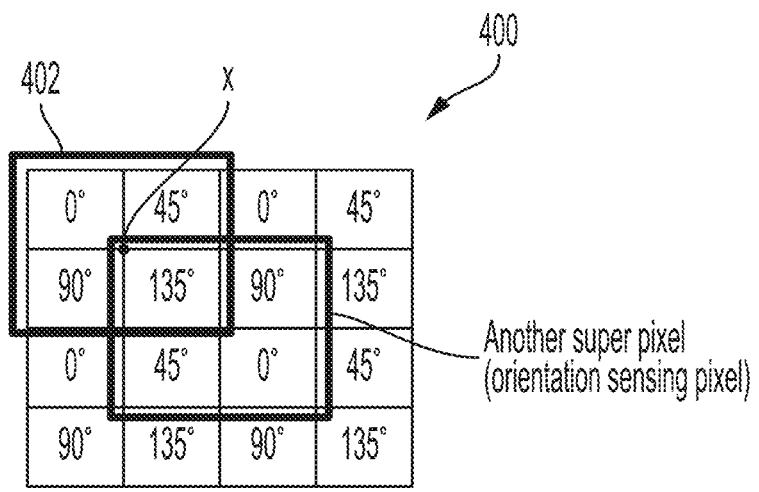
FIG. 4A shows a top-down view of an example electromagnetic detector of a SPI sensor.
Figure 4B:
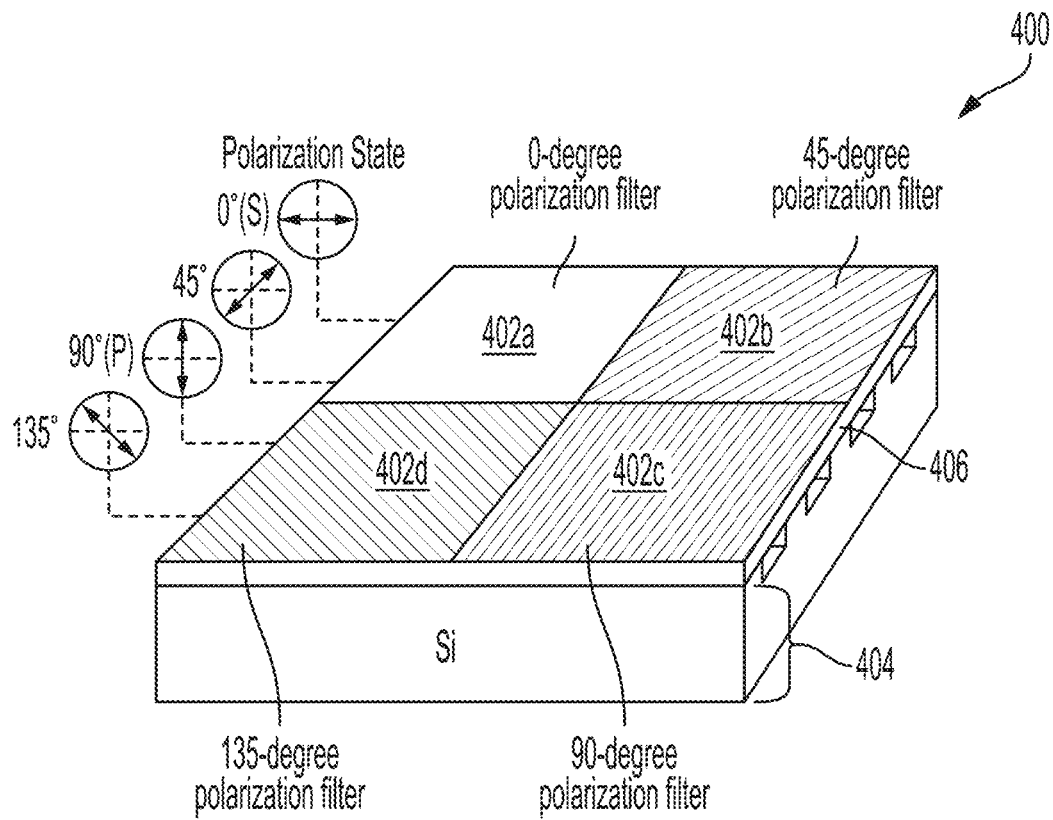
FIG. 4B shows a perspective view of an example super pixel of the electromagnetic detector shown in FIG. 4A.

As discussed above, the SPI-sensor 106-1 and the integrated image sensor 204 include an EM detector (e.g., including an array of radiation-sensing pixels) and a polarization structure. FIG. 4A shows a top-down view of an example EM detector 400 including a "super" pixel 402. The super pixel 402 may be an orientation-sensing pixel (e.g., sensitive to orientations of the EM radiation 104) and may include a plurality of sub-pixels. Four sub-pixels 402a, 402b, 402c and 402d are shown in the example of FIG. 4A, although any number of sub-pixels may be possible in other examples. Furthermore, the pixels/sub-pixels may be arranged in any format. FIG. 4B shows a perspective view of the super pixel 402 illustrated in FIG. 4A. For illustrative purposes, the EM detector 400 is shown as a 4×4 pixel array in FIG. 4A; however, the EM detector 400 may include arrays of other sizes. FIGS. 4A and 4B are examples of using pixel information to generate surface normal vectors; however, clustering does not require symmetrical pixels nor is clustering a technique to only obtain the shape of the object 102. The super pixel 402 is shown to be formed by a 2×2 pattern formed by the adjoining pixels 402a, 402b, 402c and 402d, although other super pixel sizes are possible in other examples. In some examples, the super pixel patterns are repeated, as seen in FIG. 4A, to form another super pixel. By examining the difference between two adjacent angles and by moving across or down one pixel, the edge processors 108 or 212 calculate the slope of the curve between the two adjacent angles and store the result as different attributes (e.g., a tangent line to the slope, a cosine of the angle, polar coordinate representation, and additional results). The edge processors 108 or 212 can also provide further calculated results such as the average of the four angles of the super pixel 402, providing a single normal vector for the super pixel 402 (e.g., at point "X" in the super pixel 402).

In the example of FIGS. 4A and 4B, the EM detector 400 may include an array of detector pixels 404 (e.g., implemented in silicon) and a polarizing array 406 disposed over the array of detector pixels 404. The polarizing array 406 can also be integrated into the photodiode and not on top of the sensing surface. Each photodiode can have a polarization sensitive anode and or cathode. When placed on top to work properly, the polarization arrays can be tied to the pixel isolation barriers to create as much metal mass as possible to increase the EM field in the desired polarization direction. The EM radiation 104 is incident on the polarizing array 406, which filters the EM radiation 104 based on its orientation and rejecting all scattered or noise EM energy. The underlying array of detector pixels 404 records an intensity of the EM radiation 104 at each of the orientations. Stated differently, in the example shown in FIGS. 4A and 4B, the array of detector pixels 404 captures the frequency distribution (e.g., broadband) of photons at a particular angle of orientation, filtered by the polarizing array 406. Although angles can be of any value between 0-degrees and 360-degrees or multiples thereof, FIGS. 4A and 4B show four specific angles of orientation, namely 0-degrees, 45-degrees, 90-degrees, and 135-degrees merely for the sake of illustration.

In some implementations, the detector pixels 404 may include complementary metal-oxide-semiconductor elements (e.g., CMOS photodiodes). However, the array of detector pixels 404 may be include pixel elements implemented using other technologies, examples being charge coupled devices (CCDs), longwave infrared (LWIR) detectors, X-ray detectors, to name a few. Therefore, depending on the type of pixel elements used for the array of detector pixels 404, the SPI systems 100, 200 may be sensitive to colored EM radiation 104 (e.g., RGB color), monochrome EM radiation 104, or EM radiation 104 having other wavelength ranges such as ultraviolet, visible, near infrared (NIR), medium wavelength infrared (MWIR), long wavelength infrared (LWIR), radio, gamma, X-ray, radiation in the terahertz range, etc. Stated differently, by selecting appropriate detector pixels 404 for the EM detector 400, the SPI systems 100, 200 may be sensitive to EM radiation 104 encompassing any and all wave energy in the spectrum of EM energy. Therefore, the SPI systems 100, 200 may be configured to single or multiple wavelengths or wavebands (e.g., including various separations of specular and diffuse bands) to determine the various features of the object 102. This provides the advantage of upward compatibility with any currently available imaging modality.

In some implementations, the polarizing array 406 may include nanowires having different orientations. For example, the polarizing array 406 may include a 0-degrees polarization filter, as shown in FIGS. 4A and 4B, and the 0-degree polarization filter may be implemented using a metallic grid of nanowires having a 0-degree orientation. Similarly, the polarizing array 406 may include a 90-degrees polarization filter, as shown in FIGS. 4A and 4B, and the 90-degree polarization filter may be implemented using a metallic grid of nanowires having a 90-degree orientation. A similar concept is applicable to the 45-degrees polarization filter and the 135-degrees polarization filter shown in FIGS. 4A and 4B.

In some implementations, the nanowires may be formed from aluminum, copper, tungsten, tin, chromium, indium, gold, a combination thereof, or the like. In some examples, the EM detector 400 can be tuned to detect different wavelengths of the EM radiation 104 by changing the width and pitch of the nanowires, as long as the width and the pitch of the nanowires are less than the wavelength sought to be detected. In general, when this condition is met (i.e., the width and the pitch of the nanowires are less than the wavelength being detected), larger wavelengths can be detected by the EM detector 400 by increasing the width and pitch of the nanowires, and smaller wavelengths can be detected by the EM detector 400 by decreasing the width and pitch of the nanowires. For example, the EM detector 400 can be tuned to detect EM radiation 104 in the visible spectrum by forming nanowires having widths and pitches in a range from about 50 nanometers to about 100 nanometers (e.g., about 70 nanometers wire with 70 nanometer spaces or many other combinations). As another example, the EM detector 400 can be tuned to detect LWIR radiation by forming nanowires having widths and pitches in a range from about 200 nanometers to about 600 nanometers (e.g., in a range from about 400 nanometers to about 500 nanometers).

While the example described above contemplates examples where the polarizing array 406 includes nanowires having different orientations, any type of polarizing array 406 may be used. The preference is to place these grids on the anode and cathode of the respective photodiode elements. Forming the polarization sensitive photodiode yields the advantage of increasing the effective angular signal from the surface and the accuracy of the 3D measurements due to the elimination of noise in the SPI sensor. An advantage of using the polarizing array 406 as a filter for various orientations of the EM radiation 104 is that it allows the SPI systems 100, 200 to generate spatial phase data having a high dynamic range (e.g., since noise in the EM radiation 104 is substantially reduced). Such noise (e.g., scattering) in the EM radiation 104 may, as an example, be generated when the EM radiation is emitted by, reflected off, or transmitted through various features (e.g., diffuse features) of the object 102. As another example, such noise in the EM radiation 104 may be generated by disperse media (e.g., mist, fog, smoke, or other obscurants) located in the environment between the SPI systems 100, 200 and the object 102.

In some examples, the EM detector 400 includes readout circuitry that captures the intensities of the EM radiation 104 recorded by each of the pixels 402a, 402b, 402c and 402d. The readout circuitry provides such intensities of the EM radiation 104 at each of the orientations (e.g., 0-degrees, 45-degrees, 90-degrees, 135-degrees) to its dedicated edge processor 108 or 212 for further processing to generate first- and second-order primitives. As an example, the edge processors 108 or 212 extract angular information and other base "primitive" attributes from known physics. A combination of Stokes equations, with intensity vectors and calibration performed by Mueller matrix approaches coupled with Degree of Linear Polarization and theta measurements allows the edge processors 108 or 212 to derive properties such as normals to surface, elliptical form of surface, index of refraction, material structures, etc. Surfaces and shapes can also be segmented from broad scenes.

For example, supposing that in the examples shown in FIGS. 4A and 4B, i0 is the intensity detected (e.g., in number of counts) at the pixel 402a having the 0-degree polarizer, i45 is the intensity detected at the pixel 402b having the 45-degree polarizer, i90 is the intensity detected at the pixel 402c having the 90-degree polarizer, i135 is the intensity detected at the pixel 402d having the 135-degree polarizer, and iRHC and iLHC are the intensities of right-handed circular polarization and left-handed circular polarization, respectively, then the edge processors 108, 212 may define an intensity array I as follows:

$$I = \begin{pmatrix} i0 \\ i45 \\ i90 \\ i135 \\ iRHC \\ iLHC \end{pmatrix}$$

In the example shown above, it is assumed that the EM detector 400 also includes pixels that are sensitive to the intensities of right-handed circular polarization and left-handed circular polarization.

The edge processors 108, 212 may subsequently determine a Stokes vector, which may be expressed as follows:

$$2 * \begin{pmatrix} i0 \\ i45 \\ i90 \\ i135 \\ iRHC \\ iLHC \end{pmatrix} =$$

$$\begin{pmatrix} 1 & d0*\cos(2*(0+90)) & d0*(\sin(2*0)) & 0 \\ 1 & d45*\cos(2*(45+90)) & d45*(\sin(2*45)) & 0 \\ 1 & d90*\cos(2*(90+90)) & d90*(\sin(2*90)) & 0 \\ 1 & d135*\cos(2*(135+90)) & d135*(\sin(2*135)) & 0 \\ 1 & 0 & 0 & dRHC*\sin(2*(135-135)) \\ 1 & 0 & 0 & dLHC*\sin(2*(45+225)) \end{pmatrix} * \begin{pmatrix} s0 \\ s1 \\ s2 \\ s3 \end{pmatrix}$$

$$S = \begin{pmatrix} s0 \\ s1 \\ s2 \\ s3 \end{pmatrix}$$

where s0 in the amount of unpolarized EM radiation 104 (e.g., preferential to a 0-degree polarization), s1 is the amount of EM radiation 104 preferential to a 90-degree polarization, s2 is the amount of EM radiation 104 preferential to a 45-degree polarization, and s3 is the amount of EM radiation 104 preferential to a right-handed circular polarization.

The edge processors 108, 212 may define a diattenuation vector D as follows:

$$D = \begin{pmatrix} d0 \\ d45 \\ d90 \\ d135 \\ dRHC \\ dLHC \end{pmatrix}$$

where d0 is the diattenuation of pixel 402a having the 0-degree polarizer, d45 is the diattenuation of pixel 402b having the 45-degree polarizer, d90 is the diattenuation of pixel 402c having the 90-degree polarizer, d135 is the diattenuation of pixel 402d having the 135-degree polarizer, and dRHC and dLHC are the diattenuations of right-handed circular polarization and left-handed circular polarization, respectively.

In general, the diattenuation d for each of the pixels 402a, 402b, 402c, 402d may be determined by the edge processors 108, 212 as follows:

$$d = \frac{p-c}{p+c}.$$

where p is the intensity of a parallel polarized state and c is an intensity of a cross-polarized state. The diattenuation d of each of the pixels 402a, 402b, 402c, 402d may be a measure of an effectiveness of the polarizer, with a perfect polarizer having a diattenuation of 1.

The edge processors 108, 212 may relate the Stokes vectors with the intensity vectors as follows:

For the ideal case where all diattenuations d are equal to 1, the edge processors 108, 212 may relate the Stokes vectors with the intensity vectors as follows:

$$2 * \begin{pmatrix} i0 \\ i45 \\ i90 \\ i135 \\ iRHC \\ iLHC \end{pmatrix} = \begin{pmatrix} 1 & -1 & 0 & 0 \\ 1 & 0 & 1 & 0 \\ 1 & 1 & 0 & 0 \\ 1 & 0 & -1 & 0 \\ 1 & 0 & 0 & 1 \\ 1 & 0 & 0 & -1 \end{pmatrix} * \begin{pmatrix} s0 \\ s1 \\ s2 \\ s3 \end{pmatrix}$$

$$2 * \begin{pmatrix} i0 \\ i45 \\ i90 \\ tRHC \\ tLHC \end{pmatrix} = \begin{pmatrix} 0.4 & -0.5 & -0.1 & 0 \\ 0.4 & 0 & 0.4 & 0 \\ 0.4 & 0.5 & -0.1 & 0 \\ 0.6 & 0 & 0.1 & 0.5 \\ 0.6 & 0 & 0.1 & -0.5 \end{pmatrix} * \begin{pmatrix} s0 \\ s1 \\ s2 \\ s3 \end{pmatrix}$$

$$2 * \begin{pmatrix} s0 \\ s1 \\ s2 \\ s3 \end{pmatrix} =$$

$$\begin{pmatrix} \frac{1}{3} & \frac{1}{3} & \frac{1}{3} & \frac{1}{3} & \frac{1}{3} & \frac{1}{3} \\ -1 & 0 & 1 & 0 & 0 & 0 \\ 0 & 1 & 0 & -1 & 0 & 0 \\ 0 & 0 & 0 & 0 & 1 & -1 \end{pmatrix} * \begin{pmatrix} i0 \\ i45 \\ i90 \\ i135 \\ iRHC \\ iLHC \end{pmatrix} = \begin{pmatrix} 0.5 & 0 & 0.5 & 0.5 & 0.5 \\ -1 & 0 & 1 & 0 & 0 \\ -1 & 2 & -1 & 0 & 0 \\ 0 & 0 & 0 & 1 & -1 \end{pmatrix} * \begin{pmatrix} i0 \\ i45 \\ i90 \\ iRHC \\ iLHC \end{pmatrix}$$

$$2 * \begin{pmatrix} s0 \\ s1 \\ s2 \end{pmatrix} = \begin{pmatrix} 1 & 0 & 1 & 0 \\ -1 & 0 & 1 & 0 \\ 0 & 1 & 0 & -1 \end{pmatrix} * \begin{pmatrix} i0 \\ i45 \\ i90 \\ i135 \end{pmatrix} = \begin{pmatrix} 1 & 0 & 1 \\ -1 & 0 & 1 \\ -1 & 2 & -1 \end{pmatrix} * \begin{pmatrix} i0 \\ i45 \\ i90 \end{pmatrix}$$

For a non-ideal case where at least one diattenuation d is less than 1, the edge processors 108, 212 may relate the Stokes vectors with the intensity vectors as follows:

$$2 * \begin{pmatrix} i0 \\ i45 \\ i90 \\ i135 \\ iRHC \\ iLHC \end{pmatrix} = \begin{pmatrix} 1 & -d0 & 0 & 0 \\ 1 & 0 & d45 & 0 \\ 1 & d90 & 0 & 0 \\ 1 & 0 & -d135 & 0 \\ 1 & 0 & 0 & dRHC \\ 1 & 0 & 0 & -dLHC \end{pmatrix} * \begin{pmatrix} s0 \\ s1 \\ s2 \\ s3 \end{pmatrix} =$$

$$\begin{pmatrix} d0 & \frac{1-d0}{2} & 0 & \frac{1-d0}{2} & 0 & 0 \\ \frac{1-d45}{2} & d45 & \frac{1-d45}{2} & 0 & 0 & 0 \\ 0 & \frac{1-d90}{2} & d90 & \frac{1-d90}{2} & 0 & 0 \\ \frac{1-d135}{2} & 0 & \frac{1-d135}{2} & d135 & 0 & 0 \\ 0 & 0 & 0 & 0 & \frac{1+dRHC}{2} & \frac{1-dRHC}{2} \\ 0 & 0 & 0 & 0 & \frac{1-dLHC}{2} & \frac{1+dLHC}{2} \end{pmatrix} *$$

$$\begin{pmatrix} 1 & -1 & 0 & 0 \\ 1 & 0 & 1 & 0 \\ 1 & 1 & 0 & 0 \\ 1 & 0 & -1 & 0 \\ 1 & 0 & 0 & 1 \\ 1 & 0 & 0 & -1 \end{pmatrix} * \begin{pmatrix} s0 \\ s1 \\ s2 \\ s3 \end{pmatrix}$$

Figure 5:
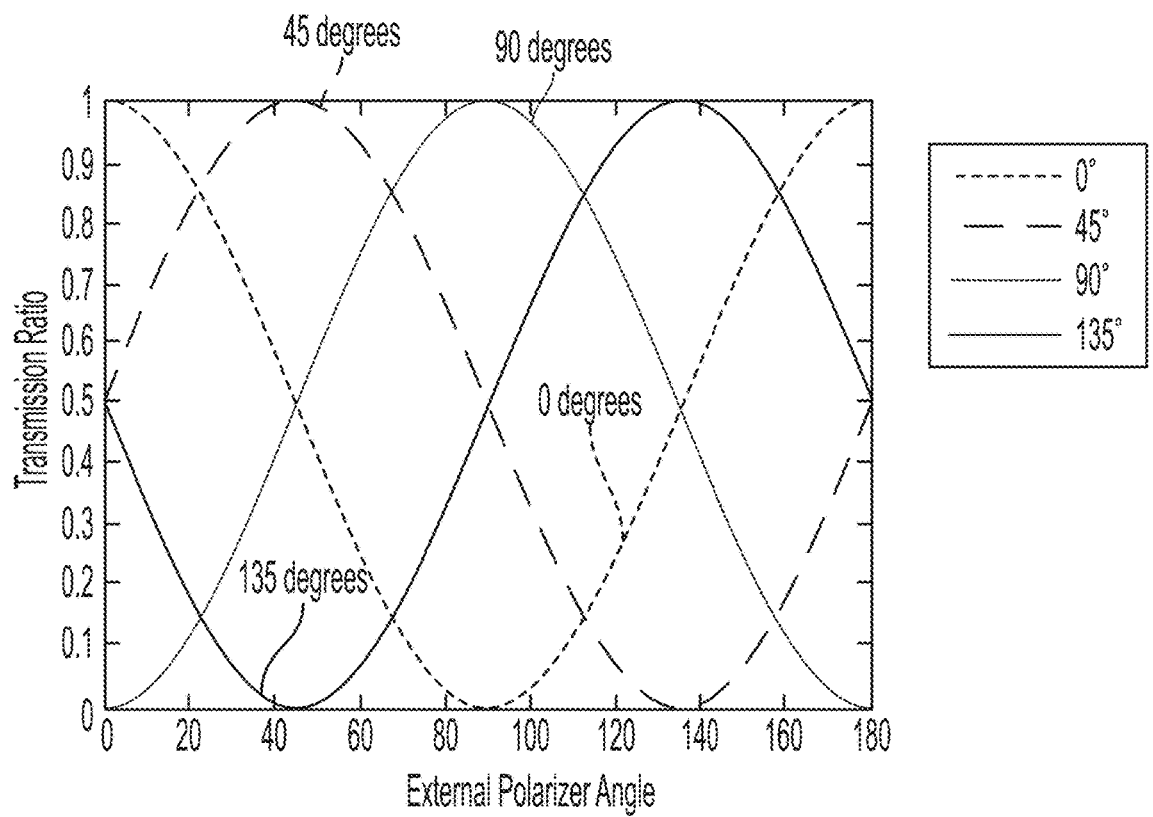
FIG. 5 shows an example plot of an ideal transmission ratio when electromagnetic radiation passes through two polarizers at different orientations.

The edge processors 108, 212 may also be configured to determine a Mueller matrix calibration. For example, when EM radiation 104 passes through two polarizers at orientations $\theta_1$ and $\theta_2$, a theoretical transmission ratio is $\cos^2(\theta_1-\theta_2)$. For the example, for the polarizing array 406 shown in FIGS. 4A and 4B (e.g., having the 0-degree, 45-degree, 90-degree, and 135-degree polarization filters), an ideal transmission ratio is as depicted in FIG. 5. In the example of FIG. 5, the maximum point on the curve is the parallel polarized state while the minimum point is the cross-polarized state. Many other properties can also be derived from this, such as the ratio of unpolarized to polarized, the elliptical form of the surfaces of the object 102, the index of refraction of materials of the object 102, whether the materials of the object 102 is organic or materials, and an indication of the structure of the materials of the object 102, to name a few.

In practice, the intensities i (e.g., included in the intensity array I) have the following form $i=a+b*\cos^2(\theta_1-\theta_2+c)$. The above-mentioned Mueller matrix corrects for rotational errors (e.g. errors in the value c) and diattenuation errors (e.g., errors in the value a) that are induced by a non-ideal polarizing array 406. The corrected intensity array I' may be expressed as follows:

$$I' = \begin{pmatrix} i0' \\ i45' \\ i90' \\ i135' \end{pmatrix} = \begin{pmatrix} 1 & -1 & 0 \\ 1 & 0 & 1 \\ 1 & 1 & 0 \\ 1 & 0 & -1 \end{pmatrix} * \begin{pmatrix} 1 & -d0 & 0 \\ 1 & 0 & d45 \\ 1 & d90 & 0 \\ 1 & 0 & -d135 \end{pmatrix}^{-1} * \begin{pmatrix} i0 \\ i45 \\ i90 \\ i135 \end{pmatrix} = \begin{pmatrix} 1 & -1 & 0 \\ 1 & 0 & 1 \\ 1 & 1 & 0 \\ 1 & 0 & -1 \end{pmatrix} *$$

$$\begin{pmatrix} 0.25 & 0.25 & 0.25 & 0.25 \\ -0.5 & 0 & 0.5 & 0 \\ 0 & 0.5 & 0 & -0.5 \end{pmatrix} * \begin{pmatrix} d0 & \frac{1-d0}{2} & 0 & \frac{1-d0}{2} \\ \frac{1-d45}{2} & d45 & \frac{1-d45}{2} & 0 \\ 0 & \frac{1-d90}{2} & d90 & \frac{1-d90}{2} \\ \frac{1-d135}{2} & 0 & \frac{1-d135}{2} & d135 \end{pmatrix}^{-1} *$$

$$\begin{pmatrix} i0 \\ i45 \\ i90 \\ i135 \end{pmatrix} = \begin{pmatrix} 0.75 & 0.25 & -0.25 & 0.25 \\ 0.25 & 0.75 & 0.25 & -0.25 \\ -0.25 & 0.25 & 0.75 & 0.25 \\ 0.25 & -0.25 & 0.25 & 0.75 \end{pmatrix} *$$

$$\begin{pmatrix} d0 & \frac{1-d0}{2} & 0 & \frac{1-d0}{2} \\ \frac{1-d45}{2} & d45 & \frac{1-d45}{2} & 0 \\ 0 & \frac{1-d90}{2} & d90 & \frac{1-d90}{2} \\ \frac{1-d135}{2} & 0 & \frac{1-d135}{2} & d135 \end{pmatrix}^{-1} * \begin{pmatrix} i0 \\ i45 \\ i90 \\ i135 \end{pmatrix}$$

For the case of rotating polarizers or each pixel having different polarization rotations, a corrected diattenuation vector D' may be determined by the edge processors 108, 212 as follows:

$$D' = \begin{pmatrix} d0' \\ d45' \\ d90' \\ d135' \end{pmatrix}, \text{ where } d' = \frac{(p_{max} - p_{min}) - (c_{max} - c_{min})}{(p_{max} - p_{min}) + (c_{max} - c_{min})}.$$

where p is the intensity of a parallel polarized state, c is an intensity of a cross-polarized state, the subscript max indicating the brighter backlit intensity, and the subscript min indicating the dimmer backlit intensity.

As discussed above, the percentage of linear polarization in the EM radiation 104 when reflected from a surface of the object 102 (e.g., indicated in FIG. 3A as a degree of linear polarization, DoLP) may be directly correlated to the direction cosine of the original EM energy incident on the object 102. Furthermore, the primary angle of the reflected linearly polarized light, which is indicated as Theta in FIG. 3A, may be mathematically related to the in-plane angle of the reflecting surface. The edge processors 108, 212 may determine the degree of linear polarization DoLP and the angle of linear polarization Theta as follows:

$$\theta = 0.5 * a\tan2(s2, -s1)$$

$$DoLP = \frac{\sqrt{s1^2 + s2^2}}{s0}$$

The angle Theta may be in a range from $-/2$ to $\pi/2$, with 0 radians indicating a linear polarization pointing up in image space (e.g. as seen in FIG. 3B). Consequently, the angle Theta encodes the in-plane angle of a normal to a surface of the object 102 or portion thereof captured by the pixel. The degree of linear polarization DoLP may be in a range from 0 to 1. The value 0 for the degree of linear polarization DoLP may indicate a completely unpolarized scene, while the value 1 for the degree of linear polarization DoLP may indicate a completely polarized scene. Consequently, the degree of linear polarization DoLP encodes the out-of-plane angle of a normal to a surface of the object 102 or portion thereof captured by the pixel.

In addition to the degree of linear polarization DoLP and angle Theta, several other measures of polarization may be determined by the edge processors 108, 212. For example, the edge processors 108, 212 may determine a degree of circular polarization (DoCP) and a total degree of polarization (DoP) as follows:

$$DoCP = \frac{s3}{s0}$$

$$DoP = \frac{\sqrt{s1^2 + s2^2 + s3^2}}{s0}$$

In general, the degree of circular polarization DoCP may be in a range from −1 (indicating a 100% left circular polarization) to +1 (indicating a 100% right circular polarization), with 0 indicating no circular polarization. The total degree of polarization DoP indicates the degree of both circular and linear polarization and may be in a range from 1 (representing a completely polarized scene) to 0 (representing a completely unpolarized scene).

Based on the above-described measures, the edge processors 108, 212 may determine the surface normal vector for each for each pixel as follows:

$$\begin{pmatrix} nx \\ ny \\ nz \end{pmatrix} = \begin{pmatrix} -\sin(\gamma) * \sin(\theta) \\ \sin(\gamma) * \cos(\theta) \\ \cos(\gamma) \end{pmatrix}$$

where nx, ny, nz are the x, y, and z coordinates of the surface normal vector, where γ is the out-of-plane angle, and θ is the in-plane angle.

As seen from the discussion above, the edge processors 108, 212 generate first- and second-order primitives based on the spatial phase data from their respective image sensors 106, 204. In the example above, first-order primitives include the above-described intensities i0, i45, i90, and i135, and the intensities of red, blue, and green light (e.g., in implementations where a color-sensitive EM detector 400— is used). In the example above, second-order primitives include the above-described Stokes parameters s0, s1, s2, and s3; the diattenuation values d0, d45, d90, and d135; the angle of linear polarization Theta; the degree of linear polarization DoLP; the out-of-plane angle γ of the surface normal vector; the x, y, and z coordinates of the surface normal vector (e.g., nx, ny, nz described above); the ideal surface normals calculated for an ideal surface; the corrected surface normals; and the variables in the Mueller matrix.

With each pixel now being able to represent various attributes of the object 102 (e.g., as expressed through the first- and second-order primitives), the edge processors 108, 212 can cluster pixels having similar attributes into panels and can segment these panels from other dissimilar pixels or panels. In some implementations, a pixel cluster is identified by clustering pixels having attribute values in a predetermined interval of values. For example, pixels having attribute values within a 10 percent variation from a predetermined value or a mean value, etc. may be clustered in some instances. This specific pixel cluster can be used to define the surface of an object by grouping multiple pixels with attribute values in a predefined interval. The clustered and segmented parameters form a family of representations called pXSurface and pXShape, where "X" defines the attribute type. In the example discussed above, the attribute set associated with the normals to the surfaces of the object 102 and the corresponding frequency broadband distribution captured for each pixel is denoted as a pNSurface and pNShape description of the object 102, where "N" denotes the surface normal vectors or orientations.

The above-described surface normal vectors or orientations in the x-, y-, and z-directions are merely one example of the attributes of the object 102 that may be determined by the edge processors 108, 212. Other examples of first- and second-order primitives that can be determined by the edge processors 108, 212 include: the shapes and surface anomalies of the object; surface roughness of the object; material analysis of the object; lighting analysis of the object; edges, occlusions, blobs, masks, gradients, and interior volume features of the object; surface/pixel geometry of the object; a frequency distribution of the EM radiation 104 received from the object; color and intensity information of object; EM spectrum information of the object (from any band of the EM spectrum); the degree of linear polarization, angle of polarization, angle of linear polarization, angle of incidence, angle of reflection, angle of refraction, depolarization factor, principal curvatures, mean curvature, Gaussian curvature, synthetic skin or lighting, unpolarized scatter, ellipticity, albedo, the index of refraction, cluster of angles, surface angles, slope vectors, angular relationships, rate of slope, surface scattering, specular/diffuse scattering, propagation scattering of the object; pixel-to-pixel clusters; 3D object or scene detection; distance tracking; scene reconstruction; object mapping; surface characterization; and others. Therefore, the object 102 may be represented by a broad number of parameters and by the family of pXSurface and pXShape representations. The object can also be represented by any other shape-based data, examples being depth values, point cloud sets, mesh sets, etc. The other shape-based data can be integrated into the approaches described in this disclosure. This data can be captured by other sensor systems such as lidar, structured light, etc.

In a specific example drawn from the example first- and second-order primitives presented above, principal curvatures (which measure the maximum and minimum of the normal curvature at a given point on a surface) can be calculated by the edge processors 108, 212 as:

$K=1/R,$ where R is the radius of curvature at the given point if the curvature at the given point is fitted to a circle. The maximum principal curvature ($K_1$) and the minimum principal curvature ($K_2$) are the maximum and minimum values, respectively, of this function at the given point. In the SPI systems 100, 200, the principal curvatures may describe whether changes in surfaces are presented compared to an expected surface.

In another specific example drawn from the example first- and second-order primitives presented above, Gaussian curvature can be calculated by the edge processors 108, 212 from the product of the maximum principal curvature ($K_1$) and the minimum principal curvature ($K_2$) as follows:

$K=K_1 K_2.$

In the SPI systems 100, 200, the Gaussian curvature may be used to describe a shape around each pixel, thus informing expected shape, deviation from shape, and estimation of surface roughness.

In another specific example drawn from the example first- and second-order primitives presented above, mean curvature, H, can be calculated by the edge processors 108, 212 as the average of the maximum principal curvature ($K_1$) and the minimum principal curvature ($K_2$) as follows:

$H=0.5(K_1+K_2).$

In the SPI systems 100, 200, the mean curvature can be used to describe the degree of change in curvature around a cluster of pixels.

In another specific example drawn from the example first- and second-order primitives presented above, surface roughness can be useful both as an input for sensor data parameter handling and as an output for surface analysis. In the SPI systems 100, 200, surface roughness estimation can utilize polarization information in a bi-directional reflectance distribution function. For example, the edge processors 108, 212 can estimate surface roughness using Mueller matrix calculus to relate Stokes parameters calculated from polarization values to S (which is the Stokes parameter describing total intensity) as follows:

$$\lim_{I_i \to 0}\left(\frac{\Phi_r}{I_i}\right) = f_r \Phi_i \theta_r,$$

where $\Phi_r$ is the average scattered Stokes vector power; where $I_i$ is the power of the EM radiation incident on a surface (which could be estimated through a combination of analysis of shadows and lighted areas, off-the-shelf lighting estimation, user input, and sensor auto-exposure settings; where $f_r$ is the Mueller matrix BRDF function; where $\Phi_i$ is the Stokes vector describing total power calculated from sensor input; and where $\theta_r$ is the angle of polarization. Another method to estimate surface roughness can be measuring the variability in surface normals derived from a shape from polarization approaches.

In another specific example drawn from the example first- and second-order primitives presented above, plane fit smoothing can be calculated by the edge processors 108, 212 and used to smooth a rough mesh by considering only those points within a small neighborhood around each pixel. An example method of performing plane fit smoothing is the following series of steps:

```
Start
1. Set the kernel size (k) for the local neighborhood (e.g. k = 65 would
yield a 65x65 pixel kernel).
2. Set a maximum Z difference (DeltaZMax) (e.g. DeltaZMax = 1 mm)
3. For each pixel (p_target) in the mesh:
   3a. Line of sight (LOS) = line pointing from (0, 0, 0) to the (x, y, z)
   position for that pixel.
   3b. Consider all other pixels (p_i) within a kernel of size k centered
   on p_target, such that:
      The p_i is not masked out, and
      The absolute value of the difference in the z-components of p_i
      and p_target is no greater than DeltaZMax.
   3c. Fit a plane (P) to the set of all valid p_i.
   3d. The new position of p_target is the point of intersection between
   LOS and P.
End
```

Figure 6:
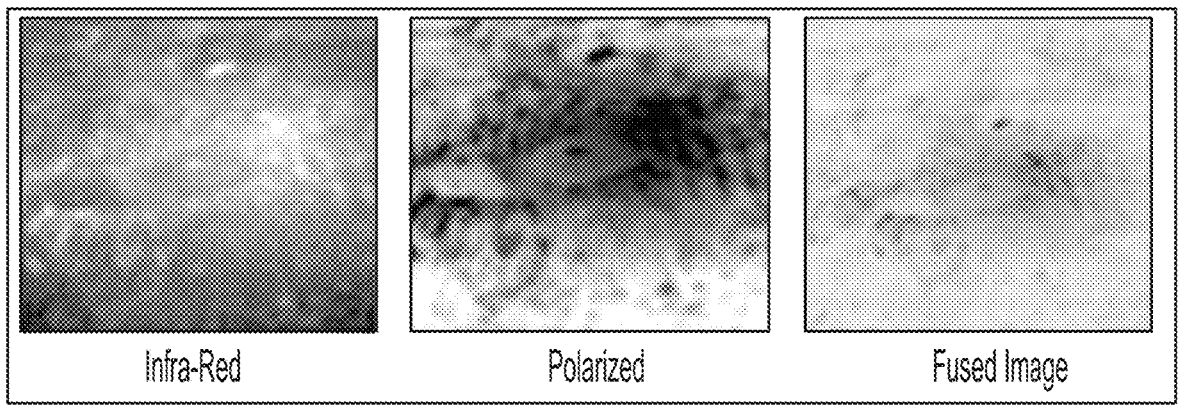
FIG. 6 shows an example of images obtained from EM radiation passing through a gradient layer.

The above examples represent some of the numerous parameters that can be calculated by the edge processors 108, 212. The representations pXSurface and pXShape are distinct from traditional point cloud or mesh representations of shape. For example, the normal to the surface and the frequency of the spectrum are captured for each pixel in the SPI systems 100, 200, thus creating a frequency distribution as well as the normal distribution. The raw sensor output is also converted in real-time or near-time to create the pNSurface and the pNShape representations. The pixel normal surface (pNSurface) is the topological representation of pure reflection from a surface of the object 102, or the passage of EM radiation through a gradient layer which can then also be represented as the pNSurface. For example, FIG. 6 shows an example of images obtained from EM radiation passing through a gradient layer. Specifically, the images shown in FIG. 6 depict the infrared, polarized, and fused images of a land mine (the object of interest) buried in 4 to 6 inches of soil. Consequently, the SPI systems 100, 200 can capture the actual surfaces of the object 102 (regardless of whether or not it is surrounded by a gradient layer) as a distinct entity in real-time or near-time. In contrast, current sensors can only capture pure reflection from a surface of the object 102 and create the "surface" of the object 102 as a set of points (e.g., in a point cloud representation) or a mesh (triangular interconnected wedges) representing the surface which must be created as post-processing of the raw data capture. In addition to providing pixel normal surface (pNSurface) and frequency information, the example SPI systems 100, 200 also provide the advantage of upward and downward compatibility with any currently available imaging modality. The 3D distribution of the normal provides added insight into the relationships among the surfaces. Specifically, the relationship among these pixels are invariant to orientation in the physical world allowing for tracking of shapes of the object 102 (as discussed in further detail below).

The edge processors 108, 212 can also perform first derivative analysis (e.g., analysis of first-order primitives) and second derivative analysis (e.g., analysis of second-order primitives) on a shape or surface in a single frame, and also perform analysis in a time sequence allowing for vector information (e.g., acceleration, speed, and orientation) to be provided for analysis at the shape level. Consequently, the edge processors 108, 212 can perform calculations at the pixel level all the way up to pXSurface and pXShape levels, both in a single frame and over a time sequence of multiple frames.

A significant number of applications (e.g. autonomous driving, scene segmentation, etc.) can be constructed based on just this set of data (e.g., pXSurface and pXShape) without any further analysis, since these applications don't require any further knowledge about the surface other than its existence, extent and location in a defined coordinate space.

Figure 7A:
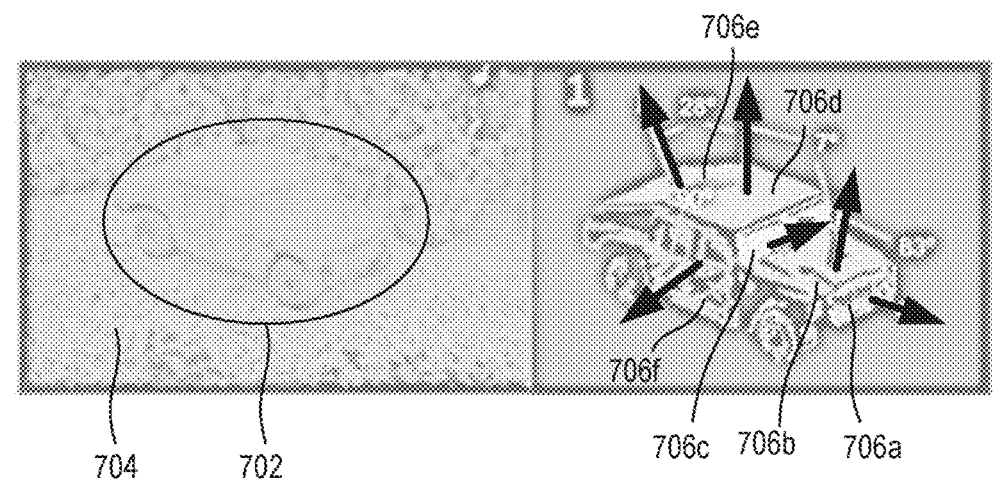
FIGS. 7A to 7C illustrate how the concept of surface and shape orientation invariance can be used in autonomous tracking.
Figure 7B:
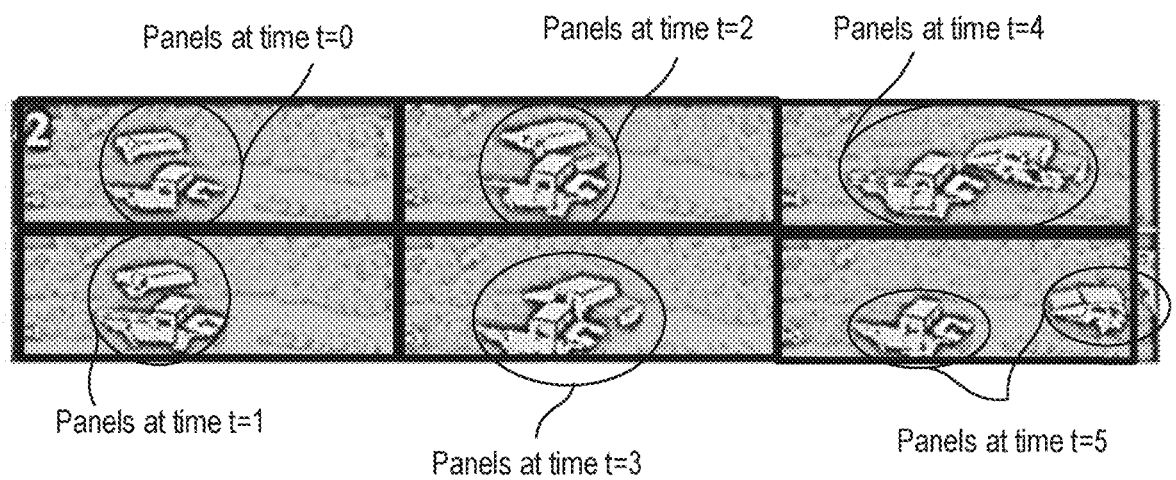
Figure 7C:
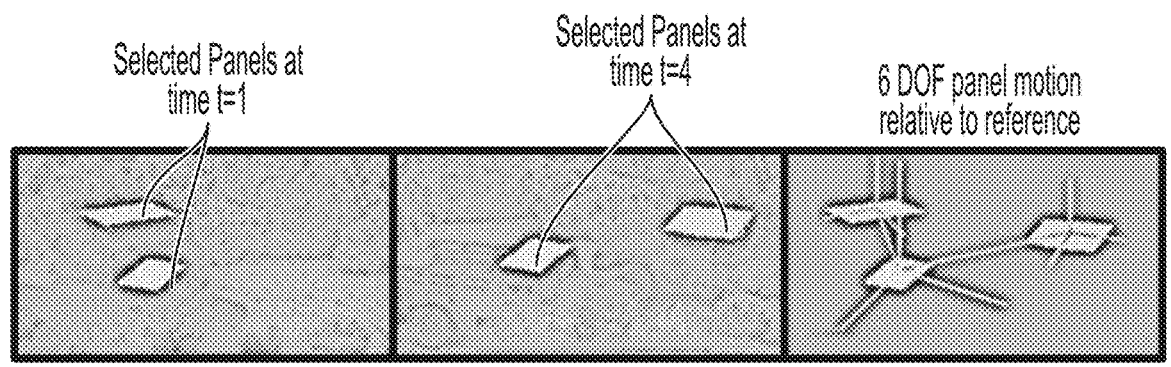

FIGS. 7A to 7G illustrate how pXSurface and pXShape data can be used to achieve autonomy in various contexts. Specifically, FIGS. 7A to 7C illustrate how the concept of surface and shape orientation invariance can be used in autonomous tracking. FIGS. 7D to 7G illustrate how the concept of surface and shape range invariance can be used in autonomous tracking.

Referring first to FIGS. 7A to 7C, FIG. 7A shows an example of calculating shape identities of an object (e.g., a Humvee) in a single frame. FIGS. 7B and 7C show examples of autonomously tracking shape identities of an object (e.g., a Humvee) over a time sequence of multiple frames. FIGS. 7A to 7C illustrate the concept of surface-shape orientation invariance, with a focus on angular relationships. The examples shown in FIGS. 7A to 7C use the example of visible and ambient infrared (IR) emissions, although, as discussed above, SPI imaging works over all wavelengths of the EM spectrum. Furthermore, FIGS. 7A to 7C focus on identification of an object in a scene and the invariant relationship of flat panels to translation, rotation & distance. As discussed above, each pixel represents some attribute of the object 702 (e.g., the Humvee), and the edge processors 108, 212 can cluster pixels having similar attributes into panels 706 and can segment these panels 706 from other dissimilar pixels or panels. For example, the target object 702 (e.g., the Humvee) is extracted or segmented from the cluttered background 704 and clustered into panels 706a, 706b, 706c, 706d, 706e, 706f, each having an associated normal vector.

As seen in FIG. 7A, the angle relationship among the various panels 706 of the object (e.g. between the top panel 706d, the side panel 706f, and the windshield 706c) does not change. Stated differently, the geometric relationship among the various panels 706 of the object is invariant to orientation, translation and distance, regardless of the coordinate system used. This invariant geometric relationship can now be stored and processed as a surface panel with a normal for the entirety of the panel, slope vector set, and extent of pixels without the need to repeatedly process each and every pixel. This approach dramatically reduces the compute time and the size of the data that needs to be stored compared to conventional approaches.

FIGS. 7B and 7C show examples of calculating shape identities of an object (e.g., two Humvees) over a time sequence. As the target (e.g., the two Humvees) and camera move relative to each other, subsequent frames add more data and allow newly visible panels to be built and appended to the old. This capability allows for increased accuracy in target recognition from a priori panel catalogs as well as decreased occurrence of false positives. The ability to uniquely identify enrolled flat panels, independent of orientation angle, provides enhanced ability to determine speed, direction, and range. The relative motion of panels of known size between time-correlated data frames can provide target information (speed, heading, range, etc.). As illustrated in FIG. 7C, the movement of the object (e.g., the two Humvees) can be determined autonomously by processing only one of the panel relationships, thus resulting in significant reduction in compute time and enabling real time capability. For example, in FIG. 7C, the top panel of the Humvees is selected to determine the speed, direction, and range of the respective Humvees.

Figure 7D:
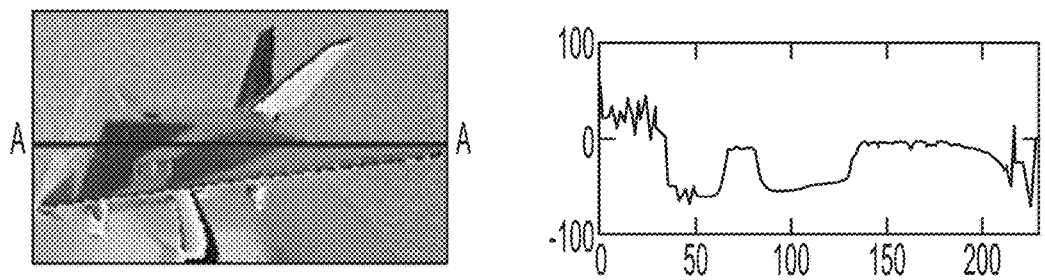
FIGS. 7D to 7G illustrate how the concept of surface and shape range invariance can be used in autonomous tracking.
Figure 7E:
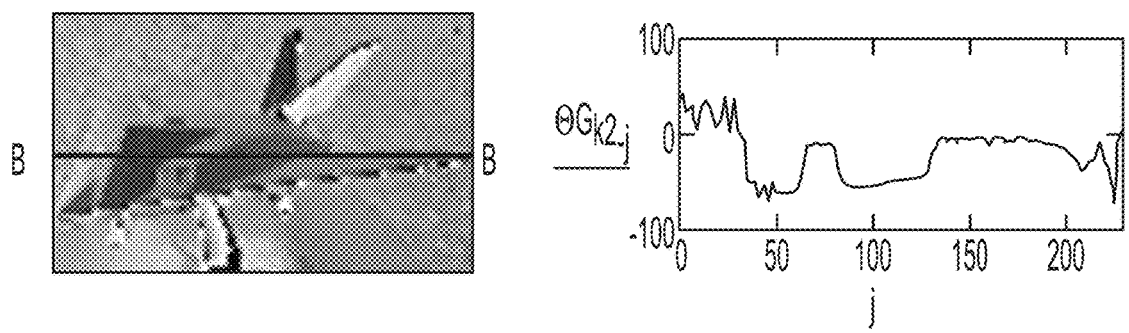
Figure 7F:
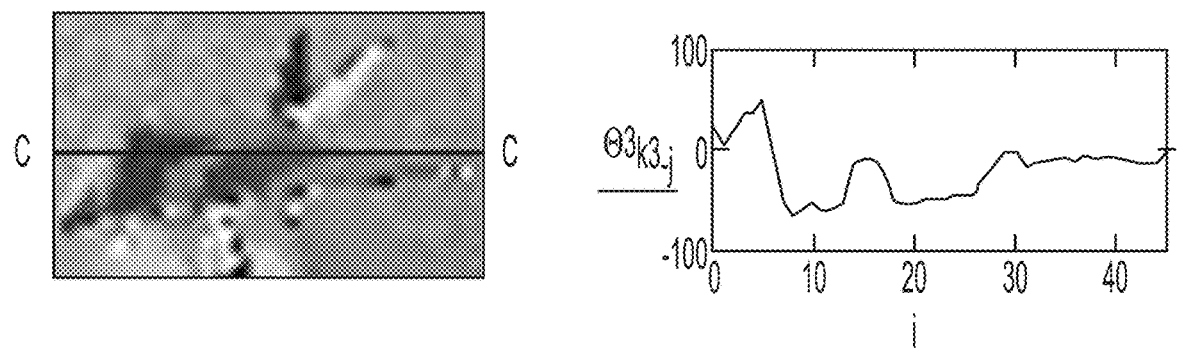
Figure 7G:
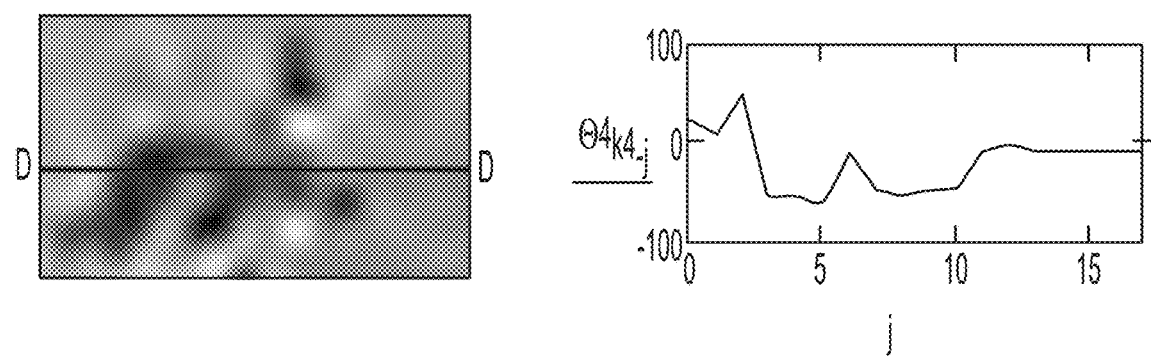

Referring now to FIGS. 7D to 7G, which show pNSurface images of an object (e.g., an aircraft) at various pixel resolutions. Range is simulated in FIGS. 7D to 7G by decreasing the number of pixels used to depict the object. In FIG. 7D, the object is depicted using 219×139 pixels, and a line plot of angular pixel data along the line A-A is also shown. In FIG. 7E, the object is depicted using 91×55 pixels, and a line plot of angular pixel data along the line B-B is also shown. In FIG. 7F, the object is depicted using 45×27 pixel resolution, and a line plot of angular pixel data along the line C-C is also shown. In FIG. 7G, the object is depicted using 17×10 pixel resolution, and a line plot of angular pixel data along the line D-D is also shown. As observed from the line plots shown in FIGS. 7D to 7G, angular data relationship among the various surfaces of the object is invariant to object orientation and range. For example, the peaks of the angular data plots (as well as the relative shape of the angular data plots) remain substantially the same even as the range changes. The concept of surface and shape range invariance can be used to autonomously track objects regardless of the ranges (or distances) from an SPI sensor.

The surface and shape identities and invariances work over all wavelengths of the EM spectrum and provide passive real-time or near-time: ranging; terrain mapping; classification & identification; and tracking. The surface and shape identities and invariances are usable any time in all types of lighting and most weather conditions; significantly reducing the challenges current sensor types have based on temperature, chemical composition, geometry and atmospheric conditions as well as data capture based on aperture, position, measurement modes and sensor performance. The benefits of the shape identities include, but are not limited to: complete 3D surface orientations and shapes with or without point clouds; objects can be recognized by kilobytes of data; the AI-enhanced object identifications and navigation can be applied in IR; the processing and solution are in real-time or near-time; complete 3D surface orientations and shapes with or without point clouds; and objects can be recognized by kilobytes of data-orders of magnitude less data for solutions. Further characterization of the object is possible from the richness of detailed information from the first- and second-order primitives. Examples include degree of linear polarization, theta, albedo, index of refraction, etc. which can be used to determine characteristics such as metal, wood, plastic, foliage to name a few.

The surface and shape orientation invariance (as well as the surface and shape range invariance) of pXSurface and pXShape data can be used to improve the current state of vehicle autonomy. Although existing sensors and autonomy routines remove some of the burden from the driver, the driver must be in control most of the time. However, new technological approaches are needed to get to Level 3 autonomy and beyond. As an example, scene segmentation requires a paradigm shift from high latency, compute intensive, 2D-to-3D active signal conversion to inherently 3D data that can be processed in real-time or near-time (e.g., in the millisecond range) and that can be obtained through passive surface and shape signal acquisition. As discussed above, SPI systems can calculations at the pixel level all the way up to pXSurface and pXShape levels (which are inherently 3D), both in a single frame and over a time sequence of multiple frames. Therefore, 3D SPI data can easily be used to improve the current state of vehicle autonomy.

Figure 8:
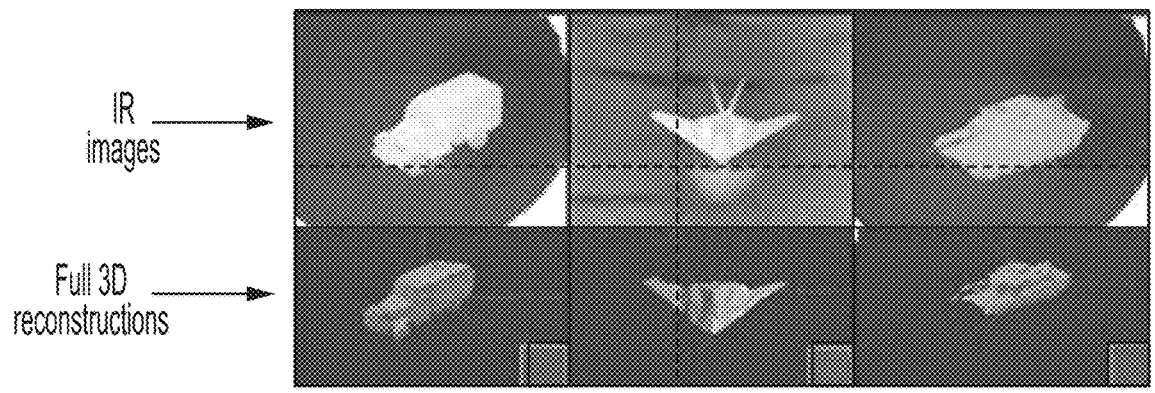
FIG. 8 shows an example of reconstructing a full 3D rendering from IR data.
Figure 9:
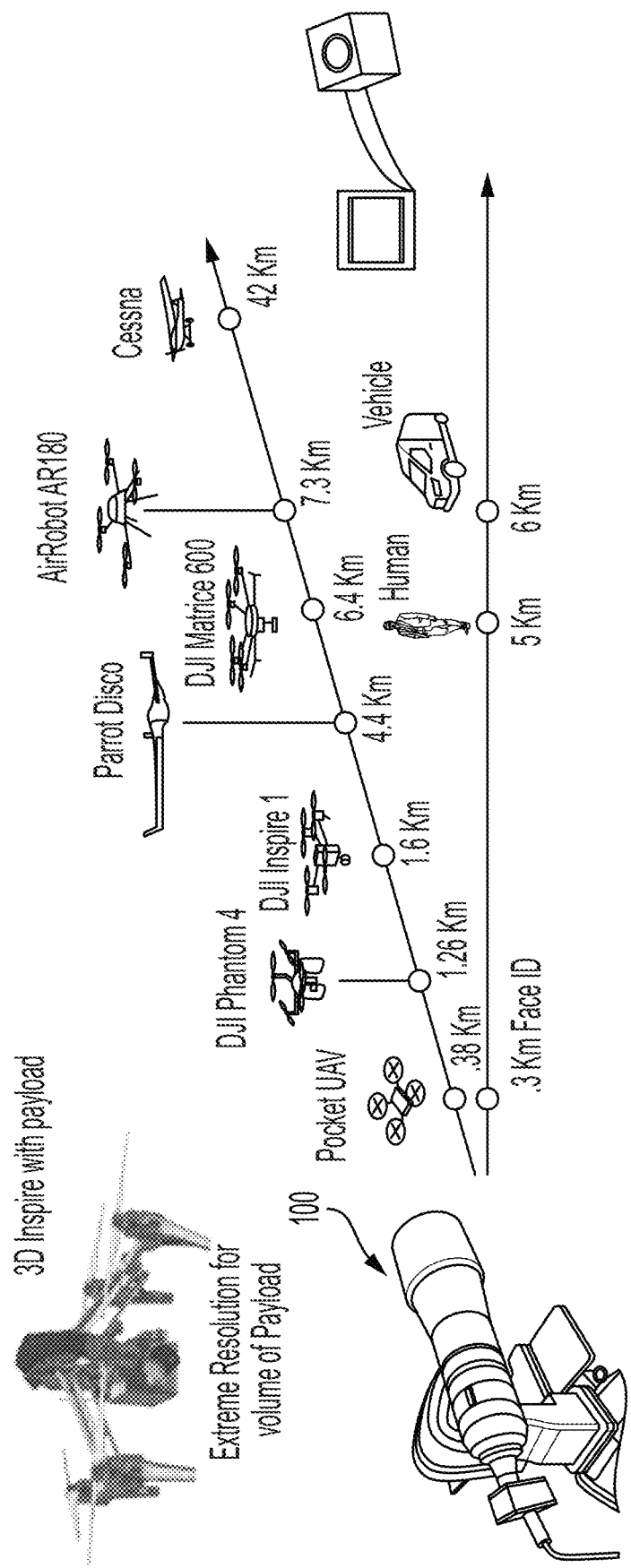
FIG. 9 shows an example of passive ranging, where an SPI system can identify, track, and analyze objects and scenes in three dimensions and at various distances.

FIG. 8 shows an example of reconstructing a full 3D rendering from IR data. Specifically, when required, a full 3D reconstruction can quickly be built with IR data alone. Combinations of IR data (e.g., SWIR, MWIR, LWIR) with visual data greatly improves the 3D reconstructions; however, 3D renderings are not a prerequisite to understand scenes and provide an autonomous solution. Terrain mapping can also be performed using IR data. In terrain mapping, the SPI systems 100, 200 capture and utilize: circular polarization with sensor components: index of refraction; material types; elliptical vectors; broadband color; 3D shape-based detection; 2D shape-based detection; occlusion boundary shapes; and surface normal. Other sensor data & analytics can also be included such as passive hyperspectral (active: laser & radar), as well as analytics from agriculture sector: terrain solutions, plant identifications, etc. Passive ranging can also be accomplished without 3D rendering or using a point clouds. FIG. 9 shows an example of passive ranging, where the SPI systems 100, 200 can identify, track, and analyze objects and scenes in three dimensions and at various distances. Passive ranging can be based on static objects or objects in motion. Passive ranging can be accomplished using the SPI systems 100, 200 through: motion in scene or motion of sensor; AI with a priori database; estimated through generic size models and parameters, and via 3D capture.

The example applications discussed above are merely some of a large, broad set of application areas for the SPI systems 100, 200. Other example of applications for the SPI systems 100, 200 include metrology, inspection, maintenance, navigation, facial recognition, security, situational awareness, entertainment, 3D printing, autonomy, healthcare, wound care, tracking, ranging to name a few. For example, the SPI systems 100, 200 may be used for: astronomy; research; nuclear analysis; material integrity analysis (e.g. to detect cracks and other material defects or anomalies); foreign object detection (e.g., to detect foreign objects that should not exist in specific materials); unique pattern identification (e.g., fingerprint matching or to identify other unique patterns on objects or areas of interest); material wear and tear (e.g., to analyze material surface condition); materials discrimination (e.g., to determine material properties and verification of finite element analysis); optical 3D dimensional deformation detection (e.g., to monitor real-time vehicle roof deformation that occurs in a high impact collision); bruise damage measurement and analysis, ice detection (e.g., to detect ice at various distances over various weather conditions); extended range 3D facial recognition; assessment of body conditions (e.g., to visualize fundamental aspects of muscle conditions in surfacing whales); identification of infrastructure states (e.g., to identify degradation of infrastructure components such as pipes, bridges, and rails); 3D volumetric body motion analysis (e.g., to map the trajectory of areas of the body without tagging); quality control and inspection of aircraft parts (e.g., to determine defects, wear and tear of parts, and preventative maintenance); determining angle of incidence on missile targets (e.g., to accurately determine measured difference between weapon body axes and the target axes of impact); scattering media visualization (e.g., to image under poor environmental conditions such as fog and haze); terrain navigation of unmanned vehicles (e.g., in complex terrain and urban environments where access to GPS and communications may be limited); face muscle tracking (e.g., for facial gesture recognition and tracking); camouflage discrimination (e.g., to discern camouflaged targets from scene surroundings); metal loss calculation (e.g., where a region of interest is identified, area and depth calculations are made, and comparison with ground truth results are within 98% of each other); corrosion blister calculations; surface profile calculations; etc.

Figure 10:
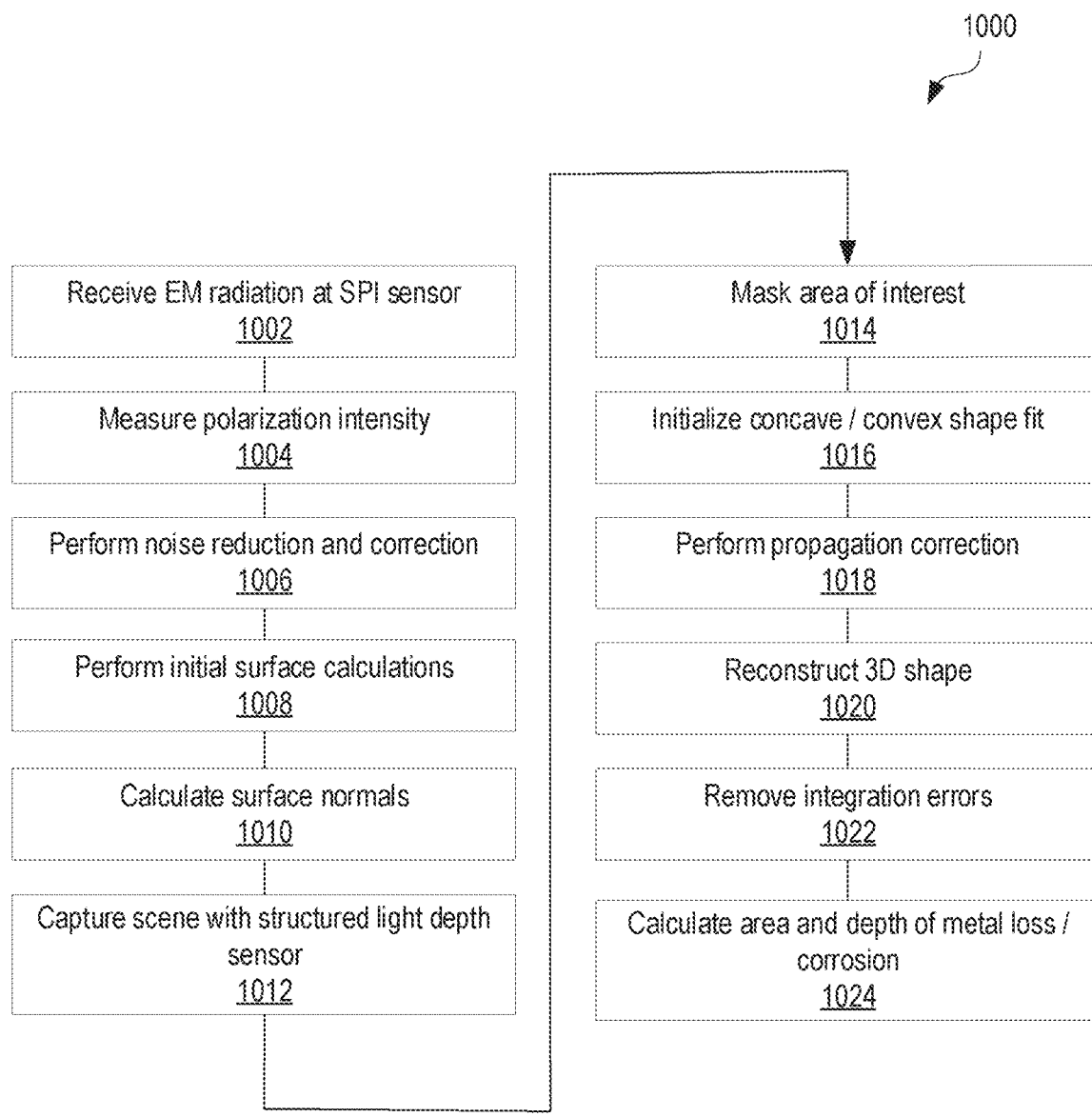
FIG. 10 shows a flowchart illustrating an example series of steps that can be performed for metal loss calculation or for corrosion blister calculation.

FIG. 10 shows a flowchart 1000 illustrating an example series of steps that can be performed for metal loss calculation or for corrosion blister calculation. In implementations where the flowchart 1000 is used for metal loss calculation, the flowchart 1000 can identify a region of interest and calculate the area and depth of metal loss. Comparison with ground truth results can be within 98% of each other. In implementations where the flowchart 1000 is used for corrosion blister calculation, the flowchart 1000 can identify bare metal, normal coating, and disturbed coating and corrosion, thereby enabling quantification of anomalies using ISO standards. In such examples of corrosion blister calculation, the flowchart 1000 also enables change measurement and deep analysis, performs multiple measurements per capture, and allows for 3D-referencing in a digital twin coordinate frame.

In the example of FIG. 10, steps 1002, 1004, and 1012 represent sensor data and initial processing; steps 1006, 1008, 1010, 1016, 1018, 1020, and 1022 represent processing by the edge processors 108, 212; and steps 1014 and 1024 represent information that is depicted or obtained from a user interface.

At step 1002, EM radiation reflects onto the SPI sensor. Specifically, at step 1002, EM radiation reflects off surfaces, and the reflected light is polarized by the surface and captured by the SPI sensor. At step 1004, the SPI sensor measures polarization intensity. Specifically, at step 1004, each pixel of the SPI sensor detects polarization intensity at various angles (e.g., 0-degrees, 45-degrees, 90-degrees, and 135-degrees). In some examples, if the scene and camera containing the SPI sensor are stationary, then a temporal average is used to assist in noise reduction. At step 1006, noise reduction and correction is performed. For example, software validates and corrects the data. Furthermore, dark frame correction, flat field correction, and Mueller correction is performed.

At step 1008, initial surface calculations are performed. Specifically, at step 1008, the degree of linear polarization (DoLP) and the angle of linear polarization (Theta) are determined. At step 1010, surface normals are calculated (e.g., using the DoLP and Theta determined at step 1008). As described above, in some cases, the SPI sensor can operate in cooperation with another type of sensor. Consequently, the example flowchart 1000 includes step 1012 of capturing a scene with a structured light depth sensor. In some examples, the structured light depth sensor is calibrated with the SPI sensor, and captured at the same time as the SPI sensor. The depth image is re-rendered with the polarization image for pixel matching. At step 1014, the area of interest is masked (e.g., manually masked) and separated from the whole image.

At step 1016, a concave or convex shape fit is initialized. In some examples of metal loss calculation, the concave shape is created by initializing the top- and bottom-most pixel surface normals as lower and upper hemispheres, respectively. In some examples of corrosion blister calculation, the convex shape is created by initializing the top- and bottom-most pixel surface normals as upper and lower hemispheres, respectively.

At step 1018, propagation correction is performed. In some examples, hemispherical correction of adjacent pixels is simultaneously done, with this step 1018 being repeated until all pixels in the feature have been corrected. At step 1020, a 3D shape is reconstructed. In some examples, using an integration method, SPI surface normals are reconstructed to reveal the underlying concave shape of the metal loss feature (e.g. in the case of metal loss calculation) or to reveal the underlying convex shape of the metal loss feature (e.g. in the case of corrosion blister calculation).

At step 1022, integration errors are removed. In some example, a multi-quadratic radial bias function removes ideal and SPI surface integration errors, while keeping high-frequency polarization reconstruction in the integrated shape. At step 1024, area and depth of the metal loss or corrosion is calculated. Depth can be determined by taking the difference in height between the crest or peak and the average height of the pixels at the circumference. Area can be calculated as a function of the number of pixels, FOV, and distance to target (e.g., depth sensor or manual entry).

Figure 11A:
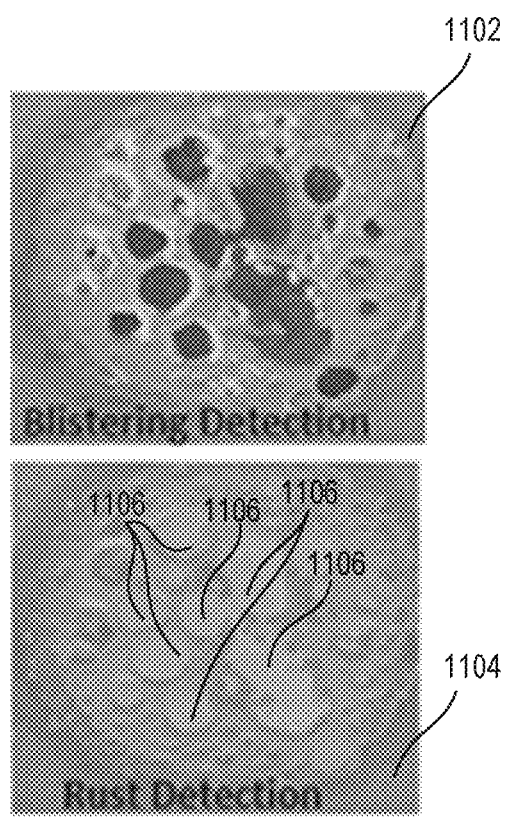
FIG. 11A shows example images obtained when the flowchart in FIG. 10 is applied to corrosion blister calculation.
Figure 11B:
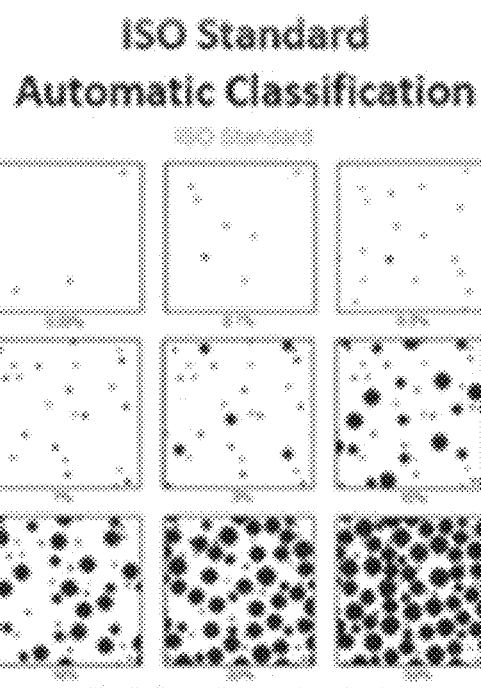
FIG. 11B shows the ISO standard of classification for the percentage of rust.

FIG. 11A shows example images obtained when the flowchart 1000 is applied to corrosion blister calculation. For example, the image 1102 illustrates the extent of blistering in an object or region of interest, while image 1104 illustrates regions 1106 where rust is detected. FIG. 11B shows the ISO standard of classification for the percentage of rust. In some implementations, the images shown in FIG. 11A can be easily obtained and compared to the ISO standard of classification shown in FIG. 11B to quantify the percentage of rust using ISO standards.

Figure 12:
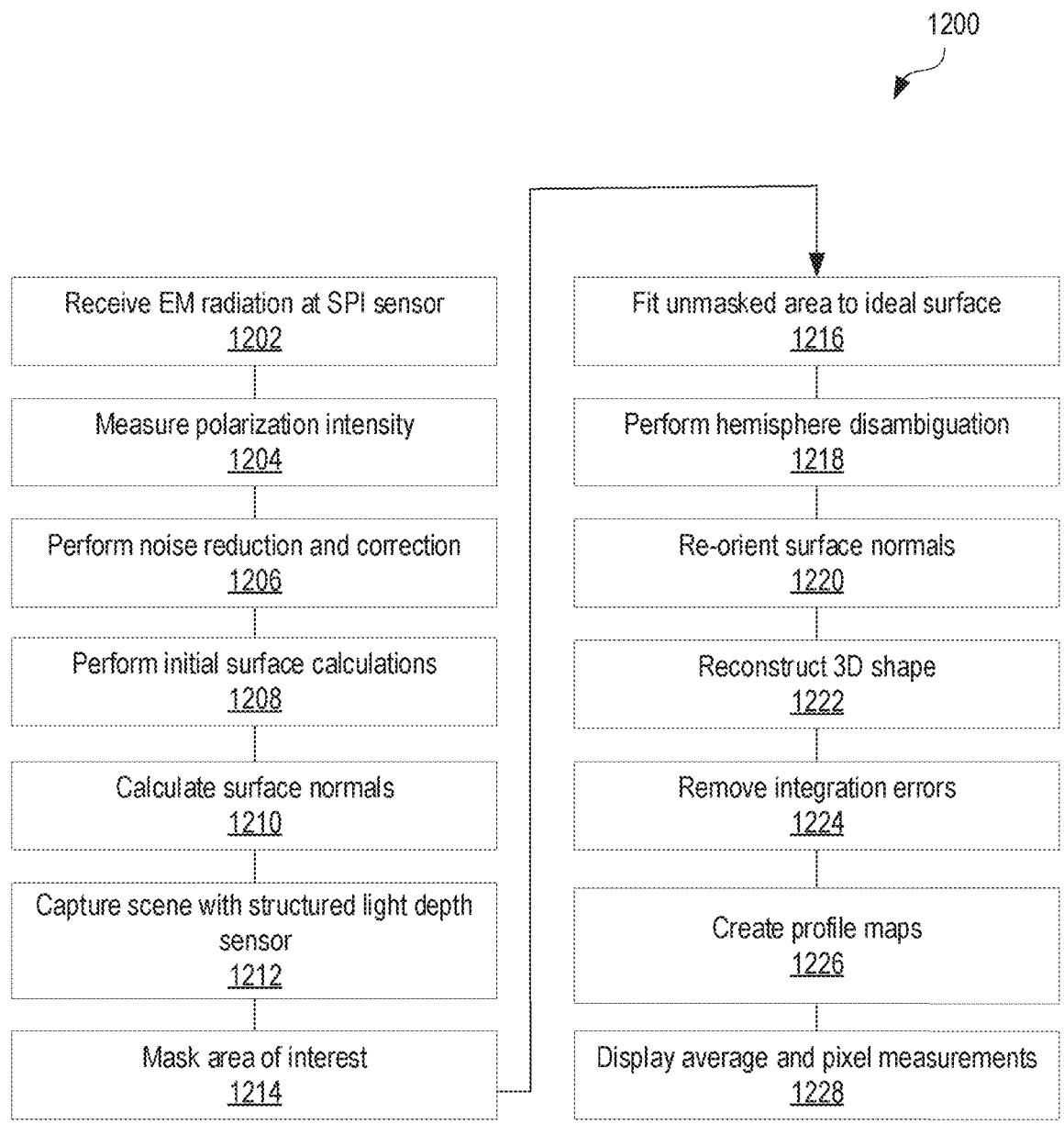
FIG. 12 shows a flowchart illustrating an example series of steps that can be performed for surface profile calculations.

FIG. 12 shows a flowchart 1200 illustrating an example series of steps that can be performed for surface profile calculations. In implementations, the method depicted in FIG. 12 can measure the surface profile across an entire area of interest, a specifically defined area, or over a single pixel. In the example of FIG. 12, steps 1202, 1204, and 1212 represent sensor data and initial processing; steps 1206, 1208, 1210, 1216, 1218, 1220, 1222, 1224, and 1226 represent processing by the edge processors 108, 212; and steps 1214 and 1228 represent information that is depicted or obtained from a user interface.

At step 1202, EM radiation reflects onto the SPI sensor. Specifically, at step 1202, EM radiation reflects off surfaces, and the reflected light is polarized by the surface and captured by the SPI sensor. At step 1204, the SPI sensor measures polarization intensity. Specifically, at step 1204, each pixel of the SPI sensor detects polarization intensity at various angles (e.g., 0-degrees, 45-degrees, 90-degrees, and 135-degrees). In some examples, if the scene and camera containing the SPI sensor are stationary, then a temporal average is used to assist in noise reduction. At step 1206, noise reduction and correction is performed. For example, software validates and corrects the data. Furthermore, dark frame correction, flat field correction, and Mueller correction is performed.

At step 1208, initial surface calculations are performed. Specifically, at step 1208, the degree of linear polarization (DoLP) and the angle of linear polarization (Theta) are determined. At step 1210, surface normals are calculated (e.g., using the DoLP and Theta determined at step 1208). As described above, in some cases, the SPI sensor can operate in cooperation with another type of sensor. Consequently, the example flowchart 1200 includes step 1212 of capturing a scene with a structured light depth sensor. In some examples, the structured light depth sensor is calibrated with the SPI sensor, and captured at the same time as the SPI sensor. The depth image is re-rendered with the polarization image for pixel matching. At step 1214, the area of interest is masked (e.g., manually masked) and separated from the whole image.

At step 1216, the unmasked area is fit to an ideal surface. At step 1218, hemisphere disambiguation is performed. In some examples, SPI normals are compared to ideal surface normals, and SPI normals closest to the ideal surface normals are selected. At step 1220, surface normals re-orientation is performed. In some examples, both SPI and ideal normals are averaged. The transformation routine at step 1220 rotates the average SPI normals to average ideal normals, thus removing global bias from SPI normals. At step 1222, a 3D shape is reconstructed. In some examples, using an integration method, SPI surface normals are reconstructed to reveal the underlying shape of the target.

At step 1224, integration errors are removed. In some example, a multi-quadratic radial bias function removes ideal and SPI surface integration errors, while keeping high-frequency polarization reconstruction in the integrated shape. At step 1226, a profile map is created. For example, each pixel is set to the maximum value of the difference between polarization and ideal surface values with a quarter-inch radius of that pixel. At step 1228, the average measurements and pixel measurements are displayed. For example, the difference between polarization and ideal surface values for the whole area or region of interest is average, and values at each pixel can be displayed by hovering a mouse cursor over the pixel of interest.

Figure 13:
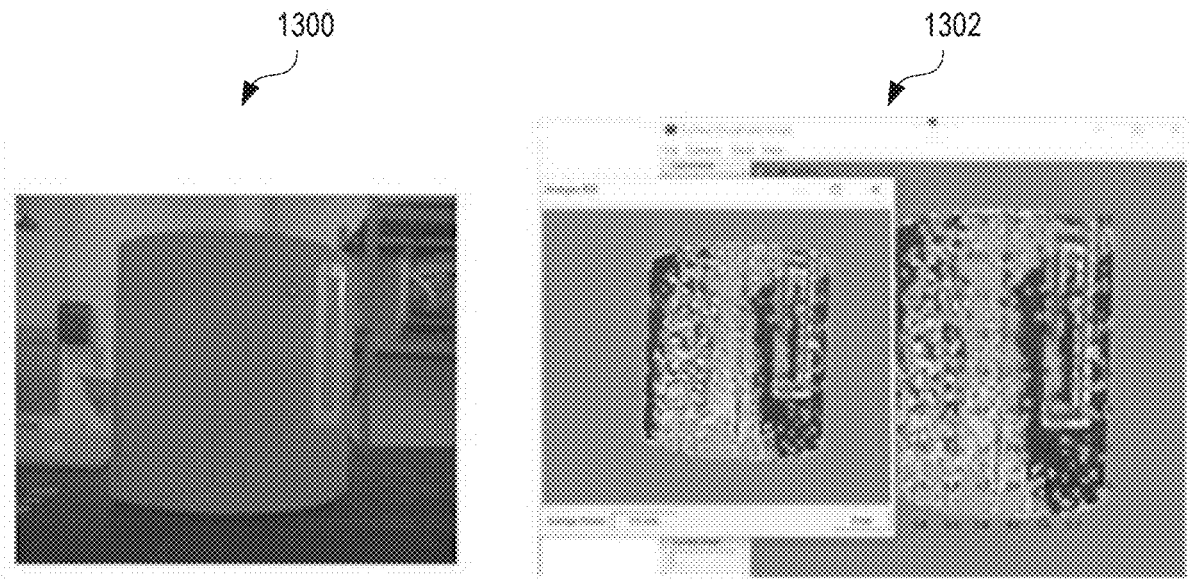
FIG. 13 shows an example of surface profile calculations made for an object of interest.

FIG. 13 shows an example of surface profile calculations made for an object of interest. In the example of FIG. 13, image 1300 shows an area of interest that is placed in the SPI sensor's field of view. Image 1302 shows the surface profile that is measured across the area of interest, a specifically defined area in the area of interest, or over a single pixel in the area of interest. In some examples, the process of calculating a surface profile can be accomplished in as few as 3 minutes and could be shortened as workflows are defined.

Figure 14A:
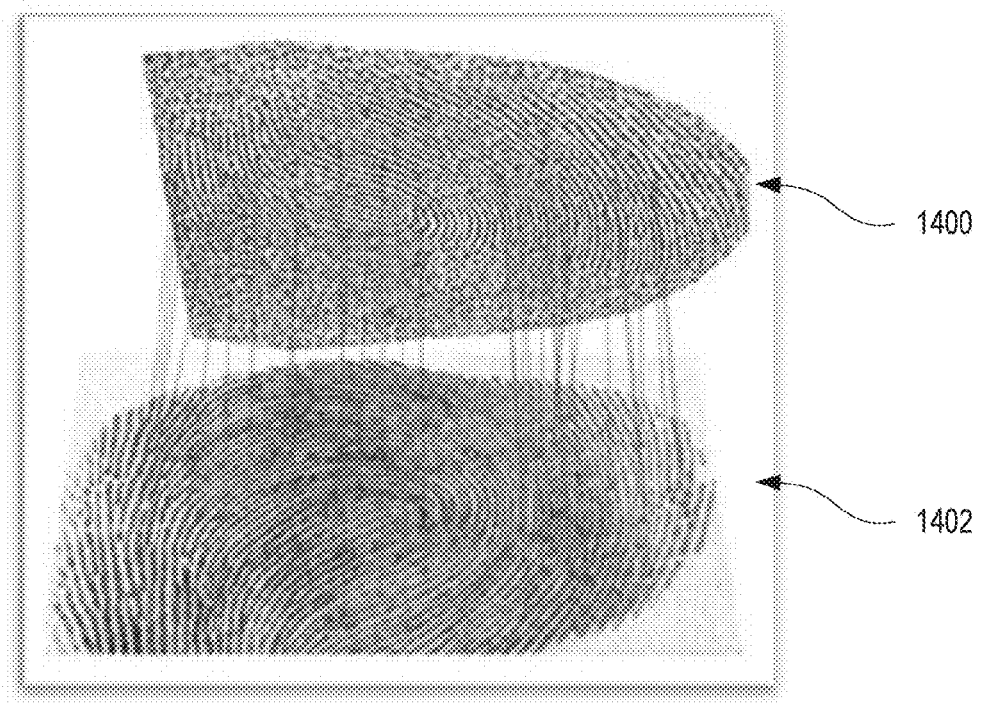
FIG. 14A shows an example of a touchless 3D fingerprint captured using SPI sensing technology.
Figure 14B:
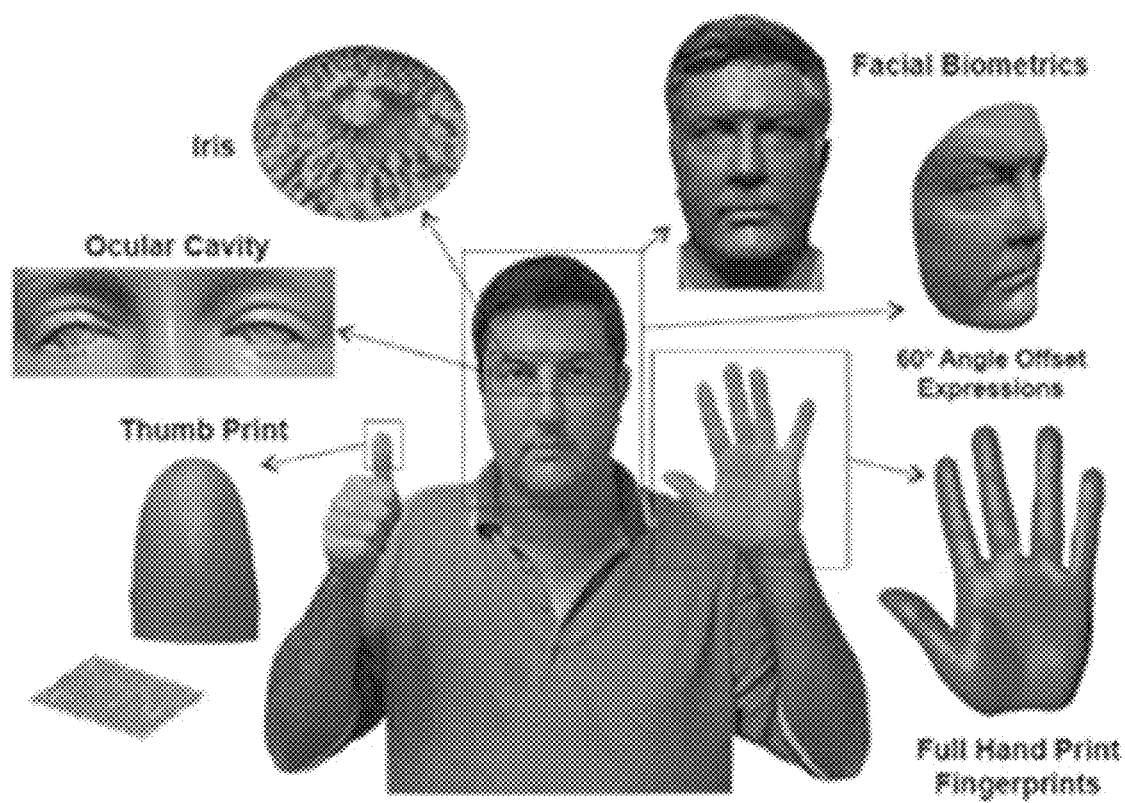
FIG. 14B illustrates other aspects of a human body that can be captured using SPI sensing technology in the context of biometric recognition and security.

A further application of SPI sensing technology is in biometric recognition and security. One example of this is the acquisition of touchless 3D fingerprints. FIG. 14A shows an example of a touchless 3D fingerprint 1400 captured using SPI sensing technology. For the sake of comparison, a conventional ink-captured fingerprint 1402 is also shown in FIG. 14A. FIG. 14B illustrates other aspects of a human body that can be captured using SPI sensing technology in the context of biometric recognition and security. For example, FIG. 14B illustrates that SPI sensing technology can be used for ocular cavity imaging, iris imaging, facial biometrics, recognition of angle offset expressions, and full handprint fingerprints. In some examples, SPI biometric applications can use SPI CMOS sensor technology (e.g., the SPI systems 100, 200 described above), output 3D surface data, and use 3D shape data analytics to provide very high-resolution facial recognition. Apple ID uses about 30,000 data points for facial recognition. However, SPI biometric applications can use up to about 1,000,000 data points (depending upon the distance to the face). This is a 33-times improvement in resolution as well as a large reduction in the manufacturing cost of the phones. Furthermore, SPI biometric applications can use autonomous high-resolution 3D surface data acquisition and AI analytics to improve performance.

As described in many of the applications described above, the SPI systems 100, 200 can be equipped with an AI framework to improve performance. As an example, SPI includes the use of polarization information collected by sensors. In addition to informing 3D shape, polarization information also enables AI-based analysis of, for example, specular and diffuse reflection, scattering of electromagnetic waves on complex surfaces, surface reflectance, material refractive indices, birefringence properties, analysis of Brewster's angle of materials, and analysis and removal of specular glint from surfaces, including water and glass. In addition, polarization information enables analysis of and modification of light properties in a captured image to improve image quality, resulting in improved image data in AI processes. SPI uniquely enables the application of these and other attributes of polarization as both novel inputs and image filtering in AI and machine learning processes in computer vision applications. An example of how polarization information is used in SPI-enabled AI processes (in addition to 3D shape from polarization) is in the analysis of surface materials and surface properties using reflectance and refraction information.

In some examples, the SPI systems 100, 200 are configured to perform hybrid AI analytics that are a combination of first-generation AI methodologies, second-generation AI methodologies, and third-generation AI methodologies. In some examples, first-generation AI methodologies can include existing algorithms, library routines, and first principle analytics gleaned from physics. Second-generation AI methodologies can include machine-learning, data driven AI methods, examples of which include supervised, unsupervised, semi-supervised, and reinforcement learning using Bayesian networks, support vector models, neural nets, nearest neighbor, etc. Second-generation AI methodologies utilize all the variants of machine learning and create new learning engines based on SPI's 3D data set and pixel intensity. Furthermore, second-generation AI methodologies generate an output that can be used in segmentations, identification, and characterization. Third-generation AI methodologies can be 3D AI solutions that are surface- or shape-driven. Third-generation AI methodologies is based on ingesting surface and shape data and utilizes new mathematical routines such as differential geometry and topology. As an example, third-generation AI methodologies use similar mathematical techniques and analytics as machine learning but use vectors and surface information over scalar and point values.

Figure 15:
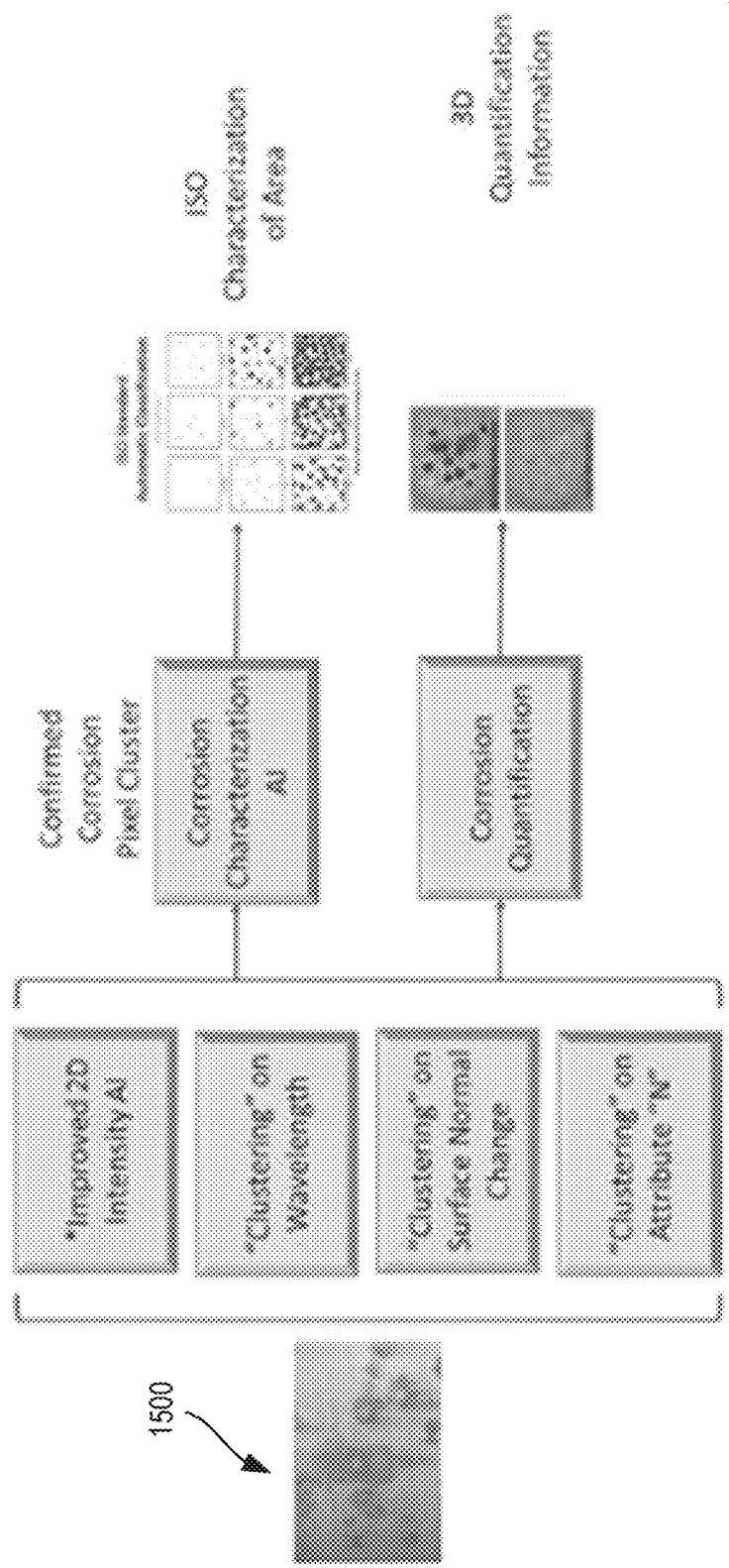
FIG. 15 shows an example of applying hybrid AI analytics to corrosion blister calculation.

FIG. 15 shows an example of applying hybrid AI analytics to corrosion blister calculation. In FIG. 15, a region of interest 1500 is imaged using the SPI imaging technology.

The 3D data set and the intensity image are subjected to analytics. For example, hybrid AI routines are run on the intensity image. Furthermore, clustering is performed on wavelength, surface normal change, and any attribute "N." Based on the analytics, corrosion characterization and corrosion quantification can be performed. Hybrid AI can be utilized in corrosion characterization to confirm a corrosion pixel cluster and to characterize the corrosion according to ISO standards. Corrosion is quantified (e.g., using the process 1000 described above) to generate 3D quantification information.

Figure 16:
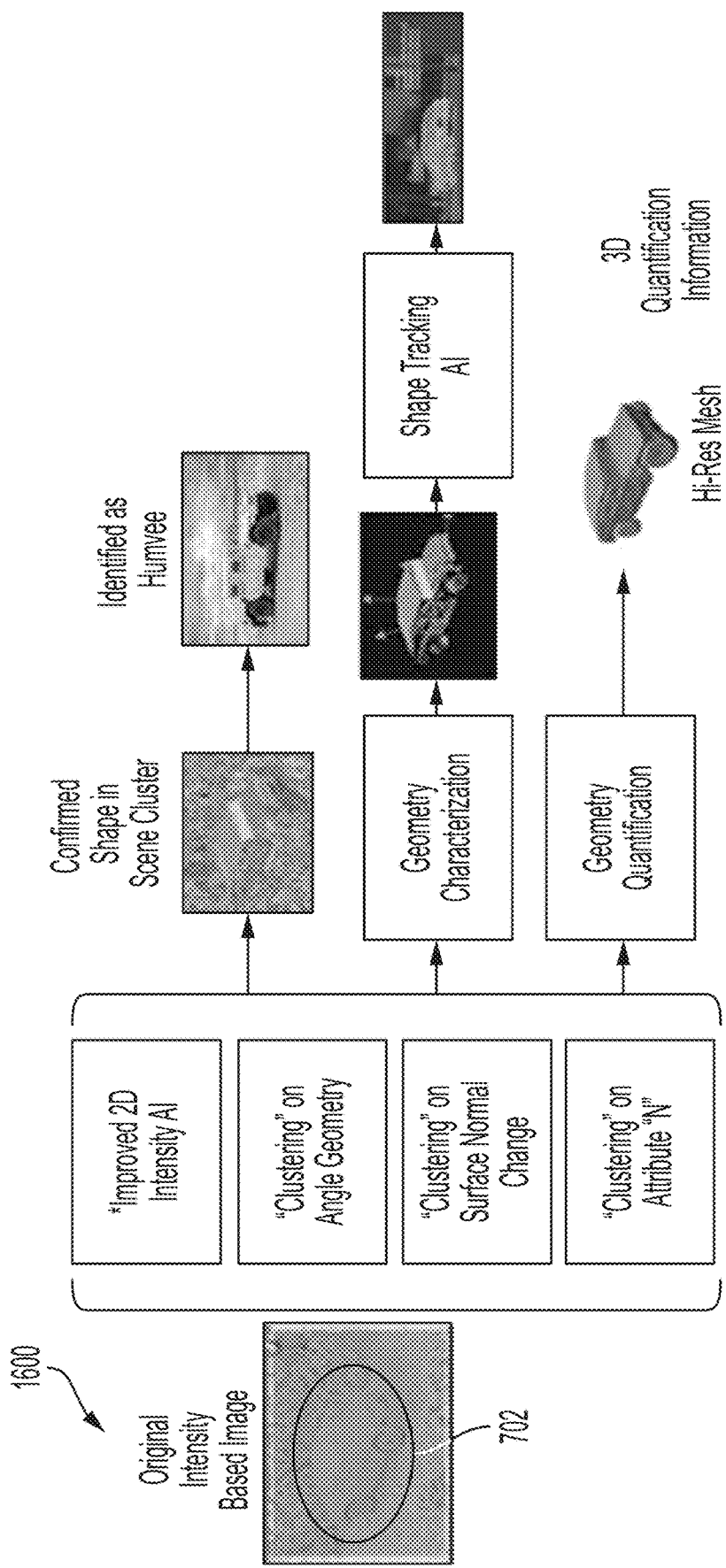
FIG. 16 shows an example of applying hybrid AI analytics to tracking an object of interest (e.g., a Humvee).

FIG. 16 shows an example of applying hybrid AI analytics to tracking an object of interest (e.g., the Humvee 702). In FIG. 16, an original intensity-based image is obtained using the SPI imaging technology. The 3D data set and the intensity image are subjected to analytics. For example, hybrid AI routines are run on the intensity image. Furthermore, clustering is performed on angle geometry, surface normal change, and any attribute "N." Based on the analytics, a shape can be confirmed in the scene cluster and subsequently identified as the object of interest (e.g., a Humvee). Furthermore, geometric characterization and geometric quantification can be performed based on the analytics. As an example of geometric characterization, panels of the object of interest can be constructed, and hybrid AI analytics can be used for tracking of the object's panels. As an example of geometric quantification, a high-resolution mesh can be constructed.

Figure 17:
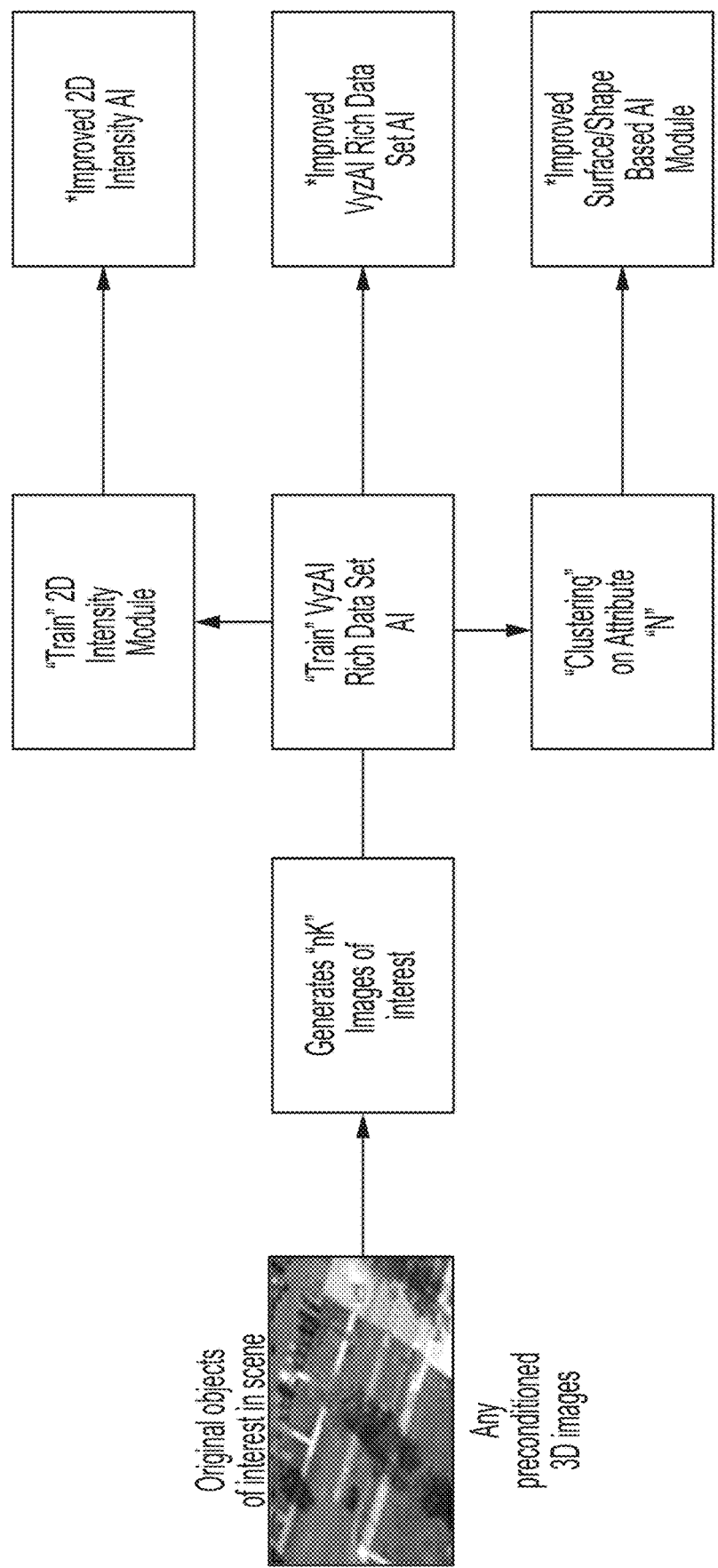
FIG. 17 shows an example of a synthetic AI routine that can be used to improve learning routines.

In addition to hybrid AI, synthetic AI can be used in the AI framework used by the SPI systems 100, 200. Synthetic AI provides the ability to simulate and generate thousands of 2D and 3D images based on changing environmental parameters such as lighting and location, shadows, angles, etc., that can be used to dramatically improve the time taken to create, and the confidence in, existing learning routines (e.g., supervised, unsupervised, and surface- or shape-based learning routines). FIG. 17 shows an example of a synthetic AI routine that can be used to improve learning routines. In FIG. 17, original objects of interest are depicted in a scene and used as a template. Any preconditioned 3D image can be used as an input. Subsequently, images of interest are generated, and are used to train the rich 3D data set obtained from the SPI systems 100, 200, thus yielding an improved rich 3D data set AI engine. Furthermore, clustering can be performed on any attribute "N," thus yielding an improved surface- or shape-based AI engine. Additionally, the 2D intensity engine can be trained, thus yielding an improved 2D intensity AI engine.

In some implementations, synthetic training images of the scene can be created for training AI learning modules of 2D and then 3D without capturing thousands of real-world images. For example, an object like a drone can be used in a variety of simulated Virtual Reality scenarios and scenes without the need to wait until that data is captured. Additional real-world data can be added to the characterization to further training the AI learning modules.

In some implementations, multiple 2D and 3D images can be simulated and generated using existing 2D multi-frame datasets based on changing environmental parameters such as lighting and location, shadows, angles, etc. This can be used to dramatically improve the time taken to create and the confidence in creating supervised, unsupervised and surface/shape-based learning routines. The application can create through simulation, rich data sets to train existing AI modules based on 2D data, and/or data sets for our rich data and/or our surface/shape data. This utilizes the concept of synthetically modifying the values in the tensor field for single pixel and cluster level based on those changing environmental parameters.

Many of the applications referenced earlier represent part of a bigger solution comprised of a wealth of digital information, analytics and workflow. The enablement of SPI allows for both real-time or near-time 3D surfaces and shape capture as well as real time analysis of that information. Most of the current solutions are achieved in many steps of data capture, data movement, data analysis, interpretation to final insight and recommendation which could take in some cases on the order of months. The SPI systems 100, 200, however, allow for immediate analysis of an object in scene.

Figure 18:
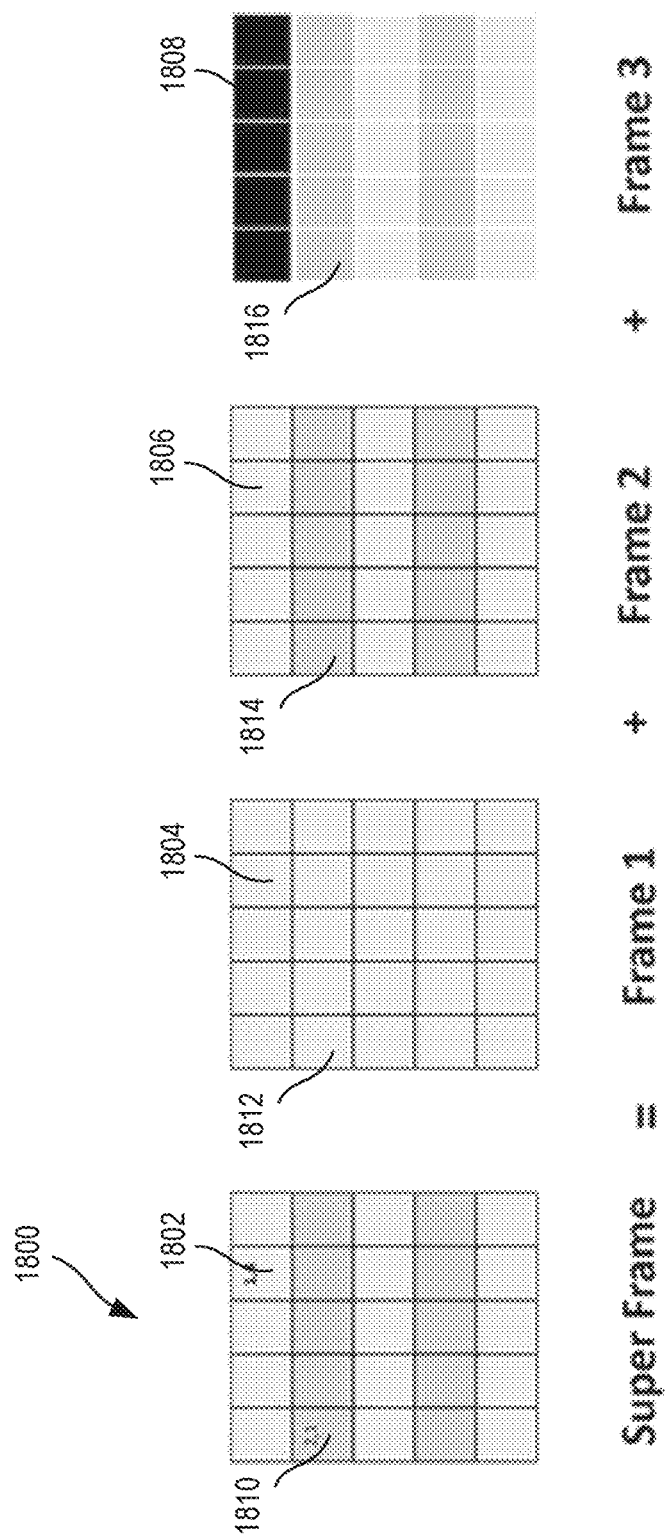
FIG. 18 shows an example of constructing a super surface or super frame from one or more frames and associating a confidence value with each pixel of the super surface of super frame.

The performance of the SPI systems 100, 200 (as well as the many applications described above) can be further improved by associating a degree of confidence with the 3D values at each pixel of a surface or frame. FIG. 18 shows an example of constructing a super surface or super frame from one or more frames and associating a confidence value with each pixel of the super surface of super frame. In the example of FIG. 18, the super surface (or super frame) 1800 may be a set of pixels ascribed to a surface (or the entirety of all pixels within a frame) whose pixel level values are calculated through various mathematical approaches (e.g., described above) from multiple pixels and surfaces from one or more frames. Furthermore, the confidence value can be a normalized value between 0 and 1, for each primitive, derived value, etc., which could be used in various mathematical approaches such as weighting factor, etc. The confidence value mathematically defines a confidence that the value accurately represents a real-world attribute. As an example, the super surface (or super frame) 1800 is depicted as a combination of Frame 1 (acquired at time t1), Frame 2 (acquired at time t2), and Frame 3 (acquired at time t3). In FIG. 18, the "=" represents some mathematical value derived from the similarly-located pixels in all the frames (e.g., an average or a weighted sum), while the "+" represents a mathematical operation of the inherent value and the confidence value. For example, in the illustration of FIG. 18, the pixel 1802 of the super surface (or super frame) 1800 is composed of the same angular value from pixel 1804 of Frame 1 and pixel 1806 of Frame 2 averaged with a confidence value of 0.7. The angular value from pixel 1808 of Frame 3 has a low confidence value (e.g., 0.1) because of a measurement of specular reflection indicating the angular value was of very low confidence. With regards to pixel 1810 of the super surface (or super frame) 1800, an average of all corresponding pixels 1812, 1814, 1816 in the other frames has a high confidence value as all values in Frames 1 to 3 indicate a high confidence value for each of their individual pixel measurements. The overall outcome of the use of the super surface (or super frame) 1800 and the confidence value is a high degree of confidence that the 3D values at each of the pixels represents the true nature of the physical scene whether it's angle, intensity, slope vector, etc.

Given the vast amount of data that can be generated and processed (e.g., in real-time or near-time) by the SPI systems 100, 200, this disclosure proposes a data management system to manage and store the data. Specifically, this disclosure proposes ways of organizing the data under a working structure to manage and manipulate the data. The data management system can take the form of an operating system or an application-specific system. In either case, the data management system provides technical improvements and advantages over existing approaches. For example, the data management system allows an SPI system (e.g., the SPI systems 100, 200) to reduce manual interventions and effectively and seamlessly manage large volumes of data generated by the SPI system. For example, in some implementations, the data management system may allow the SPI system process the 3D data and generate, in real-time or near-time (e.g., in a range from one millisecond to about 5 seconds), first- and second-order primitives that convey information about the object 102. Furthermore, the data management system can be easily applied to a variety of applications and can also be used for applications that rely on autonomy and AI. The enablement of SPI allows for both real-time or near-time 3D surfaces and shape capture as well as real time analysis of that information.

In one example, combinations of data at various levels such as pixel, surface, shape and combinations of mathematical routines and approaches at these levels can also be organized into a digital architecture approach. This digital architecture can manifest as: an operating system at the core level (referred to as a shape operating system and abbreviated "ShapeOS"), providing access to these layers of information and processing thru a software developer kit (SDK) or calling approach; a portal where a human can interact and access with those data layers and transform the data into other data types thru a human directed approach; or a specific set of combinations to create a standalone application-level platforms providing a limited set of outputs. These combinations of data collection, data processing and digital architectures can be executed on any existing digital platform such as mainframe processors, edge processors, GPUs, etc. and new platforms such as quantum based, photonic based, biological based, etc.

Figure 19:
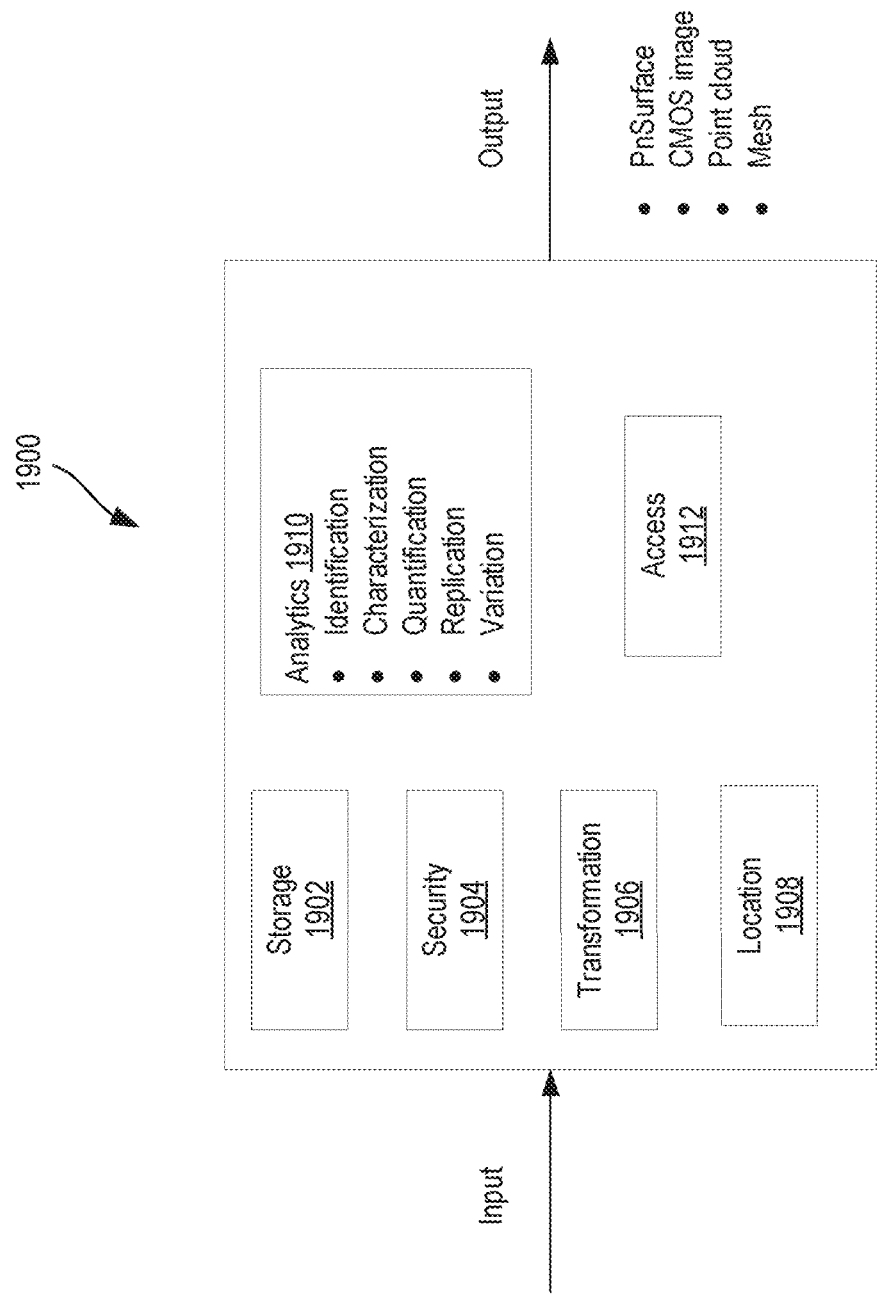
FIG. 19 shows various engines of a shape operating system.

As mentioned above, the digital architecture for organizing the data under a working structure to manage and manipulate the data can manifest as a shape operating system at the core level. FIG. 19 shows various engines of a shape operating system 1900. The shape operating system 1900 provides digital access to SPI based data and time series information. The shape operating system 1900 also provides a managed repository of historical data which can be accessed for future analysis as analytical routines are developed. The shape operating system 1900 further provides a secure environment using pnSurface information as biometric security, and the ability to transform pXSurface information to current file formats utilized extensively for existing 3d approaches (which provides an upward and downward compatible roadmap to convert over time to pXSurface information).

The shape operating system 1900 receives an input, which can be pXSurface and pXShape digital information where "X" defines any attribute type obtained from first- and second-order primitives. For example, information related to surface normal vectors or orientations of the object 102 may be clustered or segmented, thus resulting in a pNSurface and pNShape description of the object 102, where "N" denotes the surface normal vectors or orientations.

The shape operating system 1900 includes a storage engine 1902. In some examples, the input to the shape operating system 1900 includes the digital forms of the rich data set (e.g., CMOS images and pXSurface and pXShape pixel surface). The input data is received by the storage engine 1902 and stored in a record format with an associated suffix (e.g., ".pXSx"). In addition to the actual surface image (which, for example, includes the normal to the surface and the frequency of light for each pixel), the following can also be stored by the storage engine 1902: the date/time of acquisition; location in a specified coordinate system; sensor type; and other relevant meta data appropriate to the acquired signal.

Figure 20:
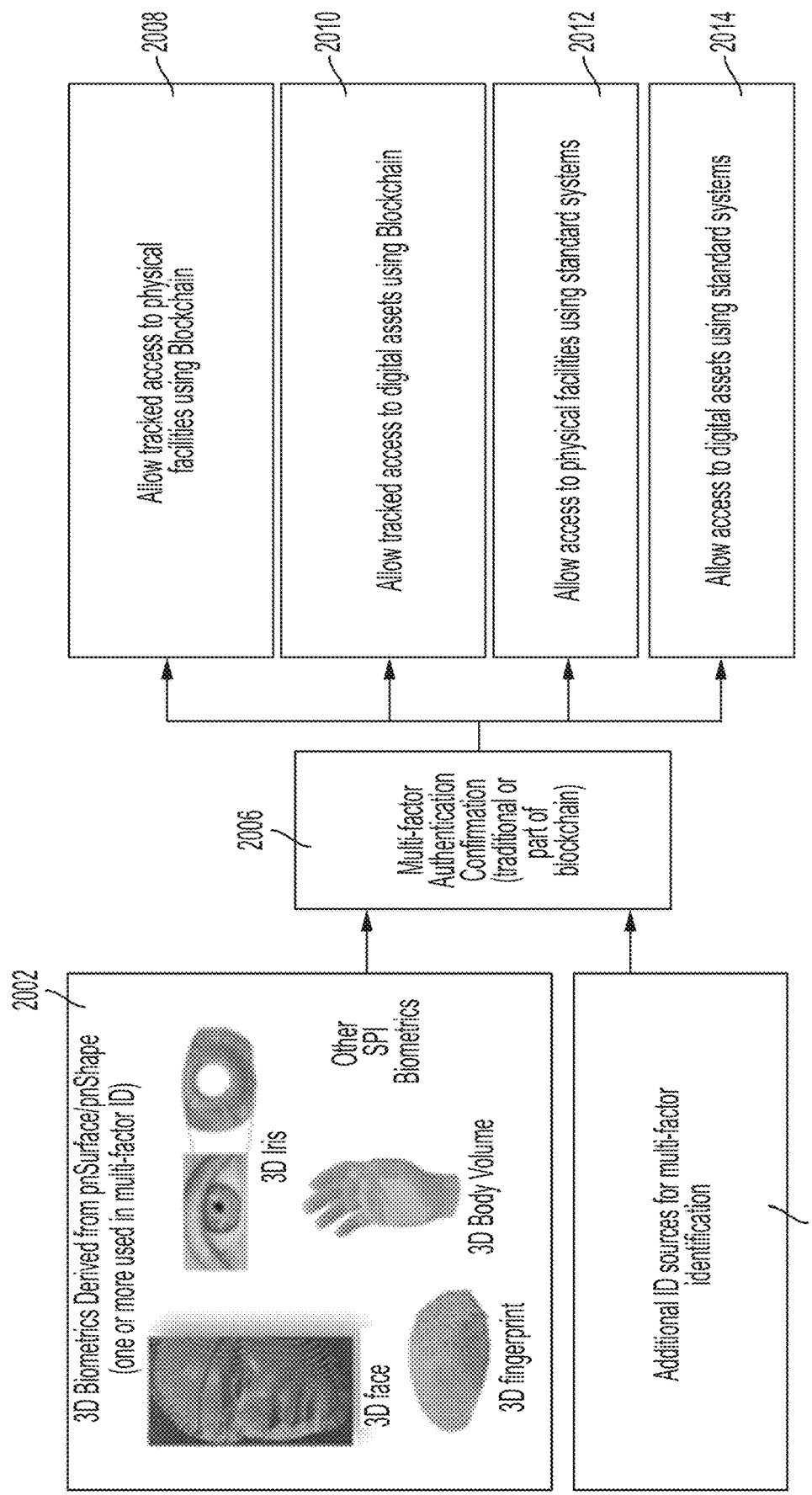
FIG. 20 shows an example of SPI-based biometrics for multi-factor authentication with blockchain or traditional methods.

The shape operating system 1900 includes a security engine 1904. In some examples, the security engine 1904 can use single- or multi-factor biometric pXSurface, pXShape, and CMOS information to identify an individual who "owns" the record that is stored by the storage engine 1902. FIG. 20 shows an example of SPI-based biometrics for multi-factor authentication with blockchain or traditional methods. As seen in FIG. 20, 3D biometric data can be obtained from the record information (e.g., pXSurface, pXShape, and CMOS information) stored by the storage engine 1902. As depicted in FIG. 20 (and in FIG. 14B), the biometric data 2002 can include pXSurface or pXShape files for face, iris, fingerprint, a body volume, etc. FIG. 20 also shows that additional identification sources 2004 can be used for multi-factor identification. The additional identification sources can include a password, a key card, a RSA (or similar) token, other biometric information, a code texted to the individual's mobile device, a required VPN, a USB key, a personal identification number (PIN), a security question, a mobile application, or any combination of these. FIG. 20 illustrates that multi-factor authentication confirmation 2006 can be accomplished using standard systems or part of blockchain.

For example, in 2008, multi-factor authentication allows tracked access to physical facilities using blockchain. In 2008, an initial block's hash can be created by biometric data as part of multi-factor authentication. Subsequently, each access point updates the blockchain (which maintains access history). Attempts to circumvent security can invalidate the blockchain.

As another example, in 2010, multi-factor authentication allows tracked access to digital assets using blockchain. In 2010, an initial block's hash can be created by biometric data as part of multi-factor authentication. Subsequently, each file access updates the blockchain (which maintains access history). Attempts to circumvent security can invalidate the blockchain.

As another example, in 2012, multi-factor authentication allows tracked access to physical facilities using standard systems. As yet another example, in 2014, multi-factor authentication allows tracked access to digital assets using standard systems. In 2012 and 2014, pNSurface or pNShape biometric data serves as an access key or unlocks other access methods. Access can be tracked using biometric data and existing access-tracking methods. Furthermore, pNSurface and pNShape biometric data creates a unique digital key that follows the user.

Figure 21:
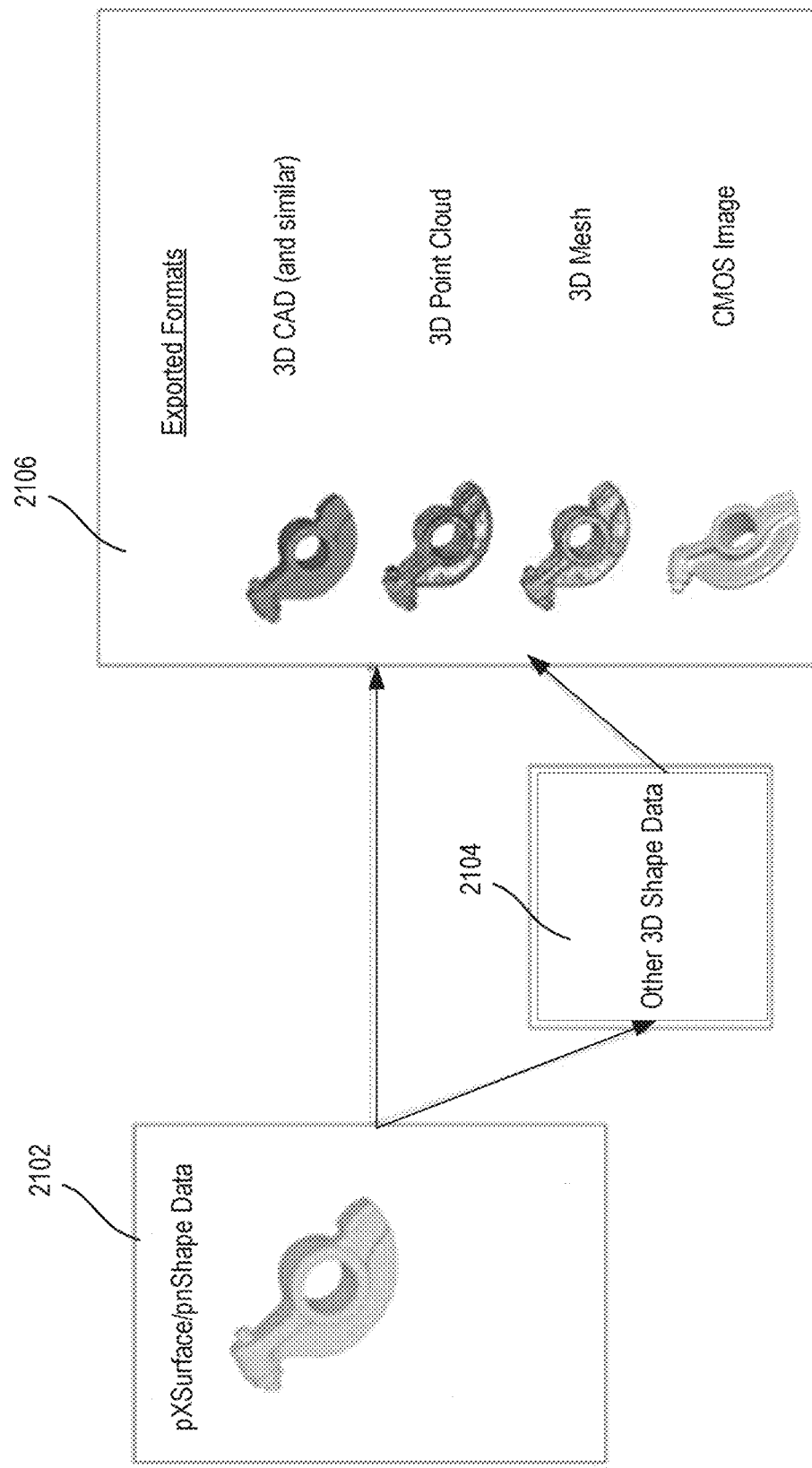
FIG. 21 shows an example of various conversions of 3D pXSurface and pXShape data to formats usable by other systems.

The shape operating system 1900 includes a transformation engine 1906. In some examples, the digital attributes of the rich data set (e.g., CMOS images and pXSurface and pXShape pixel surface) can be transformed to formats usable by other systems (e.g., commonly-used image formats such as point cloud or mesh representations). Existing 3D modelling solutions cannot directly use 3D pXSurface and pXShape data; however, by operation of the transformation engine 1906, the shape operating system 1900 can export 3D pXSurface and pXShape data (and optionally other 3D shape data) to formats usable by other solutions. For example, the SPI imaging technology produces both the pXSurface data along with a traditional CMOS image. The CMOS image can be output directly without transformation while the pXSurface data can be transformed to an appropriate point cloud or mesh file format of choice. Transformation rules can be specified for this translation, since the pXSurface data can be of higher resolution than the more traditional mechanisms used to date. As an example, pXSurface data can have micron-level resolution (e.g., which can be useful in imaging carbon fiber structures). FIG. 21 shows an example of various conversions of 3D pXSurface and pXShape data to formats usable by other systems. In 2102, 3D pXSurface and pXShape data is made available. The 3D pXSurface and pXShape data is based on surface capture using an SPI system (e.g. systems 100, 200) without point cloud or mesh representations. In 2104, other 3D shape data may optionally be combined with the 3D pXSurface and pXShape data. Examples of other 3D shape data include laser scanning point cloud data, photogrammetry data, time-of-flight data, sonic data, or other forms of 3D shape data. In 2106, the 3D pXSurface and pXShape data (and optionally other 3D shape data) are transformed to formats usable by other systems. One example is 3D CAD (or similar) data, where a 3D surface model is created for import into common 3D design solutions (e.g., AutoDesk). Another example is 3D point cloud data (which can be similar to laser scanning results) in standard formats. Another example is 3D mesh cloud data in standard formats. Another example is a CMOS image. Therefore, in addition to 3D formats, photographic imagery captured by the SPI sensor may be exported.

Figure 22:
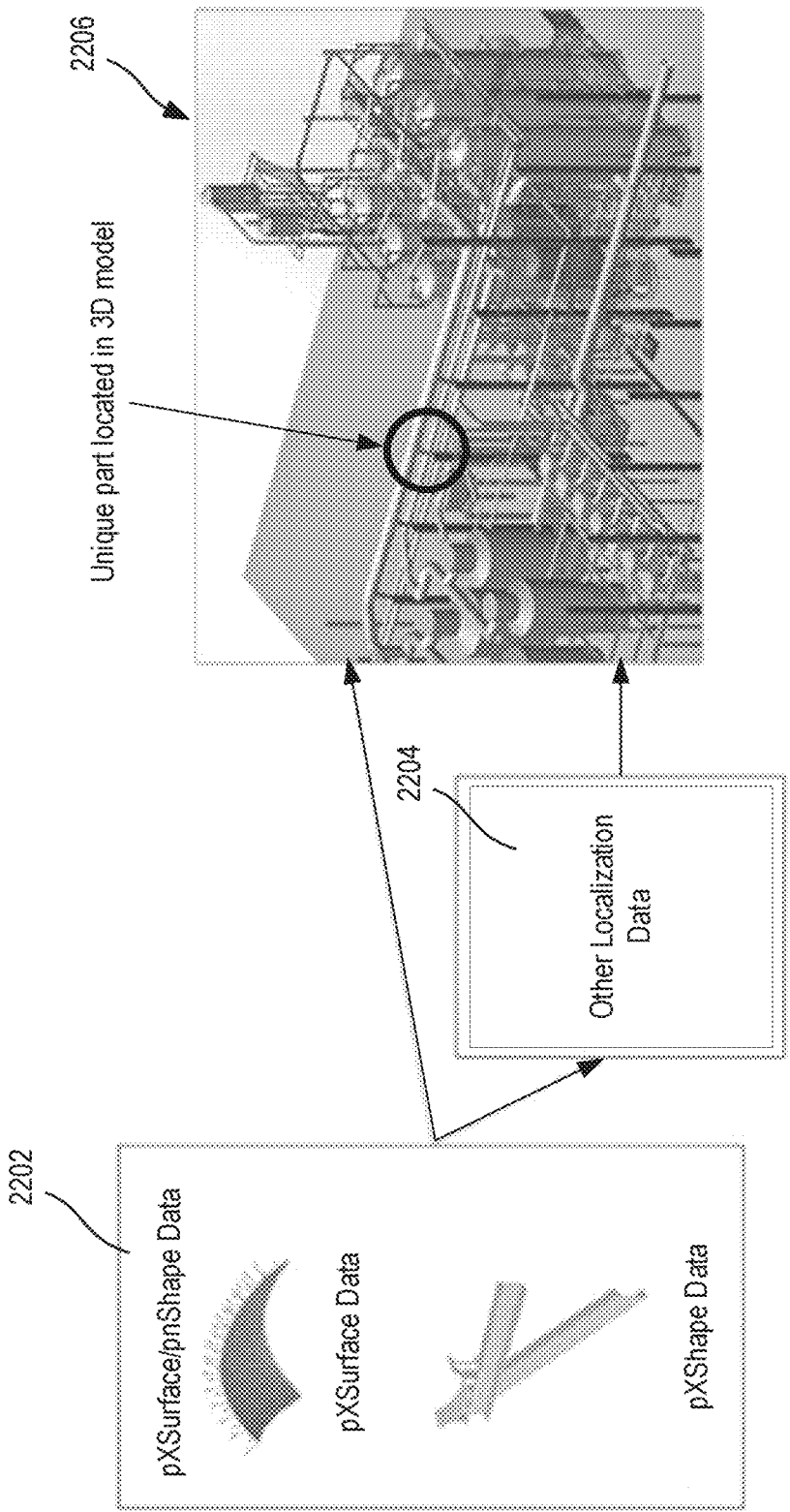
FIG. 22 shows an example of identifying a location using 3D pXSurface and pXShape data.

The shape operating system 1900 includes a location engine 1908. In the location engine 1908, the 3D pXSurface and pXShape data and the CMOS image attributes can be oriented in various coordinate systems. For example, an underlying universal coordinate system can be used to locate the pXSurface and pXShape in the world, while routines can be used to translate from this universal frame to a coordinate system of choice (which can include site coordinate systems, registration to existing point cloud monument points, etc.). FIG. 22 shows an example of identifying a location using 3D pXSurface and pXShape data. In 2202, 3D pXSurface and pXShape data is made available. In some examples, a unique 3D surface is captured using an SPI system and converted to 3D pXSurface data, while an object with a unique 3D surface is captures using an SPI system and converted to 3D pXShape data. In 2204, other localization data may optionally be combined with the 3D pXSurface and pXShape data. Examples of other localization data may include markers lie barcodes, QR codes, etc; physical markers identified in the 3D model; navigation information like GPS and ground beacons; and localization information from other sensors. In 2206, the unique part is located in the 3D model based on the 3D pXSurface and pXShape data (and optionally other localization data). In some examples, the 3D model can be updated with new 3D pXSurface and pXShape data. Furthermore, the SPI camera and sensor position can be calculated using this approach.

The shape operating system 1900 includes an analytics engine 1910. In some examples, the 3D pXSurface and pXShape data is analyzed by a plurality of techniques that are run by the analytics engine 1910, which can include the use of first principle routines as well as artificial intelligence approaches. The output of the analytics engine 1910 can enable multiple data views, which include, but are not limited to, the following: RGB color data (which provide surface and shape information); monochrome data (which provide high-contrast surface and shape details); LWIR data (which provide thermal information contributing to analysis and calculations); z-surface normals (which identify otherwise invisible boundaries and features); xy-surface normals (which find edges and boundaries and help determine whether an anomaly exists); xyz-surface normals (which enable calculations of 3D data to determine shape and surface anomalies); maximum and minimum principal curvature data (which indicate whether a surface is more curved or flat); mean curvature data (which inform expected surface characteristics); Gaussian curvature data (which describe whether the shape around a given pixel is elliptic, hyperbolic, or parabolic); synthetic skin and lighting data (which help identify depth of anomalies and other capabilities); 3D model data (which enable 3D measurement and analysis and serve to digitally tie other data layers to points in the real 3D environment); segmentation and masking (which separate elements within the same scene, examples being rails, ties, ballasts, etc.); roughness estimates (which help estimate surface roughness).

Furthermore, the output of the analytics engine 1910 can include, but is not limited to, the following: identification information; characterization information; quantification information; replication information; and variation information. To generate identification information, the analytics engine 1910 can execute routines that segment a scene into surfaces and objects of interest in the real world (e.g., to separate surfaces from each other). For example, routines exist in the analytics engine 1910 that identify the surface/shape as distinct from other objects in the scene and ultimately associate a type of real-world object or segment of a real-world object. For example, the set of pixels with the same normals are identified as a distinct surface from an adjacent set of pixels with a different normal, and those two sets retain the same angular relationship frame to frame indicating they are part of a bigger whole.

To generate characterization information, the analytics engine 1910 can execute routines that characterize features of the surface, examples being type of feature/defect (e.g. corrosion blister) or real world objects (e.g., elm tree leaf, specific human face, specific drone type, etc.). To generate quantification information, the analytics engine 1910 can execute routines that calculate quantifiable results such as volume of a feature or object, area covered, shape, etc. To generate replication information, the analytics engine 1910 can execute routines that generate location information for overlaying identified feature in time/space (e.g., thus providing the ability to overlay the captured image with prior images in the same location). To generate variation information, the analytics engine 1910 can execute routines that calculate results of changes to the object or to its shape over time including first and second derivative analysis (e.g., velocity, acceleration, changes in quantification information such as changes in volume, area, etc.).

Some routines that can be executed by the analytics engine 1910 to generate identification, characterization, quantification, replication, and variation information include, but are not limited to, the following: standard polarimetric surface normals reconstruction; look-up table polarimetric surface normals reconstruction; 3D reconstruction from 3+ strobed light sources; hemisphere disambiguation; polarimetric calibration; polarimetric confidence quantification; normals to 3D surface reconstruction; surface reconstruction warped with vertices from another scan modality; compressed 3D file storage; polarimetric bar code tracking; SPI face modeling; surface profile measurement; and biometrics.

Figure 23:
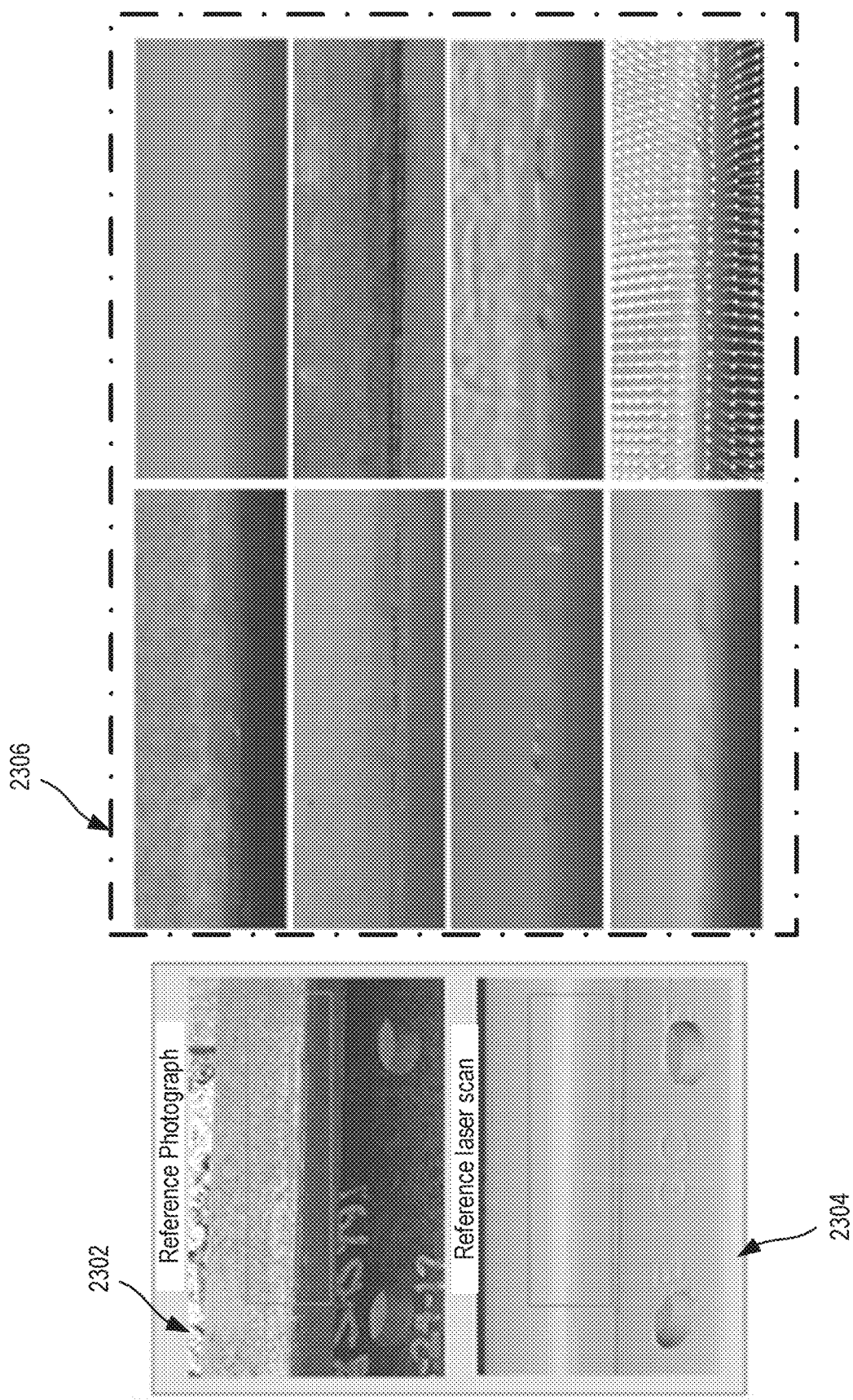
FIG. 23 shows an example of a field-capable 3D analysis generated by the analytics engine of the shape operating system shown in FIG. 19.

FIG. 23 shows an example of a field-capable 3D analysis generated by the analytics engine 1910 of the shape operating system 1900. In the example of FIG. 23, a portion of a rail is analyzed. For example, a reference photograph 2302 and a reference laser scan 2304 are compared to the variety of 3D data representations 2306 that can be generated by the analytics engine 1910 from SPI data. As seen in FIG. 23, the 3D data representations 2306 generated by the analytics engine 1910 from SPI data provides rich information about the surface and anomalies of the portion of the rail that would otherwise not have been available from the reference photograph 2302 and reference laser scan 2304.

Figure 24:
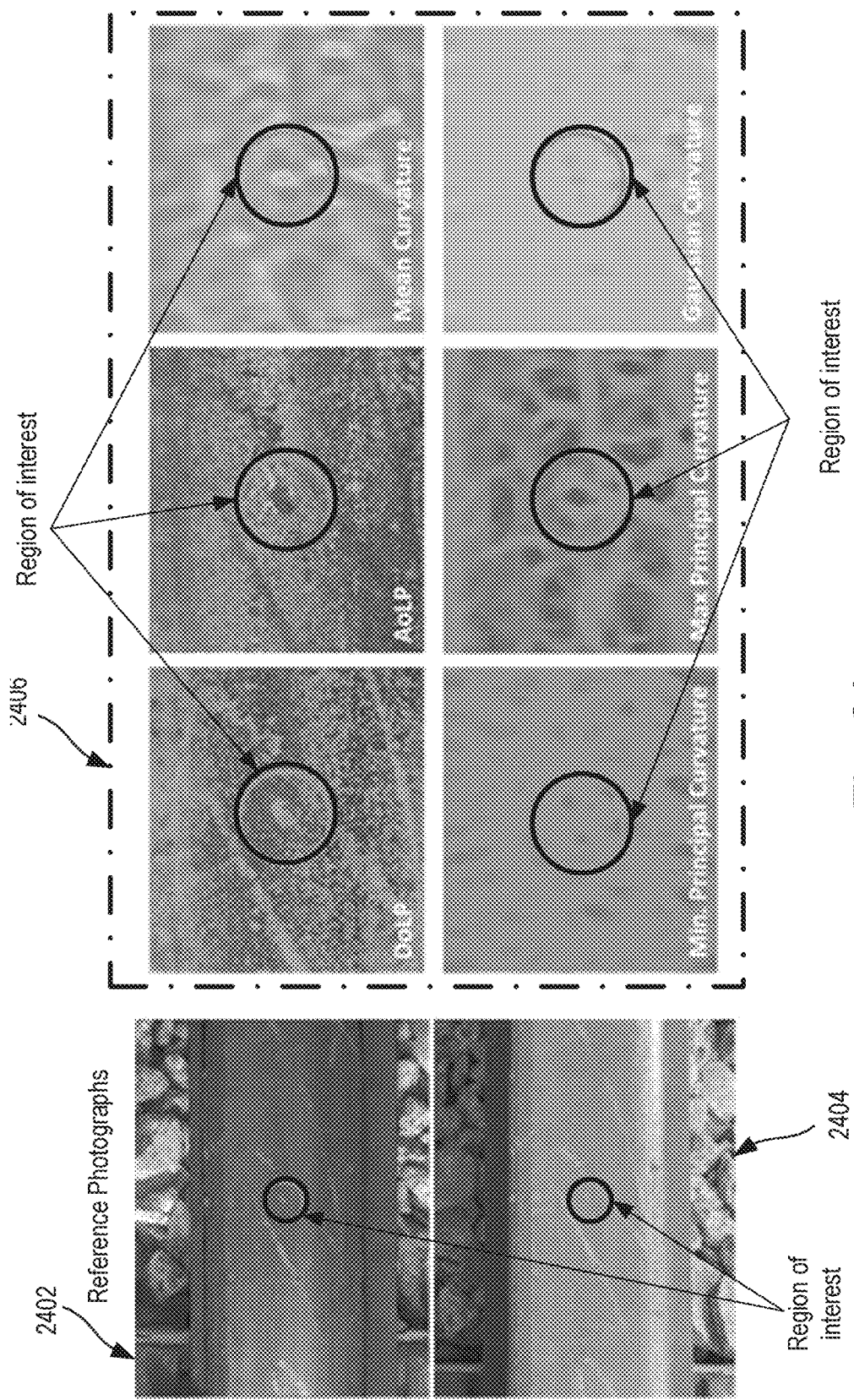
FIG. 24 shows an example of identification and characterization of an anomaly using the analytics engine of the shape operating system shown in FIG. 19.

FIG. 24 shows an example of identification and characterization of an anomaly using the analytics engine 1910 of the shape operating system 1900. In the example of FIG. 24, a portion of a rail is analyzed. For example, reference photographs 2402, 2404 are compared to the variety of 3D data representations 2406 that can be generated by the analytics engine 1910 from SPI data. For example, the region of interest in the reference photographs 2402, 2404 show an anomaly; however, the 3D data representations 2406 generated by the analytics engine 1910 from SPI data provides rich information about the region of interest that would otherwise not have been available from the reference photographs 2402, 2404. In the example of FIG. 24, the 3D data representations 2406 generated by the analytics engine 1910 include a DoLP image, an AoLP image, a mean curvature image, a minimum principal curvature image, a maximum principal curvature image, and a Gaussian curvature image.

The shape operating system 1900 includes an access engine 1912. In an example, the access engine 1912, provides access to the functionalities in the analytics engine 1910, location engine 1908, transformation engine 1906, security engine 1904, and storage engine 1902. This access can be provided through the following: an SDK layer or through cloud services, thus providing other developers access to query, filter the information into output information for further analysis, storage, etc.; through a portal (e.g. described below) for human data management and interpretation; through application vertical using algorithms and technology approaches; or any combination thereof.

FIGS. 23 and 24 illustrate examples where a portion of a rail is analyzed. In these examples (and other examples where a portion of a rail is analyzed), a single 3D surface can, for example, be reconstructed by the following steps:

To Reconstruct a Single 3D Surface:
  Capture polarization images from images from stereo cameras.
  Undistort all images and rectify all stereo pairs.
  Find corresponding points in stereo pairs to estimate disparity range required for stereo algorithm.
  Calculate disparity, depth map, and 3D for all stereo pairs using stereo algorithm.
  Calculate initial mask from the stereo data to remove outlier blobs, missing data, and other likely erroneous data.
  Remove edges with edge length exceeding threshold as these are likely occlusion boundaries.
  Smooth the stereo 3D to remove noise and other artifacts.
  Average left and right polarization images (using the disparity estimate) to reduce noise.
  Calculate polarization normals from images averaged above.
  Use normals from smooth stereo to label the hemisphere of the polarization normals.
  Smooth the polarization normals to remove noise.
  Using smooth stereo as the initial 3D vertex locations, refine the shape by integrating the polarization surface normals.

Additionally, registration of multiple frames of the portion of the rail analyzed can be performed, for example, by the following steps:

To Register Multiple Frames:
  Estimate a rotation and translation (R/T) matrix from 2D point correspondence between the current frame and the previous frame captured from this stereo camera.
  The R/T matrix can achieve both image rotation and pixel translation in a single function using a consistent coordinate frame defined by the first image in a set of 2 or more images.
  Temporarily remove points not near each other (and points with normals not pointing roughly in the same direction) from the current frame from stereo pair #1 and the current 3D frame. These temporary meshes are used to improve the accuracy of the ICP convergence below.
  Refine R/T matrix from ICP using the current frame from stereo pair #1 as the bash mesh and the current 3D frame as the surface to be aligned.
  Transform the mesh using the R/T matrix, such that all meshes are aligned in the world coordinate system.

Additionally, integration of multiple frames of the portion of the rail analyzed can be performed, for example, by the following steps:

To Integrate Multiple Frames:
  For the current oldest 3D frame, find the plane that separates vertices only visible in this frame from vertices also visible in the next frame. When saving data, only this "unique" slice may need to be saved out.
  For the current oldest 3D frame, render all overlapping meshes from the perspective of the current oldest 3D frame. Record the vertex value for each pixel.
  Remove vertex values that have the same pixel value, but are far away from the current vertex. Also remove vertex values whose normals don't point in roughly the same direction as the current vertex.
  Record remaining vertex values for all successive 3D scans in the same frame. These can be deleted when processing future frames to avoid duplication of points when saving data.
  For each rendered mesh, compute a vertex weight equal to the inverse of it's squared distance (in number of edges) to an edge of the mesh.
  Average rendered vertices with identical pixel locations using the weights of the previous step and add them to the 3D slice for this frame.
  Connect near vertices in the current mesh slice with the previous mesh's slice (to remove gap introduced by our cutting plane).
  Repeat until all frames have been processed.

Figure 25A:
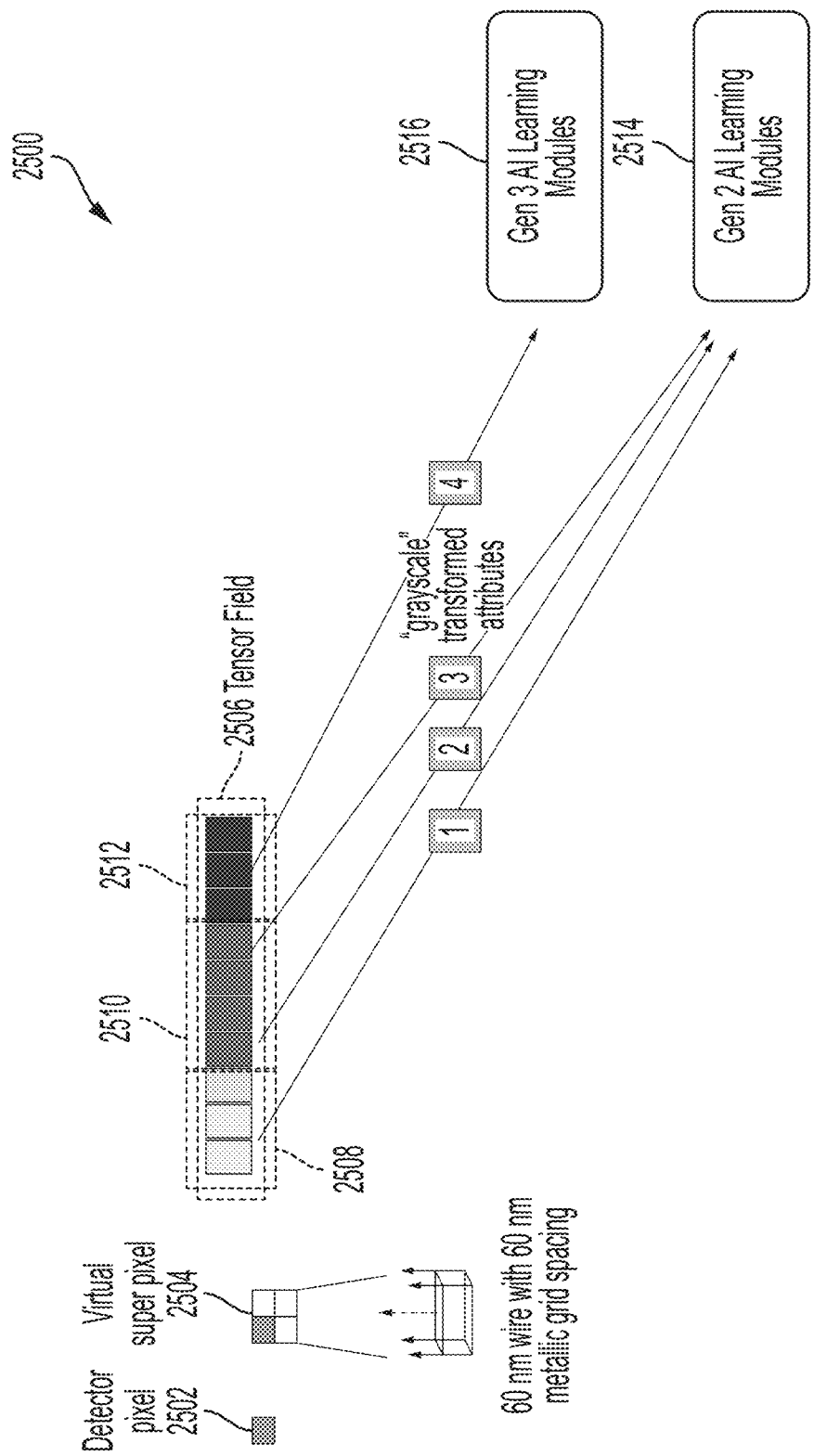
FIGS. 25A-25B show example AI frameworks.
Figure 25B:
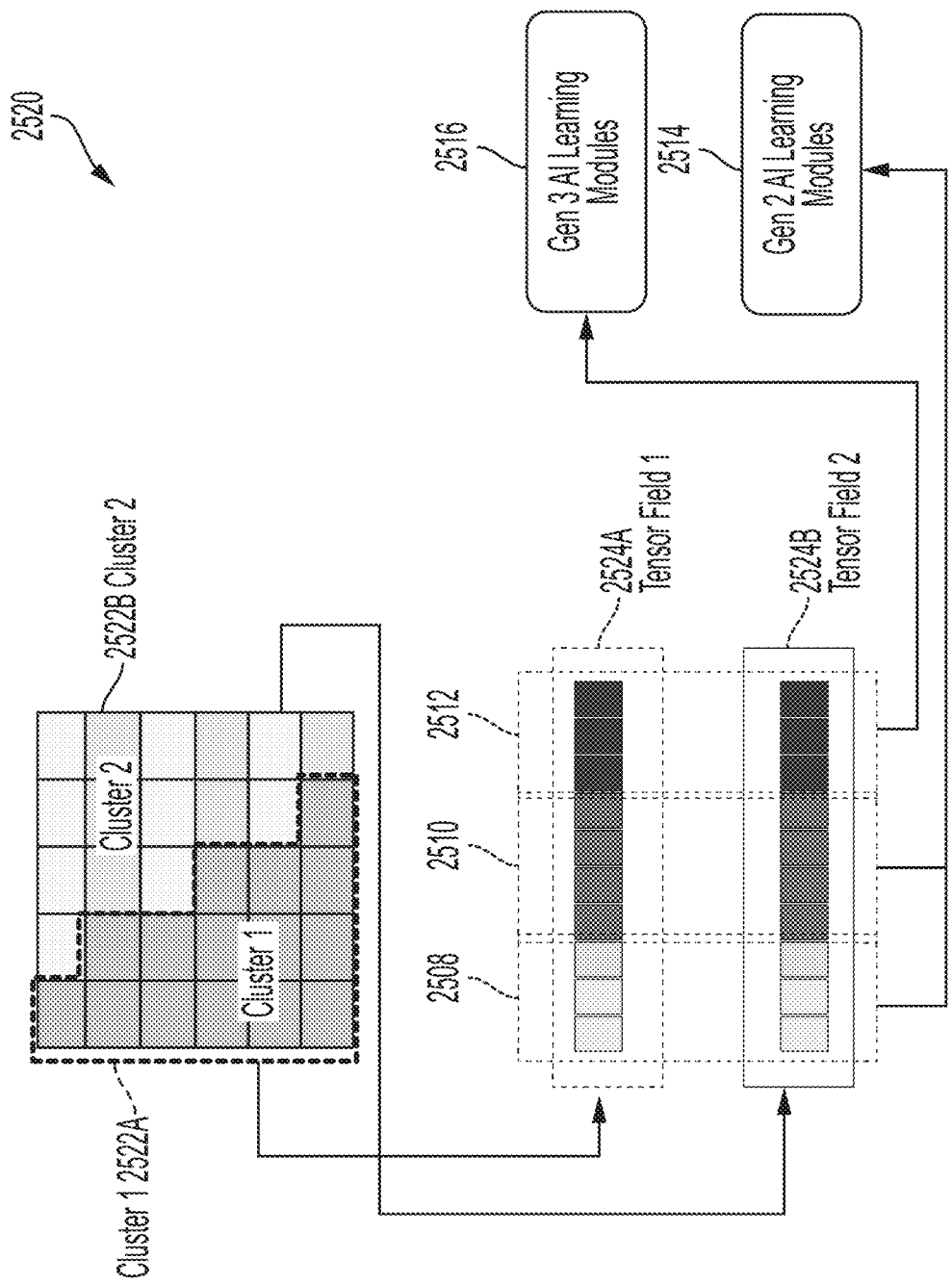

FIGS. 25A-25B show example AI frameworks 2500 and 2520. The example AI frameworks 2500, 2520 are performed based on one or more tensor fields. In some implementations, a tensor field is organized based on attributes of a single pixel, a single voxel, a super pixel, a super frame, or a cluster of the same. For example, a tensor field may be an attribute set including a collection of different types of attributes, e.g., scalar, vector, and 3D information. In some implementations, a tensor field may include one or more attributes selected from the first-order primitives, one or more attributes selected from the second-order primitives, and information derived from the first- and/or second-order primitives described above at different levels. For example, a tensor field may include pixel-level, or surface-level primitives. The 3D information may include a surface, a shape voxel, a super pixel, etc. In some instances, a voxel or a volume pixel, includes a surface profile or a full 3D representation of a surface within a pixel. In some examples, the pixel-level first-order primitives are obtained according to electromagnetic wave detected from a physical object received by an image sensor, for example in the SPI sensor in the SPI systems 100, 200. The electromagnetic wave received by the image sensor may be reflected, refracted, emitted from the object or in another manner.

In some instances, a an attribute value of a specific attribute in a tensor field may be either raw data obtained from the base signal or derived values of first-order and second-order primitives or further derived values such as, confidence values, a super pixel value, or a super frame value.

In some implementations, a tensor field can be created at different levels of abstraction including a lower level of abstraction (e.g., a pixel level, or a super pixel level) and a higher level of abstraction (e.g., a cluster level, or a surface level). A tensor field can then be used to represent derived values from "clustering" a group of pixels together and thus the values represent characteristics of that area or volume of that object in that region of space represented by that cluster of pixels. This tensor field contains the values that represent that abstraction of that object, e.g., the hood of a Humvee. In some implementations, the tensor field with a higher-level abstraction (e.g., the surface level) includes attribute values of attributes at the pixel level. The tensor field represents a physical aspect of the object at a certain orientation within a region of space.

In some instances, a pixel, a super pixel or a pixel cluster can correspond to a tensor field. For example, a tensor field 2506 may be generated according to first attributes from a detector pixel 2502 or a virtual super pixel 2504. In certain instances, a pixel cluster may be segmented in to surfaces or shapes and a tensor field may be created for the surfaces or shapes. For another example, a first tensor field 2524A may be generated based on attributes of a first cluster 2522A and similarly, a second tensor field 2524B may be generated based on attributes of a second cluster 2522B. In some implementations, the first and second tensor fields 2524A, 2524B include higher-order attributes applied to all pixels in the first and second cluster 2522A, 2522B. For example, a single angle can be associated to all pixels in a pixel cluster representing a surface.

In some implementations, a tensor field may include multiple subgroups and each subgroup may be organized according to the type of attributes. A tensor field may be constructed by the analytics 1910 engine shown in FIG. 19. For example, as shown in FIGS. 25A and 25B, each of the tensor fields 2506, 2524A, and 2524B includes a first subgroup 2508, a second subgroup 2510 and a third subgroup 2512. In certain instances, the first subgroup 2508 may include one or more scaler attributes; the second subgroup 2510 may include one or more vector attributes; and the third subgroup 2512 may include one or more attributes that contain 3D information, e.g., shape and surface. In certain instances, a tensor field may include another attribute representing 2D or 3D information as part of the second and third subgroups 2510, 2512.

In some implementations, any generation of AI methodologies as described above can be used in AI learning modules 2514, 2516 to process the tensor field. For example, the AI learning modules 2514, 2516 can be used to create and modify an attribute value of an individual attribute in a tensor field. For example, the first, second, or third generations AI methodology can be used to create and refine the value of an attribute in a tensor field. Synthetic AI, as a second-generation AI methodology, can be used to generate 2D and 3D synthetic images without the need for capturing real-world images, for example using the SPI systems 100, 200. In some instances, attribute values of attributes in a tensor field at any level of abstraction (e.g., a tensor field constructed according to pixel-level or surface-level attri-butes) can be synthetically modified by the AI learning modules 2514, 2516 according to changing environmental parameters to produce synthetic training data or in another manner. In some instances, the synthetic training data may be generated for multiple point-of-views in the scene and each of the multiple point-of-views may include multiple field-of-views. For example, different synthetic training data may be generated for a vehicle or a static object, e.g., the prime vehicle 2702, the nearby vehicle 2706 and the markers 2704. Each of the prime vehicle 2702, the nearby vehicle 2706 and the markers 2704 may include multiple SPI sensor and each of the multiple SPI sensors can have its respective field-of-view. In some implementations, synthetic training data and a respective field-of-view of a respective point-of-view of a corresponding image sensor in the SPI systems 100, 200 can be used to train the AI learning modules 2514, 2516 and the AI algorithms without the need to capture actual physical data in the scene. For example, the SPI sensors positioned at different locations may observe a subject from different angle, providing their respective point-of-views of the subject. Each of the SPI sensors can have its own field-of-view. For example, a tensor field can be created by the initial signal captured and attribute values of attributes in the tensor field can be populated with all raw data. In some instances, a decision can be made to assign attribute values of derived attributes in the tensor field, for example using the original first principles described above and the AI approaches, which can be re-invoked to further modify attribute values of attributes in the tensor field.

In some implementations, the AI learning modules 2514, 2516 are able to use an individual attribute value or a series of individual attribute values from a tensor field as input. For example, the AI learning modules 2514, 2516 accept an individual attribute value from a tensor field such as intensity, or normal value as an input. In some instances, the AI learning module 2514, 2516 discussed above can be used to transform the attribute value in a tensor field from one coordinate space to another, distinct coordinate space.

In some implementations, an attribute value of an attribute in a tensor field at any level of abstraction (e.g., pixel level or surface level) can be created or modified by the AI learning modules 2514, 2516 to improve confidence. For example, the attribute value of a respective attribute can be modified according to the confidence value of the respective attribute that is included in the tensor field. For another example, the AI learning modules 2514, 2516 can be used to create a super frame of pixels representing a high confidence of values. In some implementations, an attribute value of an attribute in a tensor field at any level of abstraction can be created or modified by the AI learning modules 2514, 2516 to represent values from a series of measurement. Thus, an output, for example a confidence value of a normal to the surface, from one of the AI learning modules (e.g., the AI learning modules 2514, 2516), can be used to populate a value in the tensor field.

In some implementations, the first subgroup 2508 in the tensor field 2506, 2524A, 2524B, includes attributes such as intensity and RGB values from the optical characteristics only of the SPI sensor, which are the only attributes obtained from existing camera based systems, and can be directly input to the first AI learning module 2514 (e.g., represented by arrow 1 in FIG. 25A). The first AI learning module 2514 may operate based on a second-generation AI methodology. In some instances, each of the attributes in the first subgroup 2508 may have a formation that are directly consumable by the first AI learning module 2514 operating on the second-generation AI methodology. For example, the first subgroup

2508 in the tensor field 2506 may include attributes that are scalar, including intensity, RGB, intensity of DOLP, and slope vector delta (e.g., first derivative of change of the slope vector) obtained using the SPI systems 100, 200.

In some implementations, second subgroup 2510 in the tensor field 2506, 2524A, 2524B may include extra attributes captured and/or derived from the SPI sensor and can be directly input to the first AI learning module 2514 (e.g., represented by arrow 2 in FIG. 25A). In some implementations, the second subgroup 2510 in the tensor field 2506, 2524A, 2524B can also include attributes that may be transformed prior to being processed by the first AI learning module 2514 (e.g., represented by arrow 3 in FIG. 25A). In some implementations, the second subgroup 2510 may be scalar or vector deltas (e.g., first derivatives). In some instances, transformation of attributes in the second subgroup 2510 can be performed by normalization within a bounding region of 0-1, e.g., grayscale transformation. In some implementations, the grayscale transformation may be performed by the analytics engine 1910, the transformation engine 1906 shown in FIG. 19, or in another manner. Segmentation can be performed based on the "grayscale"-transformed (e.g., normalized) attributes of the second subgroup 2510 using in the first AI learning module 2514. In some implementations, the normalized attributes of the second subgroup 2510 can be combined with respective intensity values to produce an output and to provide a confidence value for the output.

In some instances, the third subgroup 2512 in the tensor field 2506, 2524A, 2524B can be directly input to the second AI learning module 2516 (e.g., represented by arrow 4) In some instances, the second AI learning module 2516 may operate on a third-generation AI methodology or another newer generation AI methodology. In some instances, each attribute of the third subgroup 2512 may have a format that is directly consumable by the one or more second AI learning modules 2516 operating on the third-generation AI methodology. For example, the third subgroup 2512 in the tensor field 2506 may include 3D information, e.g., surfaces, shapes, and another topological information, in raw form or in manipulated form. In some implementations, the third subgroup 2512 in the manipulated form may be obtained using techniques such as differential geometry, absolute differential calculus, extrinsic and intrinsic curvature, or another technique for manipulating and performing calculus on 3D data.

In some implementations, the third-generation AI methodology can process input data including 3D information, e.g., 3D surface- and shape-based data. The AI algorithms based on the third-generation AI methodology include inherently different underlying mathematics and physics. The methods and systems presented here allow 3D information to be captured and processed in real-time not only at pixel level, but also at segmented pixel levels (e.g., cluster level or surface level) representing real-world surfaces and shapes.

In some implementations, the third-generation AI methodology can be created using Bayesian, neural net techniques and other AI techniques and mathematics and capable of processing vectors and 3D information. For example, the second AI learning module 2516 may also receive one or more normalized attributes from the second subgroup 2510. The methods and systems presented here, utilizing the rich dataset from the SPI systems 100, 200, can provide real-time and accurate processing of input data for various machine vision applications, such as segmenting scenes, identifying objects, tracking moving objects, distinguishing individual instances of objects, quantifying object characteristics and spatial geometry, and another application.

In some implementations, attribute values of attributes in a tensor field at any level of abstraction (e.g., pixel, pixel cluster, surface, shape, etc.) may be used as input to the AI learning modules 2514, 2516, which can be processed by the AI algorithms to provide an output representing the object. In certain examples, the AI learning modules 2514, 2516 may receive one or more tensor fields from a single object representing different aspects of the single object (e.g., different surfaces). In some examples, the AI learning modules 2514, 2516 may receive multiple tensor fields corresponding to multiple objects. For example, multiple sensors may be used to create multiple sets of pixel-level first-order primitives for multiple objects in a complex scene involving multiple activities. The AI learning modules 2514, 2516 may produce high-order insight of the complex scene and activities in real-time. In some implementations, the methods and systems presented here can be used for applications, such as corrosion identification, object tracking, identification of objects and characterization of objects and another application. In some implementations, the AI learning modules 2514, 2516 may be implemented as part of the analytics engine 1910 as shown in FIG. 19.

Figure 26:
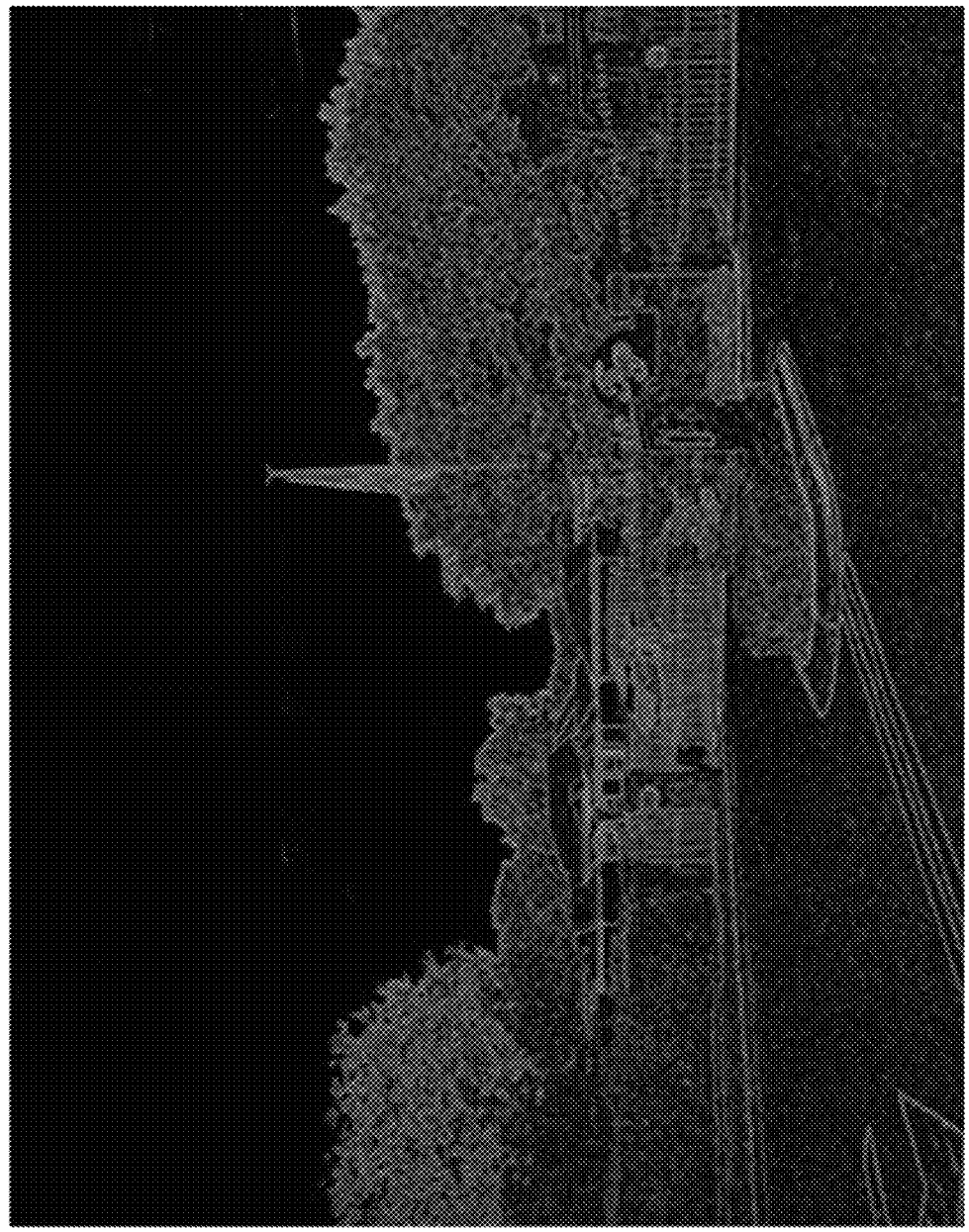
FIG. 26 shows an example segmented image produced using a second-generation AI methodology.

FIG. 26 shows an example segmented image 2600 produced using a second-generation AI methodology. The example segmented image 2600 is produced using a normalized attribute from the second attribute group 2510 For example, a dominant edge x,y, and z value can be used to define a "leading edge" to clearly delineate various surface and object types in a frame obtained using the SPI systems 100, 200 in real-time.

Figure 27:
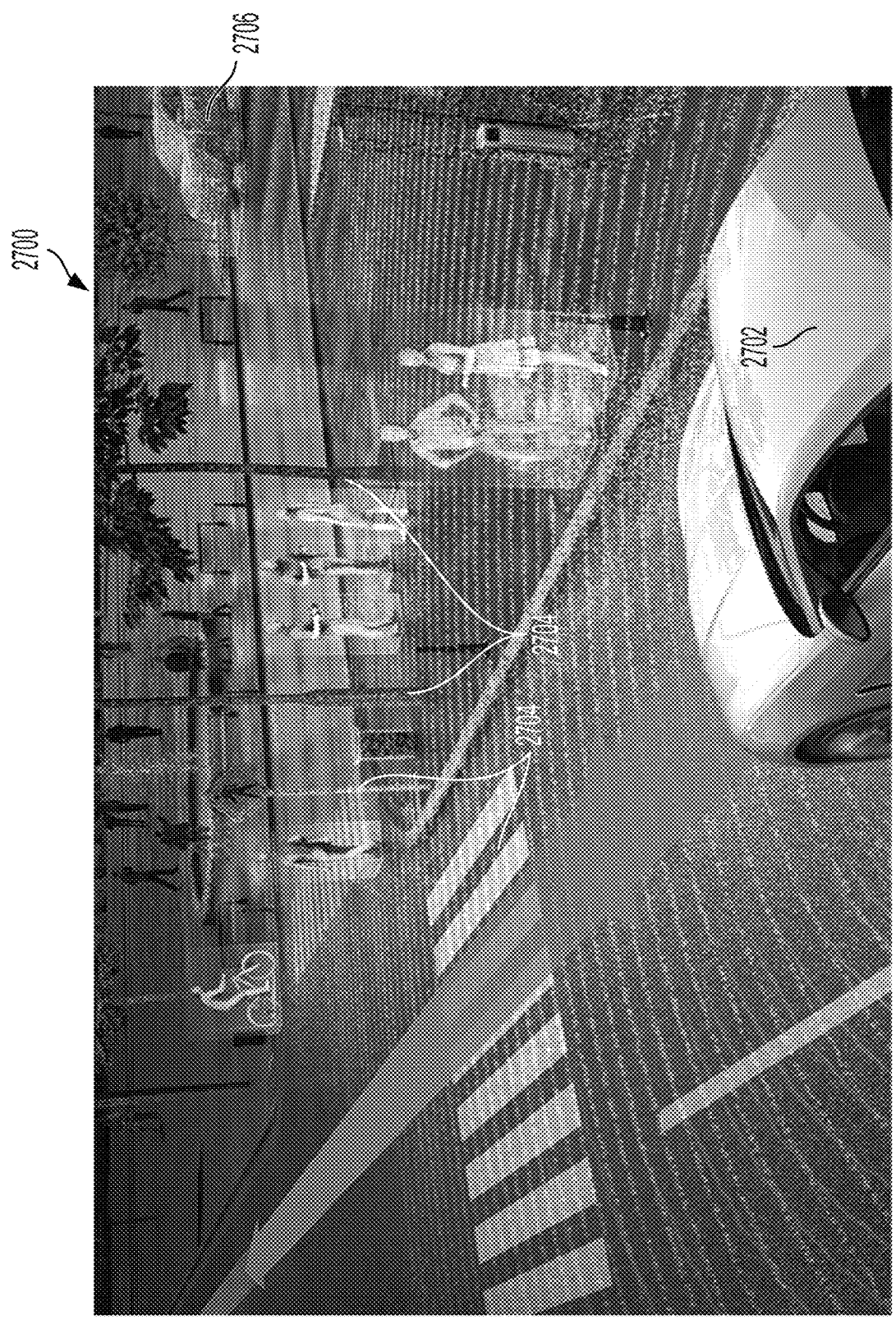
FIG. 27 shows an example scene in autonomous mobility.

FIG. 27 shows an example scene 2700 in autonomous mobility. As shown in the example application, the example scene 2700 includes at least three interaction areas. In a first interaction area, a vehicle 2702 has no prior knowledge of the example scene 2700, and relies on real-time (or near real-time) interpretation of the environment. In the first interaction area, data obtained from devices and sensors onboard are reactively processed to provide awareness of the scene. Examples of the data used in the first interaction area include data from GPS, speed, or other types of data providing real-time or near real-time trajectory of the vehicle 2702. In this example, real-time or near real-time interpretation of the scene can include segmentation of major static features such as roads, buildings, signage elements, road markings and distances. Furthermore, real-time or near real-time identification and tracking of mobile features include identification and tracking of vehicles, people, animals, and other objects in motion including speed, direction and distance information. Trajectories can be created and used for motion prediction. All these aspects can benefit from the use of pXSurface and pXShape data, which, as discussed above, exhibit surface and shape orientation invariance as well as the surface and shape range invariance.

In the second interaction area, persistent static 3D information of static objects 2704 (e.g., trees, road markers, etc.) is also used by the vehicle 2702 to be aware of the scene. For example, awareness of the scene utilizes existing 3D data of area (e.g., street view) to process initial route planning, process real-time localization, and augment navigation for GPS-denied situations. Real-time or near real-time data obtained by the SPI sensor can also be used to update the persistent static 3D information for future use. In an illustration, a vehicle's path is pre-planned from prior 3D information stored either locally or in cloud. In this example, the vehicle 2702 interprets real-time data with prior expected information to determine modifications to navigate path. As an example, the vehicle 2702 can use the persistent static 3D information of static objects 2704 previously captured in a region, both in pre-planning route navigation and in real-time during movement. This persistent static 3D information of the static objects 2704 can be accessed in real-time from cloud or pre-downloaded for use in areas with no internet access. Pre-planning route paths can be analogous to current mapping algorithms, but have the added feature of using the full 3D SPI data set to augment GPS with more precise location information from the static objects 2704 in the scene (e.g.—specific buildings, road signs and other "markers"). Furthermore, as mentioned above, there can be an upload of new as-is information from the vehicle 2702 back to the cloud to update the persistent static 3D information of the static objects 2704 for future use.

In the third interaction area, routines can update and use 3D information from multiple sources to provide a rich, updated situational awareness data set. For example, a vehicle path is pre-planned from prior multi-vehicle 3D information and saved in the cloud. The subject vehicle 2702 interprets real-time data with prior expected information and new real-time information shared by other vehicles (e.g., a nearby vehicle 2706) traversing the same region. Consequently, the third interaction area includes the first and second interaction areas and adds "as-is" data uploaded from other vehicles in the vicinity. Data shared directly with the subject vehicle 2702 (including static data and movement data) from another vehicle 2706 can be uses by the subject vehicle 2702 to better modify its navigation (e.g., the nearby vehicle 2706 could see a person behind a car that the subject vehicle 2702 may not be able to see). Furthermore, in this scenario, the static objects 2704 in the scene may include sensors, thus providing information to the subject vehicle 2702. For example, a traffic light can inform the subject vehicle 2702 of impending change to traffic signals, intersection congestion, etc., the subject vehicle 2702 can take actions according to the information received from the static objects 2704, e.g., slow down.

In some implementations, real-time sharing of data can be performed among vehicles (e.g., from the vehicle 2706 to the subject vehicle 2702), or between a vehicle and a static object (e.g., from the static object 2704 to the subject vehicle 2702) in a peer-to-peer approach. In some examples, multi-sensor interactions among different types of sensors on vehicles such as time of flight sensors, radar, lidar, and cameras, between two vehicles can be used to update the persistent static 3D information of the static objects 2704. The persistent static 3D information from multiple sources can be included in an updated situational awareness dataset. For example, a subject vehicle 2702 may obtain persistent static 3D information from different static objects 2704, which can be used to construct and update a situational awareness dataset. In some implementations, algorithms used in the AI frameworks 2500, 2520 (e.g., the AI learning modules 2514, 2516) may be update according to the updated situational awareness dataset.

In some implementations, AutonomousMobility is a collection of digital capabilities providing actionable information (e.g., autonomous interactions) organized under a platform approach for pxSurface, pxShape digital information specific to the metrology. AutonomousMobility also includes digital capabilities to identify and characterize information associated with the relationship of static objects and moving objects in the scene, along with other information. For example, such information may include data captured and created through the analysis of the SPI digital information. For another example, such information may also include data captured through additional sensors that are included on devices, e.g., both static and moving objects in the environment.

In some implementations, the autonomous interactions require scene segmentation, which requires a paradigm shift from high-latency, compute-intensive 2D-3D active signal conversion to 3D, real-time, passive surface and shape signal acquisition. This paradigm shift may be achieved by the methods and systems presented here using a combination of the SPI approach and the 3D shape-based AI approach.

In some implementations, an operation system (referred to as an Autonomous Mobility operating system and abbreviated "AutonomousMobilityOS") may be able to use blockchain security for user interaction and data security; and to use multi-factor authentication for user data privacy with (or without) blockchain. In some instances, the AutonomousMobilityOS may be also able to store captured images in any ShapeOS format (e.g., surface, shape, etc.); to perform analysis on critical information using the SPI system (for example to identify objects, edge boundaries, motion of objects, etc.); and to perform analysis of relationships between objects to one another (for example, velocity, acceleration, bounding size, relative distances, etc.). In some implementations, the AutonomousMobilityOS may include a privacy structure for adding SPI-based authentication to blockchain, movement of protected data to situational awareness providers (e.g., Google Maps), a data storage system, and a portal for access the data storage system. All of the above SPI sensor attributes are created contactless through this approach.

In some implementations, the SPI systems (e.g., the SPI systems 100, 200) and the AI frameworks (e.g., the AI frameworks 2500 and 2520) can enable a highest-level of vehicle autonomy, e.g., Level 5 of vehicle autonomy. In some instances, the level 5 of vehicle autonomy can be enabled for both moving objects and static objects. In some instances, a vehicle with Level 5 of vehicle autonomy is fully autonomous, driver optional, and steering-wheel optional. Examples for level 5 of vehicle autonomy include a far roaming robo-taxi. At level 1 of vehicle autonomy, under certain conditions, an assistance system on the vehicle controls the steering or the speed, but not both simultaneously. The driver performs all other aspects of driving and has full responsibility for monitoring the road and taking over if the assistance system fails to act appropriately. Examples for level 1 of vehicle autonomy include cruise control and lane-assistant feedback. At level 2 of vehicle autonomy, the assistance system of the vehicle can steer, accelerate, and brake in certain circumstances. Tactical maneuvers such as responding to traffic signals or changing lanes largely fall to the driver, as does scanning for hazards. The driver may have to keep a hand on the wheel as a proxy for paying attention. Examples for level 2 of vehicle autonomy include advanced cruise control with throttle and brake functions taken over by the vehicle at times, and self-parking. At level 2+ of vehicle autonomy, the assistance system of the vehicle can monitor the driver, provide awareness feedback to the driver and steer, and the driver may become hands-free under certain conditions. Examples for level 2+ of vehicle autonomy include awareness of driver fatigue and hands-free in controlled situations such as on freeway for limited times.

At level 3 of vehicle autonomy, the assistance system on the vehicle manages most aspects of driving, including monitoring the environment, prompts the driver to intervene when it encounters a scenario it is not able to navigate, controls safety-critical functions, and the driver must be available to take over at any time. Next generation of sensors, algorithms and regulations/laws are required for this level. At level 4 of vehicle autonomy, the assistance system on the vehicle can operate without human input or oversight but only under selected conditions defined by factors such as road type of geographic area. In certain situations, there do not require a driver, for example in a shared car or shared pod restricted to a defined area.

Figure 28A:
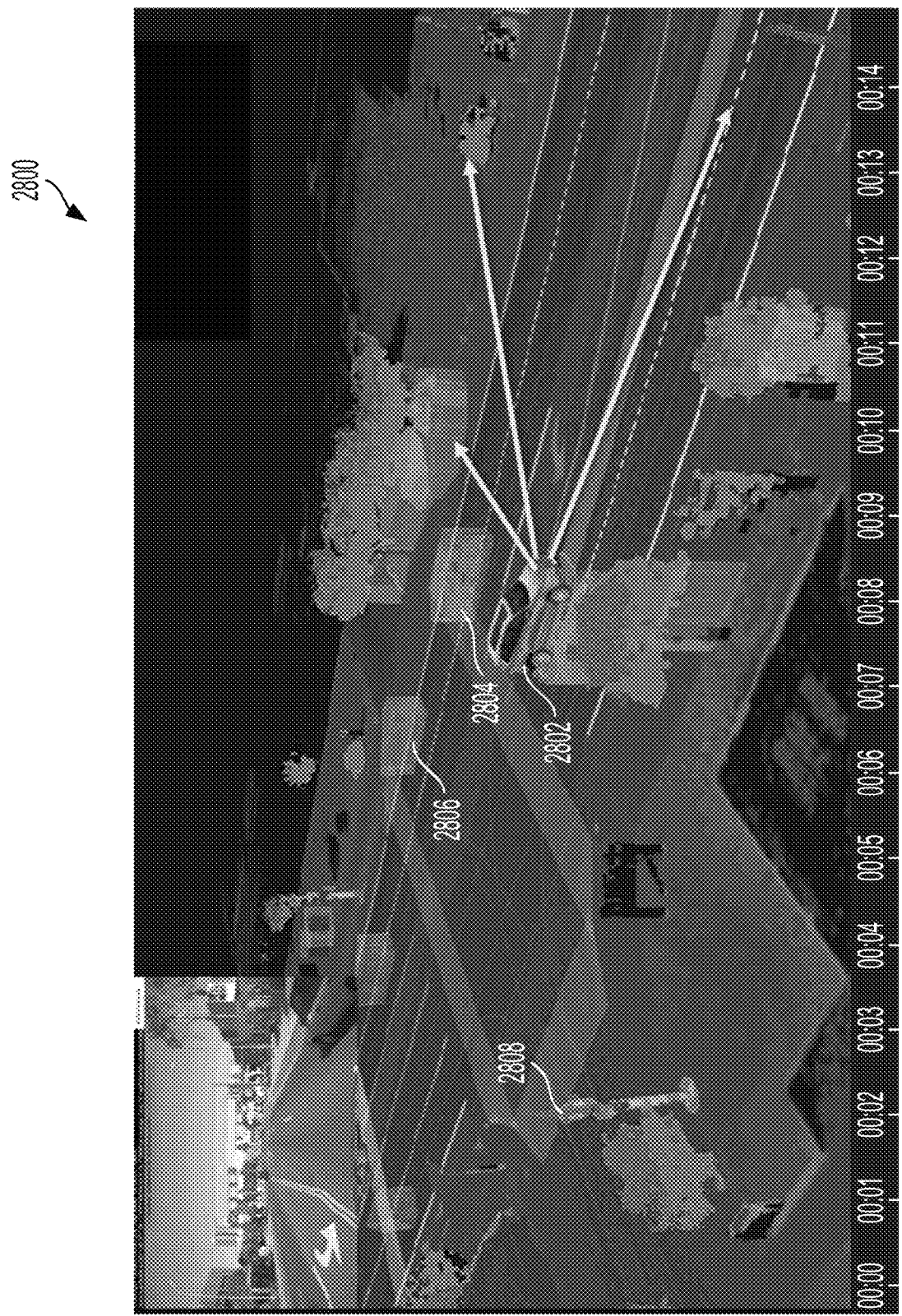
FIG. 28A shows an example scenario in autonomous mobility.
Figure 28B:
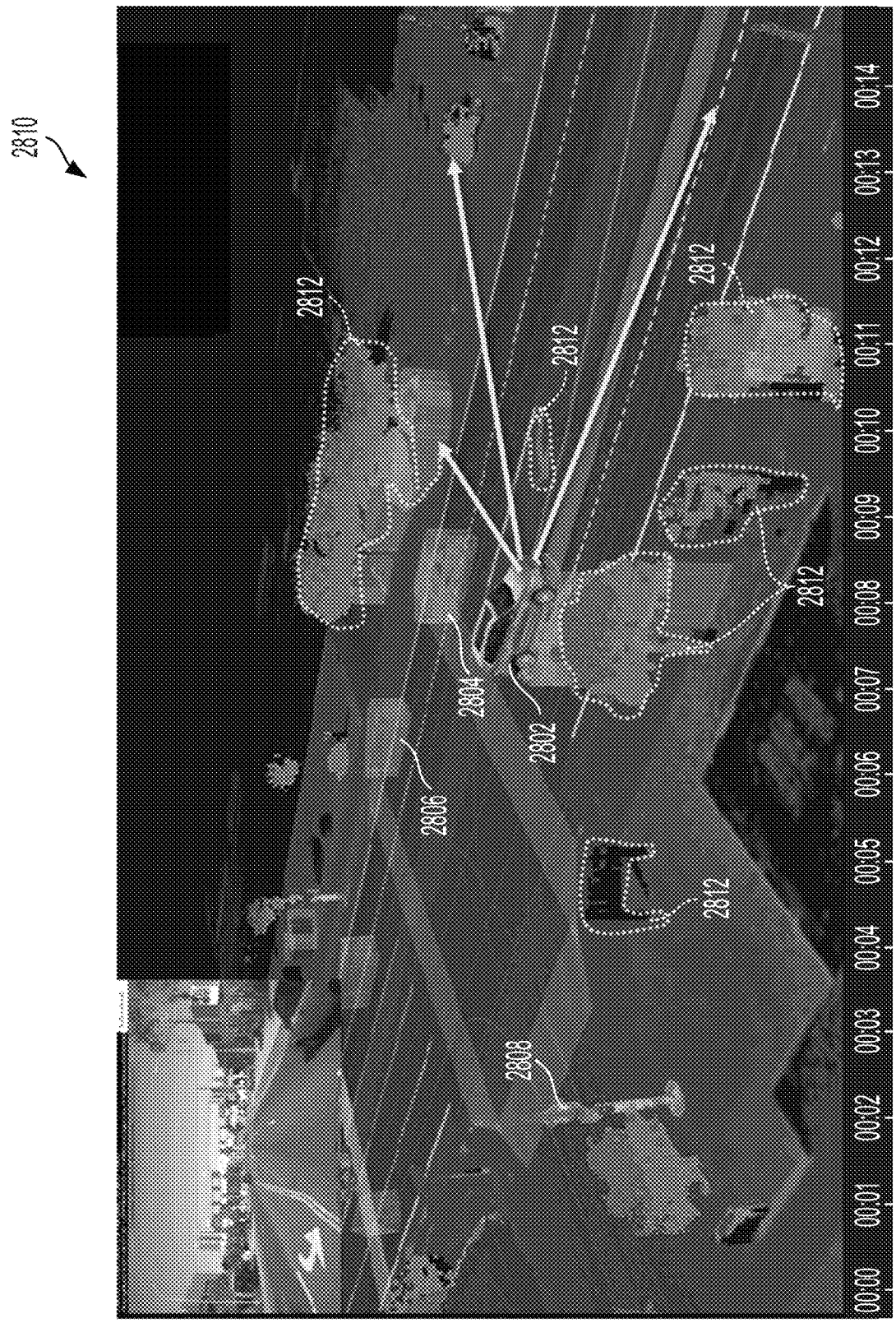
FIG. 28B shows another example scenario in autonomous mobility.
Figure 28C:
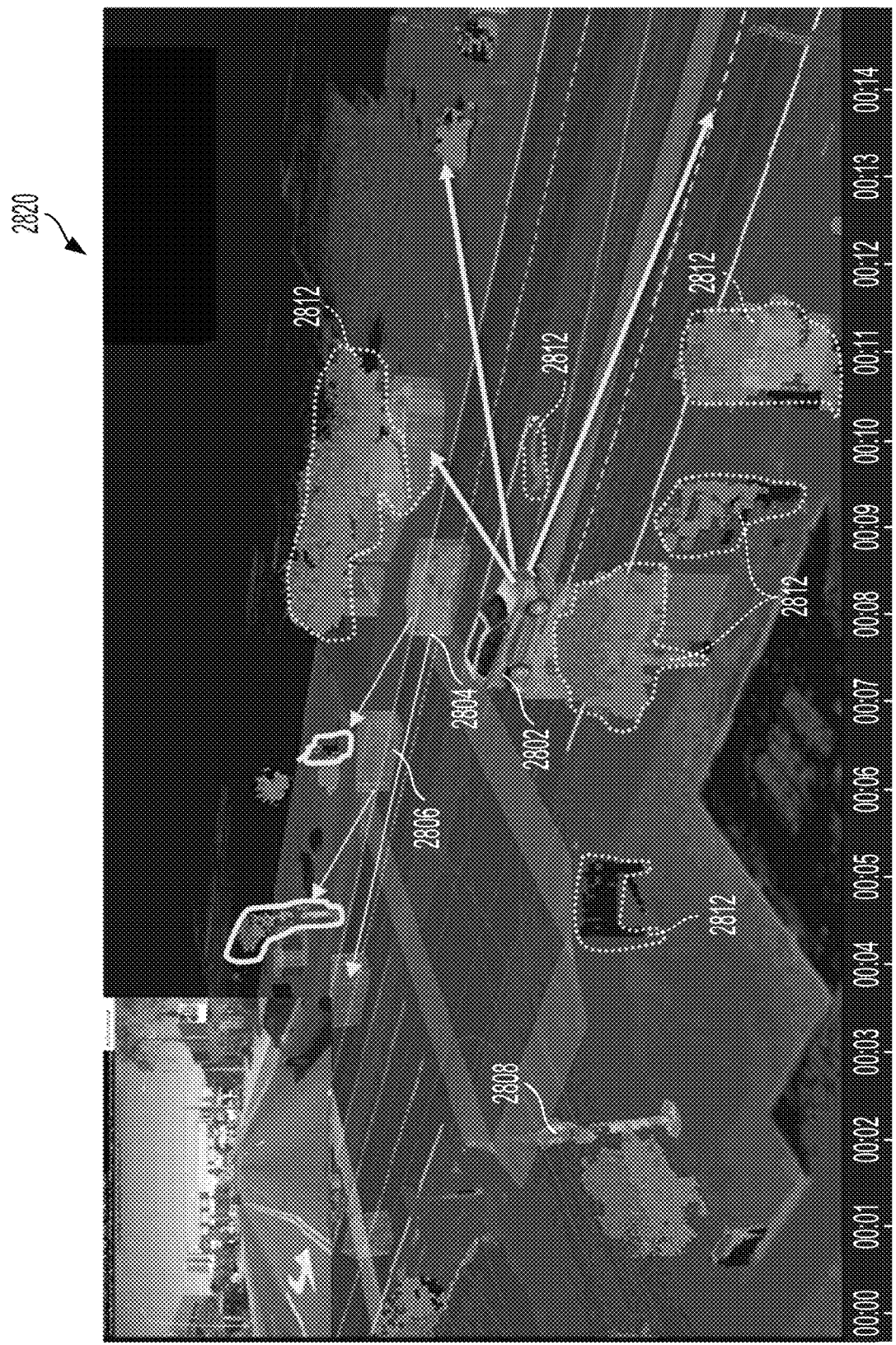
FIG. 28C shows another example scenario in autonomous mobility.

In some instance, a scene may be divided into three interaction areas shown in FIGS. 28A-28C which include respective Points of View (POV) for each respective interaction. For example, a first point-of-view can be from a prime vehicle 2802 as shown in FIG. 28A, second and third point-of-view may be from second and third vehicles 2804 and 2806 shown in FIG. 28C while yet another point of view could be from a static sensor on a static object (e.g., a light 2808 at an intersection). FIG. 28A shows an example scenario 2800 in autonomous mobility. Current navigation systems use GPS location to define a pre-planned navigation path. In some implementations, the route data, represented in 2D geospatial coordinates as part of the route from GPS system is incorporated into the route data in the prime vehicle 2802 (e.g., a computer on board) which can be then used together with sensor data on the prime vehicle 2802 in real-time.

In some implementations, the prime vehicle 2802 has no prior knowledge of the scene or along the pre-planned navigation path, e.g., primary premise, and only relies on real-time interpretation of the scene. In other words, no persistent static data is obtained from anywhere else. In some implementations, sensors on the prime vehicle 2802, data from on-board diagnostics (OBD) which could include GPS, speed, etc. can be used to determine real-time trajectory of the prime vehicle. Real-time interpretation of a scene including segmentation of major static features such as roads, buildings, signage, elements, road markings and distances. Real-time identification and tracking of mobile features such as vehicles, people, animals, and other objects in motion can be performed by the sensors on the prime vehicle 2802. In some instances, speed, direction and distance information of respective objects in motion can be used to determine trajectories to be created and used for motion prediction.

FIG. 28B shows another example scenario 2810 in autonomous mobility. The example scenario 2810 includes a combination of a prime vehicle 2802 and persistent data. In some implementations, information from past trips including previously obtained persistent data (e.g., road signs, buildings, and other markers) as part of a "street view" 2812 concept can be stored and used for initial navigation. In some implementations, the information from past trips, e.g., the street view 2812, may be shared, for example in the cloud with others. The shared information, either private or public, can be used to create an initial navigation path and the persistent data can be used as markers of progress long the path including real-time notion. For example, the real-time notion may provide instructions on how to keep the vehicle in lane or another notion. In some examples, GPS and other data such as WAZE concepts of data shared may be also used to create an initial navigation path. In some implementations, the shared information may be used with the data collected in real-time, e.g., sensor data from the vehicle or other sensor data from WAZE, to modify or update the initial navigation path.

For example, when an on-going construction event is detected in the initial navigation path by another vehicle and shared with the subject vehicle or directly detected by the sensors on the subject vehicle, real-time data including the detection of the on-going construction indicates a change in the environment. In some instances, the change detected in the environment may be then evaluated. For example, when the environment is changed in a significant enough manner, a change in behavior of the vehicle can be warranted, e.g., the initial navigation path may be updated according to the real-time data, e.g., shared by another vehicle, and/or persistent data that is already stored in the subject vehicle. In some implementations, the methods and systems described here can enable a real-time update to the navigation path.

In some implementations, during pre-planning route navigation and real-time navigation during movement, the persistent data previously captured in that region can be used. The persistent data previously captured can be accessed in real-time from cloud or pre-downloaded and saved on the subject vehicle for use in areas without internet access.

In some implementations, the initial navigation path may be generated using full 3D data set to augment GPS with more precise location information from static objects in the scene, e.g., specific buildings, road signs and other markers. In some examples, as-is information from the subject vehicle can be uploaded back to the cloud to update the persistent data of the scene for future use.

FIG. 28C shows another example scenario 2820 in autonomous mobility. The example scenario includes a peer-to-peer, real-time sharing. In some implementations, information may be shared in a peer-to-peer fashion in real-time among vehicles or between a vehicle and a static object. In this way, information may be effectively shared in real-time without being uploaded to and then downloaded from the cloud. In some examples, the peer-to-peer information sharing may be achieved by massive machine type communications or another type of communication.

In some implementations, the sharing could involve more cognition of understanding which object or vehicle knows about data that other peer vehicle needs to know. For example, when an ambulance is approaching a subject vehicle from its rear end and is not visible to the subject vehicle (e.g., not detectable by its sensors), the subject vehicle may receive information about the ambulance (e.g., trajectory, speed, etc.) shared from another nearby vehicle which is able to directly observe the approaching ambulance.

In some implementations, as-is data may be received from another nearby vehicle. In some examples, data received by the subject vehicle from another nearby vehicle may include static data and movement data of other vehicles, which may be used by the subject vehicle to better modify its navigation. For example, a nearby vehicle may observe a person behind a subject vehicle, which could not be detected by the subject vehicle. In some examples, nearby static objects in the scene could also include sensors to collect static data and to provide information to the subject vehicle. For example, a traffic light may transfer information including impending change to signal, intersection congestion, etc., to a subject vehicle approaching to the traffic light. The subject vehicle may take actions according to the information received and its current status (e.g., direction, speed, etc.). For example, the subject vehicle may slow down, make changes to navigation or take another action.

In some implementations, a static object, e.g., the static objects 2704 shown in FIG. 27, may have autonomous capability similar as a moving counterpart, e.g., the subject vehicle 2702. In some examples, response choices that a static object, e.g., a building, a road sign, etc., having autonomous capability can make, may be limited and different from those for a moving object as discussed above. In some instances, the static object having autonomous capability may include sensors for detecting changes in environment and may further include communication systems to transmit such information of detected changes in environment to a nearby moving object. In some examples, such information may be used by the moving object to perform an appropriate action, for example update its initial navigation path, or change its trajectory.

In some implementations, such information of changes in the scene may include changes in infrastructures. For example, HOV lanes may be converted to autonomous-only for vehicles, e.g., with level-3 autonomous capability. For another example, level-5 autonomous capability can be achieved based on a full representation of the 3D environment detected by all sensors in real-time along with any persistent data that are previously captured without infrastructure around.

In some instances, autonomy may exist in certain applications, such as farming, earth movement, strip mining, and mining. When a rigorous infrastructure is in place in these applications and is limited in scope, respective types of vehicles may be allowed in these applications. For example, a static object as part of the infrastructure in these application may detect the type of a vehicle to determine whether to grant its access to the infrastructure.

In some instances, requirements for autonomy may include one or more of the following actions performed in real-time including scene segmentation, object identification, object tracking, relative distances, and relative trajectories. In some examples, angular data can be represented digitally in various forms and transforms can be made mathematically. For example, Fourier transforms from time and frequency to some spatial frame may be performed. Signal characteristics can be determined from various techniques. For example, signal characteristics may include signatures that are included in various transformed relationships. In some instances, the signatures can provide values and verification signals representing reality. For example, a signature based on angular relationship includes the plane signature at various levels of range.

As described above in FIG. 28B, existing approaches for capturing data like street view and consumer apps, may provide the initial majority of data for the persistence requirement in addition to permanently installed monitoring system (e.g., PIMS) on the infrastructure.

In some implementations, applications of the AI frameworks 2500, 2520 include global mapping, e.g., a digital twin of the example scenario 2810 shown in FIG. 28B. In certain instances, different approaches of achieving the persistent data can be used so a vertical application could be the equivalent of street view including satellites, specific vehicles, drones, etc. to capture the digital twin data as part of the solution.

Since all sensors are line of sight, coverage is completed through a variety of sensor placements including static objects. For example, a streetlamp may observe a boy behind a tree, determine his trajectory, and share with one or more nearby moving vehicles. In some implementations, a static object may include the SPI systems 100, 200 shown in FIGS. 1 and 2, which can be used to create a Level 3+ autonomy without the major infrastructure requirement as full level 4 or 5 autonomy requires. In some implementations, the SPI approach can be adopted and implemented in infrastructure areas to provide the coverage necessary for Level 4 autonomy (e.g., in controlled areas or another infrastructure area). In some implementations, the SPI approach may be further adopted to include coverage from satellite or another higher altitude capture technique to ensure Level 5 capability in unstructured areas such as deserts, off roading, on water and under water situations.

In some implementations, 3D volumetric segmentation may be used to train AI models for faster identification of segmented objects. The 3D volumetric segmentation is part of a shaped-based 3D AI technology providing passive, real-time data acquisition and analysis, which is applicable in visible, LWIR regions under low light conditions. The shape-based 3D AI technology may be applicable to signals received in the full IR region.

For example, a SPI system (e.g., the SPI systems 100, 200) including one or more sensors that are capable of capturing angular data and full rich EM spectrum data can be used. Angular data remain unchanged in different wavelength regions. Surface and shapes can be used for immediate, real-time decision making. In some implementations, the systems and methods presented here does not require a conversion of point clouds to mesh or solid model to obtain the angular data which can be time consuming and may not allow for real-time processing. In some implementations, the systems and methods presented here can provide segmentation, identification, classification, and ranging information for objects in a scene. In some implementations, the systems and methods presented here can be used to accomplishing these tasks in real-time using 3D surface and shape information, e.g., for example from the tensor field 2506 shown in FIG. 25A, without the need to fully render the entire scene. In some implementations, the systems and methods presented here allows a single system to perform navigation and find, track and identify objects within the FOV of a subject vehicle or a static object.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array), AI processor or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. Data processing may be performed by any and all processing types such as quantum processors, light field, etc. not just conventional computer chips of today. Computer storage medium includes any and all storage approaches be they SSD, optical, quantum based, photonic, biological, etc.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a general aspect, enhancement of artificial intelligence algorithms using 3D data is described.

In a first example, input data of an object is stored in a storage engine of a system. The input data includes first-order primitives and second-order primitives. A plurality of features of the object is determined by operation of an analytics engine of the system, based on the first-order primitives and the second-order primitives. A tensor field is generated by operation of the analytics engine of the system. The tensor field includes an attribute set, which includes one or more attributes selected from the first-order primitives, the second-order primitives, or the plurality of features. The tensor field is processed by operation of the analytics engine of the system according to an artificial intelligence algorithm to generate output data representing the object.

Implementations of the first example may include one or more of the following features. The first-order primitives include pixel-level first-order primitives, and the pixel-level first-order primitives are generated based on electromagnetic (EM) radiation received from the object located in a field-of-view of an image sensor device. The EM radiation received from the object is reflected, refracted, or emitted from the object. The image sensor includes a single-lens spatial phase imaging (SPI) sensor. The second-order primitives are generated based on the first-order primitives. The attribute set of the tensor field represents the object at an orientation within a region of space, the attribute set comprising an attribute that is one of a scaler, a vector, a surface, or a shape. The attribute set of the tensor field includes respective attributes and respective confidence values for the respective attributes.

Implementations of the first example may include one or more of the following features. The tensor field includes a first tensor field, the first-order primitives include pixel-level first-order primitives, and the second-order primitives include pixel-level second-order primitives. When generating the first tensor field, a pixel cluster is identified by clustering pixels according to one or more attributes in the pixel-level first-order primitives and the pixel-level second-order primitives. Each of the one or more attributes of the pixels that are clustered has an attribute value within a predetermined interval to define surfaces of the object. A second tensor field corresponding to the pixel cluster is generated by operation of the analytics engine of the system. The second tensor field has a higher order than the first tensor field. The first tensor field includes one or more first attributes. The second tensor field includes one or more second attributes. Each of the one or more second attributes includes an attribute in surface-level first-order primitives or surface-level second-order primitives. The artificial intelligence algorithm includes a first artificial intelligence algorithm and a second artificial intelligence algorithm, the first artificial intelligence algorithm is configured to process the one or more first attributes in the first tensor field and the second artificial intelligence algorithm is configured to process the one or more second attributes of the second tensor field.

Implementations of the first example may include one or more of the following features. After receiving the tensor field, an attribute value to an attribute in the plurality of features in the tensor field is assigned by operation of the analytics engine. The output data is generated based on the tensor field for one of the following applications: corrosion identification, object tracking, object identification, or object characterization. The tensor field includes a subgroup of attributes, one or more attributes in the subgroup are normalized to generate one or more normalized attributes.

Implementations of the first example may include one or more of the following features. The image sensor includes a plurality of image sensors, and the object includes a plurality of objects. A plurality of tensor fields corresponding to the plurality of objects is generated in real-time by operation of the analytics engine of the system. The plurality of tensor fields is processed by operation of the analytics engine of the system according to the artificial intelligence algorithm to generate output data representing the plurality of objects. After receiving the tensor field, synthetic training data can be generated by operation of the analytics engine, by modifying an attribute value of an attribute in the tensor field. The artificial intelligence algorithm is trained using the synthetic training data, the field-of-view and a point-of-view of the image sensor.

In a second example, a system comprising: a storage engine and an analytics engine. The storage engine is configured to store input data of an object. The input data includes first-order primitives and second-order primitives. The analytics engine is configured to: determine a plurality of features of the object based on the first-order primitives and the second-order primitives; generate a tensor field; and process the tensor field according to an artificial intelligence algorithm to generate output data representing the object. The tensor field includes an attribute set, which includes one or more attributes selected from the first-order primitives, the second-order primitives, or the plurality of features.

Implementations of the second example may include one or more of the following features. The first-order primitives include pixel-level first-order primitives, and the pixel-level first-order primitives are generated based on electromagnetic (EM) radiation received from the object located in a field-of-view of an image sensor device. The EM radiation received from the object is reflected, refracted, or emitted from the object. The image sensor includes a single-lens spatial phase imaging (SPI) sensor. The second-order primitives are generated based on the first-order primitives. The attribute set of the tensor field represents the object at an orientation within a region of space, the attribute set comprising an attribute that is one of a scaler, a vector, a surface, or a shape. The attribute set of the tensor field includes respective attributes and respective confidence values for the respective attributes.

Implementations of the second example may include one or more of the following features. The tensor field includes a first tensor field, the first-order primitives include pixel-level first-order primitives, and the second-order primitives include pixel-level second-order primitives. When generating the first tensor field, a pixel cluster is identified by clustering pixels according to one or more attributes in the pixel-level first-order primitives and the pixel-level second-order primitives. Each of the one or more attributes of the pixels that are clustered has an attribute value within a predetermined interval to define surfaces of the object. A second tensor field corresponding to the pixel cluster is generated by operation of the analytics engine of the system. The second tensor field has a higher order than the first tensor field. The first tensor field includes one or more first attributes. The second tensor field includes one or more second attributes. Each of the one or more second attributes includes an attribute in surface-level first-order primitives or surface-level second-order primitives. The artificial intelligence algorithm includes a first artificial intelligence algorithm and a second artificial intelligence algorithm, the first artificial intelligence algorithm is configured to process the one or more first attributes in the first tensor field and the second artificial intelligence algorithm is configured to process the one or more second attributes of the second tensor field.

Implementations of the second example may include one or more of the following features. After receiving the tensor field, an attribute value to an attribute in the plurality of features in the tensor field is assigned by operation of the analytics engine. The output data is generated based on the tensor field for one of the following applications: corrosion identification, object tracking, object identification, or object characterization. The tensor field includes a subgroup of attributes, one or more attributes in the subgroup are normalized to generate one or more normalized attributes.

Implementations of the second example may include one or more of the following features. The image sensor includes a plurality of image sensors, and the object includes a plurality of objects. A plurality of tensor fields corresponding to the plurality of objects is generated in real-time by operation of the analytics engine of the system. The plurality of tensor fields is processed by operation of the analytics engine of the system according to the artificial intelligence algorithm to generate output data representing the plurality of objects. After receiving the tensor field, synthetic training data can be generated by operation of the analytics engine, by modifying an attribute value of an attribute in the tensor field. The artificial intelligence algorithm is trained using the synthetic training data, the field-of-view and a point of view of the image sensor.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method, comprising:
   storing input data of an object in a storage engine of a system, the input data comprising first-order primitives and second-order primitives;
   determining, by operation of an analytics engine of the system, a plurality of features of the object based on the first-order primitives and the second-order primitives;
   generating, by operation of the analytics engine of the system, a tensor field, the tensor field comprising an attribute set, the attribute set comprising one or more attributes selected from the first-order primitives, the second-order primitives, and the plurality of features, the tensor field being organized based on attributes of a single pixel, a single voxel, a super pixel, a super frame, or a cluster of the same, the tensor field comprising subgroups defined based on types of attributes contained in the attribute set, the subgroups comprising:
   a first subgroup containing one or more scalar attributes;
   a second subgroup containing one or more vector attributes; and
   a third subgroup containing one or more attributes containing 3D information; and processing, by operation of the analytics engine of the system, the tensor field according to an artificial intelligence algorithm to generate output data representing the object, wherein the output data comprises surface normal and curvature data.

2. The method of claim 1, wherein the first-order primitives comprise pixel-level first-order primitives, and the pixel-level first-order primitives are generated based on electromagnetic (EM) radiation received from the object located in a field-of-view of an image sensor device.

3. The method of claim 2, wherein the EM radiation received from the object is reflected, refracted, or emitted from the object.

4. The method of claim 2, wherein the image sensor comprises a single-lens spatial phase imaging (SPI) sensor.

5. The method of claim 2, wherein the image sensor comprises a plurality of image sensors, and the object comprises a plurality of objects, and the method comprises:
generating in real-time, by operation of the analytics engine of the system, a plurality of tensor fields corresponding to the plurality of objects; and
processing, by operation of the analytics engine of the system, the plurality of tensor fields according to the artificial intelligence algorithm to generate output data representing the plurality of objects.

6. The method of claim 2, comprising:
after receiving the tensor field, generating, by operation of the analytics engine, synthetic training data by modifying an attribute value of an attribute in the tensor field; and
training the artificial intelligence algorithm using the synthetic training data and the field-of-view of the image sensor and a point-of-view of the image sensor.

7. The method of claim 1, wherein the second-order primitives are generated based on the first-order primitives.

8. The method of claim 1, wherein the attribute set of the tensor field represents the object at an orientation within a region of space, the attribute set comprising an attribute that is one of a scaler, a vector, a surface, or a shape.

9. The method of claim 1, wherein the attribute set of the tensor field comprises respective attributes and respective confidence values for the respective attributes.

10. The method of claim 1, wherein the tensor field comprises a first tensor field, the first-order primitives comprise pixel-level first-order primitives, the second-order primitives comprise pixel-level second-order primitives, generating the first tensor field comprises:
identifying a pixel cluster by clustering pixels according to one or more attributes in the pixel-level first-order primitives and the pixel-level second-order primitives, each of the one or more attributes of the pixels that are clustered having an attribute value within a predetermined interval to define surfaces of the object; and
generating, by operation of the analytics engine of the system, a second tensor field corresponding to the pixel cluster, the second tensor field having a higher order than the first tensor field.

11. The method of claim 10, wherein the first tensor field comprises one or more first attributes, the second tensor field comprises one or more second attributes, and each of the one or more second attributes comprises an attribute in surface-level first-order primitives or surface-level second-order primitives.

12. The method of claim 11, wherein the artificial intelligence algorithm comprises a first artificial intelligence algorithm and a second artificial intelligence algorithm, the first artificial intelligence algorithm is configured to process the one or more first attributes in the first tensor field and the second artificial intelligence algorithm is configured to process the one or more second attributes of the second tensor field.

13. The method of claim 1, comprising:
after receiving the tensor field, assigning, by operation of the analytics engine, an attribute value to an attribute in the plurality of features in the tensor field.

14. The method of claim 1, wherein the output data is generated based on the tensor field for one of the following applications: corrosion identification, object tracking, object identification, or object characterization, and wherein the applications are performed on objects comprising one or more of cracks, pits, blisters, skin lesions, or blood vessels.

15. The method of claim 1, wherein the tensor field comprises a subgroup of attributes, the method comprises:
prior to processing the tensor field, normalizing one or more attributes in the subgroup to generate one or more normalized attributes.

16. A system comprising:
a storage engine configured to store input data of an object, the input data comprising first-order primitives and second-order primitives; and
an analytics engine configured to:
determine a plurality of features of the object based on the first-order primitives and the second-order primitives;
generate a tensor field, the tensor field comprising an attribute set, the attribute set comprising one or more attributes selected from the first-order primitives, the second-order primitives, and the plurality of features, the tensor field being organized based on attributes of a single pixel, a single voxel, a super pixel, a super frame, or a cluster of the same, the tensor field comprising subgroups defined based on types of attributes contained in the attribute set, the subgroups comprising:
a first subgroup containing one or more scalar attributes;
a second subgroup containing one or more vector attributes; and
a third subgroup containing one or more attributes containing 3D information; and
process the tensor field according to an artificial intelligence algorithm to generate output data representing the object, wherein the output data comprises surface normal and curvature data.

17. The system of claim 16, wherein the first-order primitives comprise pixel-level first-order primitives, and the pixel-level first-order primitives are generated based on electromagnetic (EM) radiation received from the object located in a field-of-view of an image sensor device.

18. The system of claim 17, wherein the EM radiation received from the object is reflected, refracted, or emitted from the object.

19. The system of claim 17, wherein the image sensor comprises a single-lens spatial phase imaging (SPI) system.

20. The system of claim 17, wherein in the image sensor comprises a plurality of image sensors, and the object comprises a plurality of objects, and the analytics engine is configured to:
generate in real-time a plurality of tensor fields corresponding to the plurality of objects; and
process the plurality of tensor fields according to the artificial intelligence algorithm to generate output data representing the plurality of objects.

21. The system of claim 17, wherein the analytics engine is configured to:
generate synthetic training data by modifying an attribute value of an attribute in the tensor field; and
train the artificial intelligence algorithm using the synthetic training data and the field-of-view of the image sensor and a point-of-view of the image sensor.

22. The system of claim 16, wherein the second-order primitives are generated based on the first-order primitives.

23. The system of claim 16, wherein the attribute set of the tensor field represents the object at an orientation within a region of space, the attribute set comprising an attribute that is one of a scaler, a vector, a surface, or a shape.

24. The system of claim 16, wherein the attribute set of the tensor field comprises respective attributes and respective confidence values for the respective attributes.

25. The system of claim 16, wherein the tensor field comprise a first tensor field, the first-order primitives comprise pixel-level first-order primitives, the second-order primitives comprise pixel-level second-order primitives, the analytic engine is configured to:
identify a pixel cluster by clustering pixels according to one or more attributes in the pixel-level first-order primitives and the pixel-level second-order primitives, each of the one or more attributes of the pixels that are clustered having an attribute value within a predetermined interval to define surfaces of the object; and
generate a second tensor field corresponding to the pixel cluster, the second tensor field having a higher order than the first tensor field.

26. The system of claim 25, wherein the first tensor field comprises one or more first attributes, the second tensor field comprises one or more second attributes, and each of the one or more second attributes comprises an attribute in surface-level first-order primitives or surface-level second-order primitives.

27. The system of claim 26, wherein the artificial intelligence algorithm comprises a first artificial intelligence algorithm and a second artificial intelligence algorithm, the first artificial intelligence algorithm is configured to process the one or more first attributes in the first tensor field and the second artificial intelligence algorithm is configured to process the one or more second attributes of the second tensor field.

28. The system of claim 16, wherein the analytic engine is configured to:
assign an attribute value to an attribute in the plurality of features in the tensor field.

29. The system of claim 16, wherein the output data is generated based on the tensor field for one of the following applications: corrosion identification, object tracking, object identification, or object characterization, and wherein the applications are performed on objects comprising one or more of cracks, pits, blisters, skin lesions, or blood vessels.

30. The system of claim 16, wherein the tensor field comprises a subgroup of attributes, the analytics engine is configured to normalize one or more attributes in the subgroup to generate one or more normalized attributes.

* * * * *